US008964988B2

(12) United States Patent
Nishimaki et al.

(10) Patent No.: US 8,964,988 B2
(45) Date of Patent: *Feb. 24, 2015

(54) SECRET SHARING SYSTEM, SHARING APPARATUS, SHARE MANAGEMENT APPARATUS, ACQUISITION APPARATUS, SECRET SHARING METHOD, PROGRAM AND RECORDING MEDIUM

(75) Inventors: Ryo Nishimaki, Tokyo (JP); Koutarou Suzuki, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 134 days.

This patent is subject to a terminal disclaimer.

(21) Appl. No.: 13/810,509

(22) PCT Filed: Jul. 22, 2011

(86) PCT No.: PCT/JP2011/066693
§ 371 (c)(1),
(2), (4) Date: Jan. 16, 2013

(87) PCT Pub. No.: WO2012/011565
PCT Pub. Date: Jan. 26, 2012

(65) Prior Publication Data
US 2013/0114815 A1 May 9, 2013

(30) Foreign Application Priority Data
Jul. 23, 2010 (JP) ................. 2010-166407

(51) Int. Cl.
*H04L 9/08* (2006.01)
*H04L 9/30* (2006.01)
(52) U.S. Cl.
CPC ............ *H04L 9/0861* (2013.01); *H04L 9/0836* (2013.01); *H04L 9/085* (2013.01); *H04L 9/3073* (2013.01)
USPC ....................................... 380/278

(58) Field of Classification Search
CPC .............................. H04L 9/085; H04L 9/0838
USPC ....................... 380/277–286, 44–47
See application file for complete search history.

(56) References Cited

U.S. PATENT DOCUMENTS 5,485,474 A * 1/1996 Rabin ........................... 714/762
5,708,714 A * 1/1998 Lopez et al. .................. 713/180
(Continued)

FOREIGN PATENT DOCUMENTS

JP     10 198272      7/1998
JP     2008 98894      4/2008
(Continued)

OTHER PUBLICATIONS

Office Action issued Jul. 9, 2013, in Japanese Patent Application No. 2012-525441 with English translation.
(Continued)

*Primary Examiner* — Christopher Revak
*Assistant Examiner* — Vadim Savenkov
(74) *Attorney, Agent, or Firm* — Oblon, Spivak, McClelland, Maier & Neustadt, L.L.P.

(57) ABSTRACT

A sharing apparatus independently shares a value corresponding to each element $\theta(\psi, i, \beta) \cdot g_2$ of basis vectors $b_i^*(\theta)$ among each subset $SUB(\alpha)$ consisting of $H(\alpha)$ share management apparatuses $PA(\alpha, 1), \ldots, PA(\alpha, H(\alpha))$ to generate share information $SH(\psi, i, \beta, \alpha, h(\alpha))$ corresponding to each element $\theta(\psi, i, \beta) \cdot g_2$. The share management apparatus $PA(\alpha, h(\alpha))$ generates a share secret value $DSH(\psi, \alpha, h(\alpha))$ by performing a common calculation common in the subset $SUB(\alpha)$ on common information shared in the subset $SUB(\alpha)$ and the share information $SH(\psi, i, \beta, \alpha, h(\alpha))$. An acquisition apparatus generates reconstructed secret values $SUBSK(\psi, \alpha)$ for each subset $SUB(\alpha)$ by performing a reconstruction processing for the subset $SUB(\alpha)$ and generates generation information $D^*(\psi)$ from the reconstructed secret values $SUBSK(\psi, \alpha)$.

28 Claims, 28 Drawing Sheets

(56) References Cited

U.S. PATENT DOCUMENTS

| | | | |
|---|---|---|---|
| 6,012,159 A * | 1/2000 | Fischer et al. | 714/755 |
| 6,088,454 A | 7/2000 | Nagashima et al. | |
| 7,359,507 B2 * | 4/2008 | Kaliski | 380/30 |
| 7,421,080 B2 * | 9/2008 | Matsumura et al. | 380/277 |
| 7,945,784 B1 * | 5/2011 | Masinter et al. | 713/180 |
| 8,074,068 B2 * | 12/2011 | Fujii et al. | 713/160 |
| 8,422,681 B2 * | 4/2013 | Gennaro et al. | 380/277 |
| 2012/0030464 A1 | 2/2012 | Nishmaki et al. | |

FOREIGN PATENT DOCUMENTS

| | | |
|---|---|---|
| JP | 2010 118968 | 5/2010 |
| WO | 2010 123114 | 10/2010 |

OTHER PUBLICATIONS

Kawashima, C., et al., "A Study on Hierarchical Secret Sharing Schemes Using Product and Concatenated Codes," IEICE Technical Report, vol. 107, No. 209, Total 23 Pages, (Aug. 31, 2007) (with English translation).

Kawashima, C., et al., "A Study on Hierarchical Secret Sharing Schemes Using Product Codes," Symposium on Crystography and Information Security Miyazaki, Total 19 Pages, (Jan. 22, 2008) (with English translation).

Fujita, H., et al., "Sharing Multilevel Secrets among Groups Using Concatenation of Reed-Solomon Codes," IEICE Technical Report, vol. 108, No. 472, pp. 65 to 70, (Mar. 2, 2009).

Kurosawa, K., et al., "Introduction to Modern Cryptography," Lecture Series in Elctronics, Information and Communication Engineers D-8, Total 8 pages, (Mar. 2004) (with partial English translation).

Shamir, A., "How to Share a Secret," Communications of the ACM, vol. 22, No. 11, pp. 612 to 613, (Nov. 1979).

International Standard Information Technology Security Techniques—Encryption Algorithms, "Part 2: Asymmetric ciphers," ISO/IEC 18033-2, Total 2 Pages, (2006).

Boyen, X., et al., "Identity-Based Crytography Standard (IBCS) #1: Supersingular Curve Implementation of the BF and BB1 Cryptosystems," Network Working Group, pp. 1 to 63, (Dec. 2007).

Blake, I., et al., "Elliptic Curves in Cryptography," London Mathematical Society Lecture Notes Series 265, Total 4 Pages, (Dec. 20, 2001).

Menezes, A., Elliptic Curve Public Key Cryptosystems, Kluwer Academic Publishers, Total 15 Pages, (1965).

Miller, V., et al., "Short Programs for functions on Curves," URL: http://crypto.stanford.edu/miller/miller.pdf, pp. 1 to 7, (May 6, 1986).

Miyaji, A., et al., "New Explicit Conditions of Elliptic Curve Traces for FR-Reduction," IEICE Trans. Fundamentals., vol. E84-A, No. 5, pp. 1234 to 1243, (May 2001).

Barreto, P., et al., "Contructing Elliptic Curves with Prescribed Embedding Degrees," SNC 2002, LNCS 2576, Total 11 Pages, (2003).

Dupont, R., et al., "Building curves with arbitrary small MOV degree over infinite prime fields," URL: httpp://eprint/iacr/org/2002/094/, pp. 1 to 13, (Jul. 18, 2002).

Katz, J., et al., "Predicate Encryption Supporting Disjunctions, Polynomial Equations, and Inner Products," LNCS, vol. 4965, pp. 146 to 162, (2008).

International Search Report Issued Aug. 23, 2011 in PCT/JP11/066693 Filed Jul. 22, 2011.

* cited by examiner

SECRET SHARING SYSTEM, SHARING APPARATUS, SHARE MANAGEMENT APPARATUS, ACQUISITION APPARATUS, SECRET SHARING METHOD, PROGRAM AND RECORDING MEDIUM

TECHNICAL FIELD

The present invention relates to a secret sharing technique.

BACKGROUND ART

In storage of secret information, risks of loss or destruction and theft of the secret information have to be considered. The risk of loss or destruction can be reduced by storing a plurality of pieces of secret information. However, this measure increases the risk of theft. A solution to eliminate both risks is a secret sharing scheme (SSS) (see Non-patent literatures 1 and 2, for example).

The secret sharing scheme is a scheme in which a plurality of pieces of share information $SH(1), \ldots, SH(N)$ are generated from secret information MSK and shared among and managed by a plurality of share management apparatuses $PA(1), \ldots, PA(N)$, and the secret information MSK can be reconstructed only when a predetermined number or more of the pieces of share information $SH(1)$ to $SH(N)$ are obtained. In the following, representative secret sharing schemes will be described.

(N, N) Threshold Secret Sharing Scheme:

According to an (N, N) threshold secret sharing scheme (referred to also as an "N-out-of-N sharing scheme" or "N-out-of-N threshold sharing scheme"), although the secret information MSK can be reconstructed if all the share information $SH(1), \ldots, SH(N)$ are given, the secret information MSK cannot be obtained at all when $N-1$ arbitrary pieces of share information $SH(\phi_1), \ldots,$ share$(\phi_{N-1})$ are given. The following is an example of the (N, N) threshold secret sharing scheme.

$SH_1, \ldots, SH_{N-1}$ are randomly selected.
$SH_N = MSK - (SH_1 + \ldots + SH_{N-1})$ is calculated.
Each piece of share information $SH_1, \ldots, SH_N$ is shared among a plurality of share management apparatuses $PA(1), \ldots, PA(N)$ for management.

If all the share information $SH_1, \ldots, SH_N$ are given, the secret information MSK can be reconstructed by a reconstruction processing according to $MSK = SH_1 + \ldots + SH_N$.

The calculation $MSK = SH_1 + \ldots + SH_N$ for reconstructing the secret information MSK from the share information $SH_1, \ldots, SH_N$ is linear. Therefore, if the reconstruction processing is performed for share information $SH'(1), \ldots, SH'(N)$ each piece of which is obtained by performing a linear calculation CALC for each piece of share information $SH(1), \ldots, SH(N)$ and a value $\sigma$ as operands, the result of the reconstruction processing is the result of the linear calculation CALC performed for the secret information MSK and the $\sigma$ as operands. For example, if the reconstruction processing is performed for share information $SH'(1) = \sigma \cdot SH(1), \ldots, SH'(N) = \sigma \cdot SH(N)$, the following value results.

$$\sigma \cdot SH(1) + \ldots + \sigma \cdot SH(N) = \sigma \cdot (SH(1) + \ldots + SH(N)) \quad (1)$$
$$= \sigma \cdot MSK$$

On the other hand, if the reconstruction processing is performed for share information $SH'(1), \ldots, SH'(N)$ each piece of which is obtained by performing a liner calculation CALC for each piece of share information $SH(1), \ldots, SH(N)$ and each of independent values $\sigma(1), \ldots, \sigma(N)$ as operands, in general, the result of a calculation that involves the secret information MSK as an operand cannot be obtained. For example, the reconstruction processing is performed for share information $SH'(1) = \sigma(1) \cdot SH(1), \ldots, SH'(N) = \sigma(N) \cdot SH(N)$, the following value results.

$$\sigma(1) \cdot SH(1) + \ldots + \sigma(N) \cdot SH(N) \quad (2)$$

$(K_t, N)$ Threshold Secret Sharing Scheme:

According to a $(K_t, N)$ threshold secret sharing scheme (referred to also as a "$K_t$-out-of-N sharing scheme" or "$K_t$-out-of-N threshold secret sharing scheme"), although the secret information MSK can be reconstructed if $K_t$ different arbitrary pieces of share information $SH(\phi_1), \ldots, SH(\phi_{K_t})$ are given, the secret information MSK cannot be obtained at all if $K_t-1$ arbitrary pieces of share information $SH(\phi_1), \ldots, SH(\phi_{K_t-1})$ are given. The subscript "Kt" means $K_t$. The following is an example of the $(K_t, N)$ threshold secret sharing scheme.

A $K_t-1$-th order polynomial $f(x) = \xi_0 + \xi_1 \cdot x + \xi_2 \cdot x^2 + \ldots + \xi_{K_t-1} \cdot x^{K_t-1}$ that satisfies $f(0) = MSK$ is randomly selected. That is, $\xi_0 = MSK$ is set, and $\xi_1, \ldots, \xi_{K_t-1}$ are randomly selected. The share information is denoted by $SH_\rho = (\rho, f(\rho))$ $(\rho = 1, \ldots, N)$.

If $K_t$ different arbitrary pieces of share information $SH(\phi_1), \ldots, SH(\phi_{K_t}) ((\phi_1, \ldots, \phi_{K_t}) \subset (1, \ldots, N))$ are obtained, the secret information MSK can be reconstructed by the following reconstruction processing using the Lagrange's interpolation formula, for example.

$$MSK = f(0) = \lambda_1 \cdot f(\phi_1) + \ldots + \lambda_{K_t} \cdot f(\phi_{K_t}) \quad (3)$$

$$\lambda_\rho(x) = \frac{(x - \phi_1) \ldots \overset{\rho}{\vee} \ldots (x - \phi_{K_t})}{(\phi_\rho - \phi_1) \ldots \overset{\rho}{\vee} \ldots (\phi_\rho - \phi_{K_t})} \in F_q \quad (4)$$

Note that

"$\ldots \overset{\rho}{\vee} \ldots$"

means that there is not the $\rho$-th operand from the top [the denominator element $(\phi_\rho - \phi_\rho)$, the numerator element $(x - \phi_\rho)$]. That is, the denominator of formula (4) is as follows.

$$(\phi_\rho - \phi_1) \cdot \ldots \cdot (\phi_\rho - \phi_{\rho-1}) \cdot (\phi_\rho - \phi_{\rho+1}) \cdot \ldots \cdot (\phi_\rho - \phi_{K_t})$$

The numerator of formula (4) is as follows.

$$(x - \phi_1) \cdot \ldots \cdot (x - \phi_{\rho-1}) \cdot (x - \phi_{\rho+1}) \cdot \ldots \cdot (x - \phi_{K_t})$$

These relations hold on a field.

The calculation expressed by the formula (3) is linear. Therefore, the value reconstructed from the share information $SH'(\phi_1), \ldots, SH'(\phi_{K_t})$ each piece of which is obtained by performing the linear calculation CALC for each piece of share information $SH(\phi_1), \ldots, SH(\phi_{K_t})$ and the value $\sigma$ as operands is equal to the result of the linear calculation CALC performed for the secret information MSK and the value $\sigma$ as operands. On the other hand, if the reconstruction processing is performed for share information $SH'(\phi_1), \ldots, SH'(\phi_{K_t})$ each piece of which is obtained by performing the liner calculation CALC for each piece of share information $SH(\phi_1), \ldots, SH(\phi_{K_t})$ and each of independent values $\sigma(\phi_1), \ldots, \sigma(\phi_{K_t})$ as operands, in general, the result of a calculation that involves the secret information MSK as an operand cannot be obtained.

PRIOR ART LITERATURE

Non-Patent Literature

Non-patent literature 1: Kaoru Kurosawa and Wakaha Ogata, "Introduction of Modern Cryptography (Electronics, information and communication lectures series)," Corona Publishing Co., LTD., March 2004, p. 116 to 119.

Non-patent literature 2: A. Shamir, "How to Share a Secret," Communications of the ACM, November 1979, Volume 22, Number 11, pp. 612 to 613.

SUMMARY OF THE INVENTION

Problems to be Solved by the Invention

A scheme that satisfies the following conditions is contemplated.

(Condition 1) A sharing apparatus performs the secret sharing of secret information MSK to generate a plurality of pieces of share information $SH(1), \ldots, SH(N)$, which are distributed among and managed by a plurality of share management apparatuses $PA(1), \ldots, PA(N)$.

(Condition 2) Each share management apparatus $PA(1), \ldots, PA(N)$ performs a certain calculation.

(Condition 3) An acquisition apparatus cannot obtain the secret information MSK but can obtain generation information corresponding to the result of a calculation that involves the secret information MSK and an arbitrary value σ as operands if the calculation results are given from a predetermined number or more of share management apparatuses.

However, such a scheme is difficult to implement. That is, if the share management apparatuses $PA(1), \ldots, PA(N)$ perform their respective calculations using independent values $\sigma(1), \ldots, \sigma(N)$, the acquisition apparatus cannot properly perform the reconstruction processing using the calculation results from the share management apparatuses as the share information and thus cannot obtain desired generation information. However, since the value σ can be used for estimating the generation information, it is unfavorable from the viewpoint of security that all the share management apparatuses $PA(1), \ldots, PA(N)$ share the same value σ.

The present invention has been made in view of such circumstances, and an object of the present invention is to provide a secure scheme that satisfies the conditions 1 to 3 described above.

Means to Solve the Problems

According to the present invention, a sharing apparatus, $\Sigma_{\alpha=1}^{L} h(\alpha)$ share management apparatuses $PA(\alpha, h(\alpha))$ ($\alpha=1, \ldots, L$, $L \geq 2$, $h(\alpha)=1, \ldots, H(\alpha)$, $H(\alpha) \geq 2$) and an acquisition apparatus cooperate to perform a secret sharing processing. The sharing apparatus independently performs the secret sharing of a value corresponding to each element $\theta(\psi, i, \beta) \cdot g_2$ of basis vectors $b_i^*(\psi)$ among each subset $SUB(\alpha)$ consisting of $H(\alpha)$ share management apparatuses $PA(\alpha, 1), \ldots, PA(\alpha, H(\alpha))$ according to a predetermined secret sharing scheme to generate share information $SH(\psi, i, \beta, \alpha, h(\alpha))$ ($h(\alpha)=1, \ldots, H(\alpha)$) corresponding to each element $\theta(\psi, i, \beta) \cdot g_2$, provided that denotes an integer equal to or greater than 1, ψ denotes an integer equal to or greater than 0 and equal to or smaller than Ψ (ψ=0, ..., Ψ, n(ψ) denotes an integer equal to or greater than 1, ζ(ψ) denotes an integer equal to or greater than 0, $g_2$ denotes a generator of a cyclic group $G_2$, and the basis vectors $b_i^*(\psi)$ are $n(\psi)+\zeta(\psi)$-dimensional vectors for $\theta(\psi, i, \beta)$ ($i=1, \ldots, n(\psi)+\zeta(\psi), \beta=1, \ldots, n(\psi)+\zeta(\psi), n(\psi) \geq 1, \zeta(\psi) \geq 1$) whose elements are $n(\psi)+\zeta(\psi)$ elements of the cyclic group $G_2$ (i.e., $b_i^*(\psi)=(\theta(\phi, i, 1) \cdot g_2, \ldots, \theta(\psi, i, n(\psi)+\zeta(\psi)) \cdot g_2) \in G_2^{n(\psi)+\zeta(\psi)}$). The share management apparatus $PA(\alpha, h(\alpha))$ generates share secret values $DSH(\psi, \alpha, h(\alpha))$ by performing a common calculation common in the subset $SUB(\alpha)$ on common information shared in the subset $SUB(\alpha)$ and the share information $SH(\psi, i, \beta, \alpha, h(\alpha))$ ($h(\alpha)=1, \ldots, H(\alpha)$). The acquisition apparatus generates reconstructed secret values $SUBSK(\psi, \alpha)$ for each subset $SUB(\alpha)$ from a plurality of the share secret values $DSH(\psi, \alpha, h(\alpha))$ for the subset $SUB(\alpha)$ by performing a reconstruction processing for the subset $SUB(\alpha)$ according to the secret sharing scheme, and generates generation information $D^*(\psi)$ from the reconstructed secret values $SUBSK(\psi, \alpha)$.

According to the present invention, the basis vectors $b_i^*(\psi)$, which are the secret information, are independently secret-shared among the subset $SUB(\alpha)$, and the share secret values $DSH(\psi, \alpha, h(\alpha))$ are generated using common information shared in each subset $SUB(\alpha)$. In this case, in each subset $SUB(\alpha)$, the reconstruction processing using the share secret values $DSH(\psi, \alpha, h(\alpha))$ as share information can be properly performed. The common information is shared in each subset $SUB(\alpha)$ but is not shared among all the share management apparatuses $PA(\alpha, h(\alpha))$, so that high security is ensured.

Effects of the Invention

As described above, the present invention can provide a secure scheme that satisfies the conditions 1 to 3 described above.

DETAILED DESCRIPTION OF THE EMBODIMENTS

Figure 1:
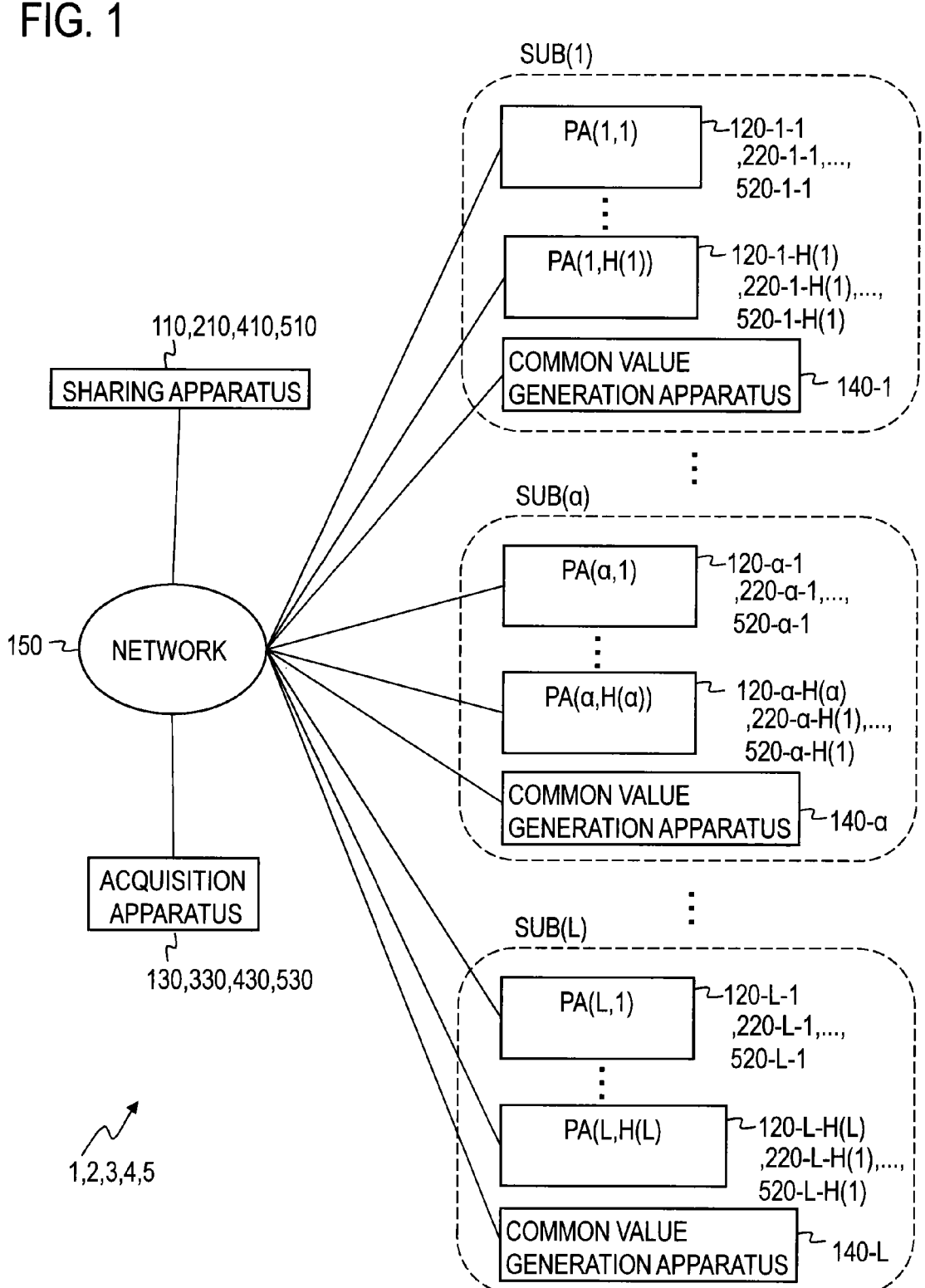
FIG. 1 is a block diagram for illustrating a general configuration of a secret sharing system according to a first embodiment.

In the following, embodiments of the present invention will be described with reference to the drawings.

First Embodiment

First, a first embodiment of the present invention will be described.

DEFINITIONS

Terms and symbols used in the description of this embodiment will be defined below.

$F_q$: $F_q$ represents a finite field having an order q. The order q is an integer equal to or greater than 1, which is a prime number or a power of a prime number, for example. For example, the finite field $F_q$ is a prime field or an extension field of a prime field. If the finite field $F_q$ is a prime field, it can be easily constructed by a remainder calculation modulo q, for example. If the finite field $F_q$ is an extension field, it can be easily constructed by a remainder calculation modulo an irreducible polynomial, for example. A specific construction method for the finite field $F_q$ is disclosed in Reference literature 1 (ISO/IEC 18033-2: Information technology—Security techniques—Encryption algorithms—Part 2: Asymmetric ciphers).

$0_F$: $0_F$ represents an additive identity of the finite field $F_q$.

$1_F$: $1_F$ represents a multiplicative identity of the finite field $F_q$.

E: E represents an elliptic curve defined on the finite field $F_q$. The elliptic curve E is a set of points comprising a set of points (x, y) consisting of x and y∈$F_q$ that satisfy the following Weierstrass equation in an affine coordinate system and a particular point O referred to as a point of infinity.

$$y^2 + a_1 \cdot x \cdot y + a_3 \cdot y = x^3 + a_2 \cdot x^2 + a_4 \cdot x + a_6$$

In the formula, $a_1, a_2, a_3, a_4, a_6 \in F_q$.

A binary calculation + referred to as an elliptic curve addition is defined for arbitrary two points on the elliptic curve E, and a monadic calculation—referred to as an inverse calculation is defined for an arbitrary one point on the elliptic curve E. The facts that a finite set comprising rational points on the elliptic curve E forms a group with respect to the elliptic curve addition and that a calculation referred to as an elliptic curve scalar multiplication can be defined using the elliptic curve addition and specific methods of elliptic curve addition or other elliptic calculations on a computer are well known (see Reference literature 1, Reference literature 2 (RFC 5091: Identity-Based Cryptography Standard (IBCS) #1: Supersingular Curve Implementations of the BF and BB1 Cryptosystems), and Reference literature 3 (Ian F. Blake, Gadiel Serrousi and Nigel P. Smart, "Elliptic Curve Cryptography" published by Pearson Education, ISBN4-89471-431-0), for example).

The finite set comprising the rational points on the elliptic curve E has a subgroup having an order p (p≥1). For example, provided that the number of elements of the finite set comprising rational points on the elliptic curve E is denoted by #E, and p is a large prime number that divides #E, a finite set E[p] consisting of p-division points on the elliptic curve E forms a subgroup of the finite set consisting of the rational points on the elliptic curve E. The "p-division points on the elliptic curve E" means those of the points A on the elliptic curve E whose elliptic curve scalar products p·A on the elliptic curve E satisfy a relation p·A=O.

G: G represents a cyclic group. Specific examples of the cyclic group G include the finite set E[p] comprising p-division points on the elliptic curve E, a subgroup thereof and a quotient group thereof. In this embodiment, a calculation defined on the cyclic group G is additively expressed. That is, $\chi \cdot \Omega \in G$ for $\chi \in F_q$ and $\Omega \in G$ means that a calculation defined on the cyclic group G is performed $\chi$ times on $\Omega \in G_1$, and $\Omega_1 + \Omega_2 \in G$ for $\Omega_1$ and $\Omega_2 \in G$ means that a calculation defined on the cyclic group G is performed on operands $\Omega_1 \in G$ and $\Omega_2 \in G$.

g: g represents a generator of the cyclic group G

<General Configuration>

FIG. 1 is a block diagram for illustrating a general configuration of a secret sharing system according to the first embodiment.

As illustrated in FIG. 1, a secret sharing system 1 according to this embodiment comprises a sharing apparatus 110, $\Sigma_{\alpha=1}^{L}$ h($\alpha$) share management apparatuses [PA($\alpha$, h($\alpha$))] ($\alpha$=1, ..., L, L≥2, h($\alpha$)=1, ..., H($\alpha$), H($\alpha$)≥2)] 120-$\alpha$-h($\alpha$), an acquisition apparatus 130 and common value generation apparatuses 140-1 to 140-L, which can communicate with each other via a network 150. For simplicity of explanation, this embodiment will be described with regard to an example where there are only one sharing apparatus 110 and only one acquisition apparatus 130, there can be two or more sharing apparatuses 110 and two or more acquisition apparatuses 130. Similarly, this embodiment will be described with regard to an example where there is only one set of $\Sigma_{\alpha=1}^{L}$ h($\alpha$) share management apparatuses [PA($\alpha$, h($\alpha$))] 120-$\alpha$-h($\alpha$), there can be a plurality of such sets.

As illustrated in FIG. 1, the set of $\Sigma_{\alpha=1}^{L}$ h($\alpha$) share management apparatuses [PA($\alpha$, h($\alpha$))] 120-$\alpha$-h($\alpha$) is divided into a plurality of subsets SUB($\alpha$) each consisting of H($\alpha$) share management apparatuses PA($\alpha$, 1), ..., PA($\alpha$, H($\alpha$)). Each subset SUB($\alpha$) is associated with a common value generation apparatus 140-$\alpha$ that generates a common value $\sigma$($\alpha$) shared in the subset SUB($\alpha$).

<Sharing Apparatus 110>

Figure 2:
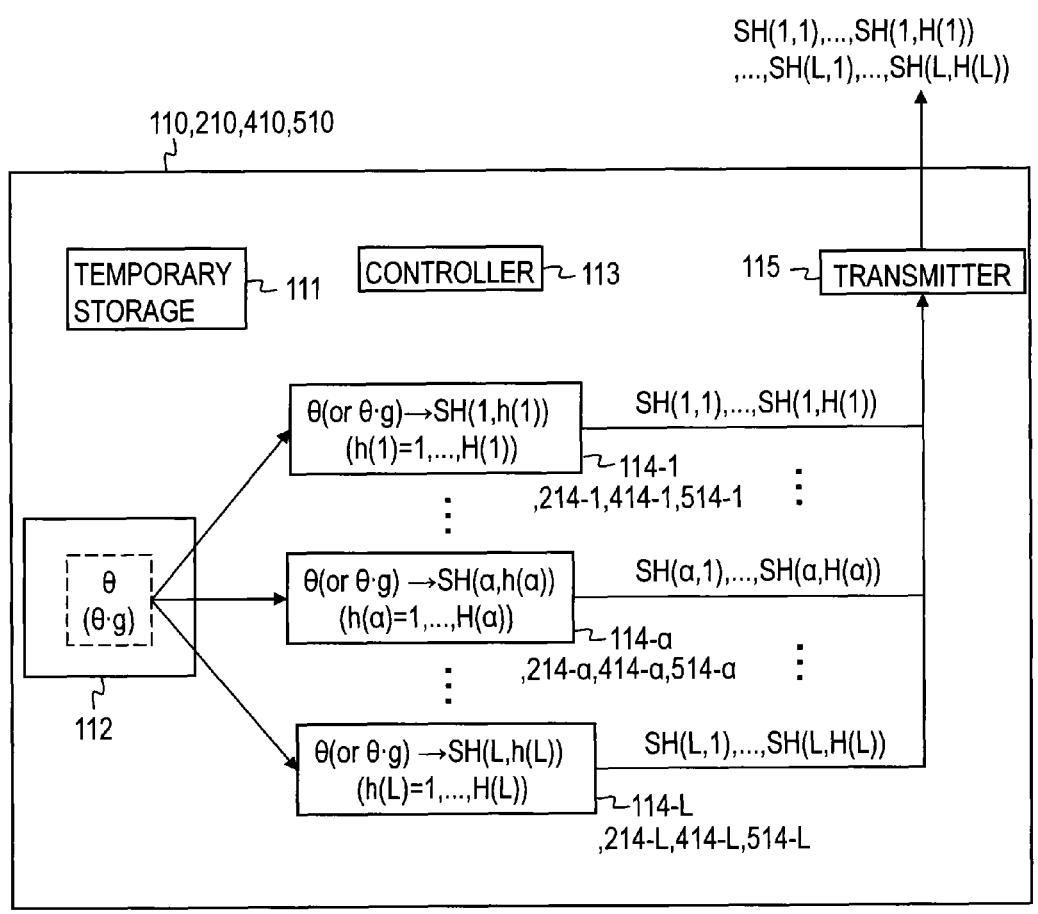
FIG. 2 is a block diagram for illustrating a configuration of a sharing apparatus shown in FIG. 1.
Figure 5A:
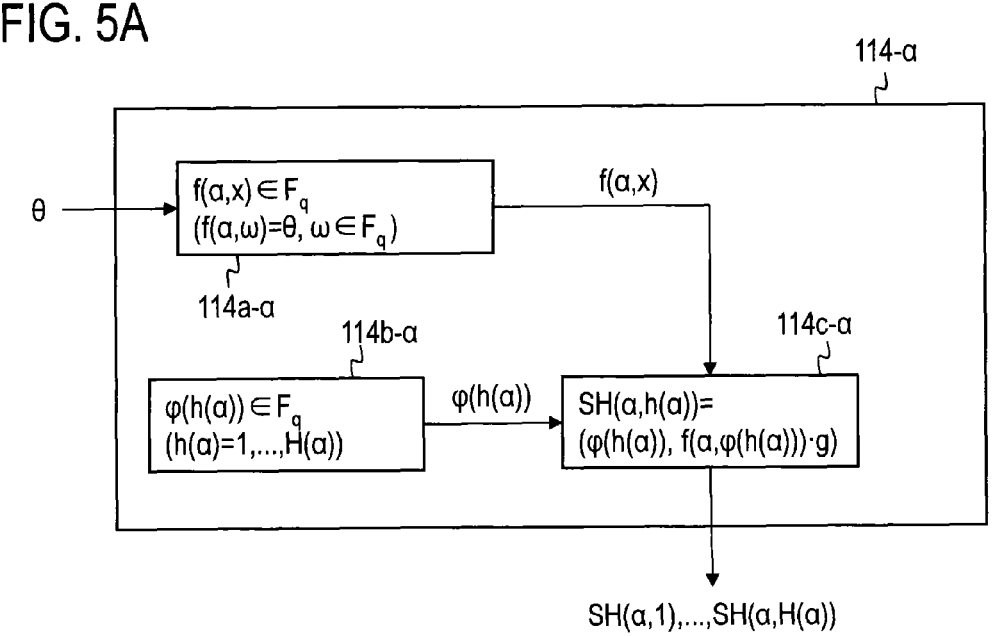
FIG. 5A is a block diagram for illustrating details of a secret sharing unit shown in FIG. 2.

FIG. 2 is a block diagram for illustrating a configuration of the sharing apparatus 110 shown in FIG. 1. FIG. 5A is a block diagram for illustrating details of a secret sharing unit 114-$\alpha$ shown in FIG. 2.

As illustrated in FIG. 2, the sharing apparatus 110 according to this embodiment comprises a temporary storage 111, a storage 112, a controller 113, secret sharing units 114-$\alpha$ ($\alpha$=1, ..., L) and a transmitter 115. As illustrated in FIG. 5A, the secret sharing unit 114-$\alpha$ according to this embodiment has a function selection unit 114$a$-$\alpha$, an index generation unit 114$b$-$\alpha$ and a sharing processing unit 114$c$-$\alpha$.

The sharing apparatus 110 according to this embodiment is a particular apparatus including a well-known or dedicated computer comprising a central processing unit (CPU), a random access memory (RAM), a read-only memory (ROM) and the like and a particular program. More specifically, the temporary storage 111 and the storage 112 are storage areas provided by a RAM, a register, a cache memory, an element in an integrated circuit or an auxiliary storage device, such as a hard disk, or a combination of at least some of these devices.

The controller 113 and the secret sharing unit 114-$\alpha$ ($\alpha$=1, ..., L) are processing units implemented by the CPU executing a predetermined program. At least part of the controller 113 and the secret sharing unit 114-$\alpha$ ($\alpha$=1, ..., L) can be a particular integrated circuit. The transmitter 115 is a communication device, such as a modem and a local area network (LAN) card.

The sharing apparatus 110 performs each processing under the control of the controller 113. Although only simply described in the following, every data output from each processing unit is stored in the temporary storage 111 or the storage 112. The data stored in the temporary storage 111 or the storage 112 is read as required and input to each processing unit for the processing thereof.

<Share Management Apparatus [PA($\alpha$, h($\alpha$))] 120-$\alpha$-h($\alpha$)>

Figure 3A:
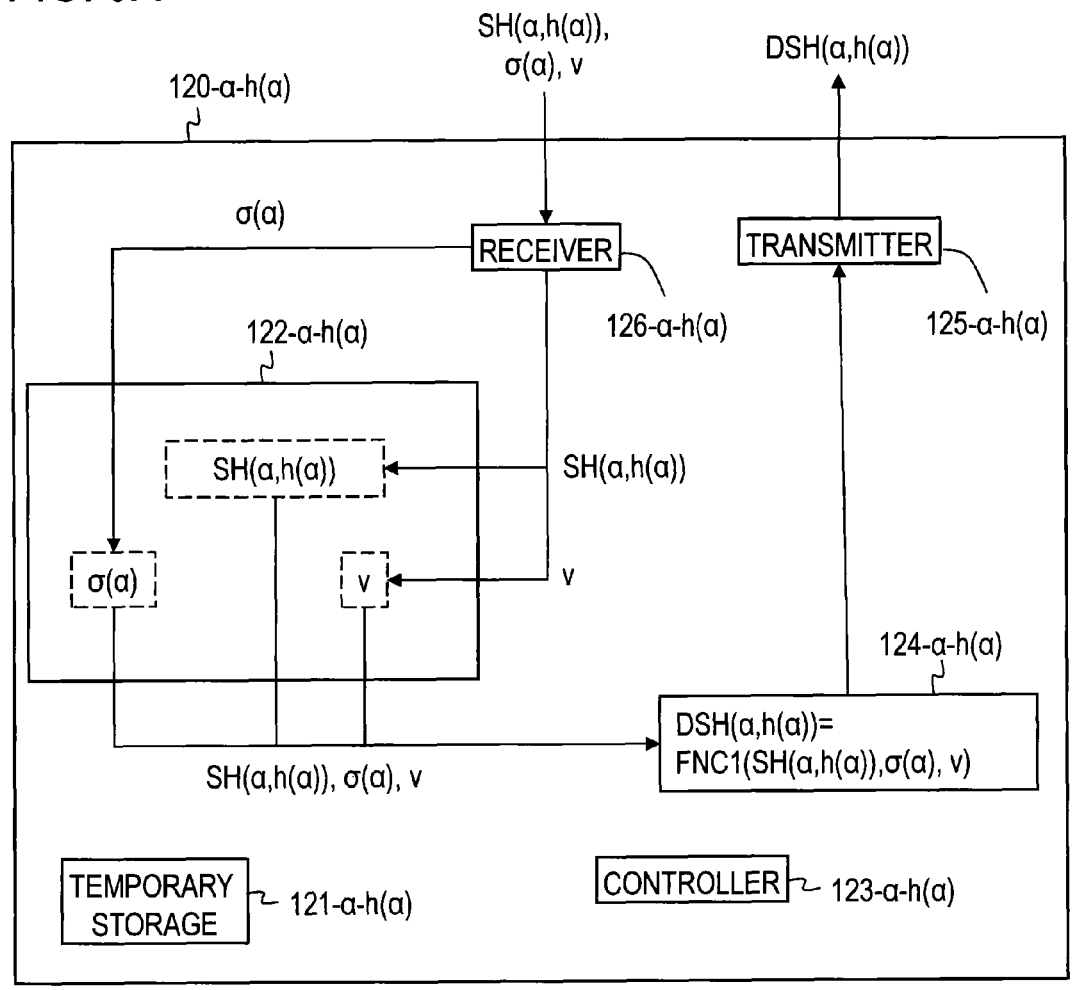
FIG. 3A is a block diagram for illustrating a configuration of a share management apparatus according to the first embodiment.
Figure 5B:
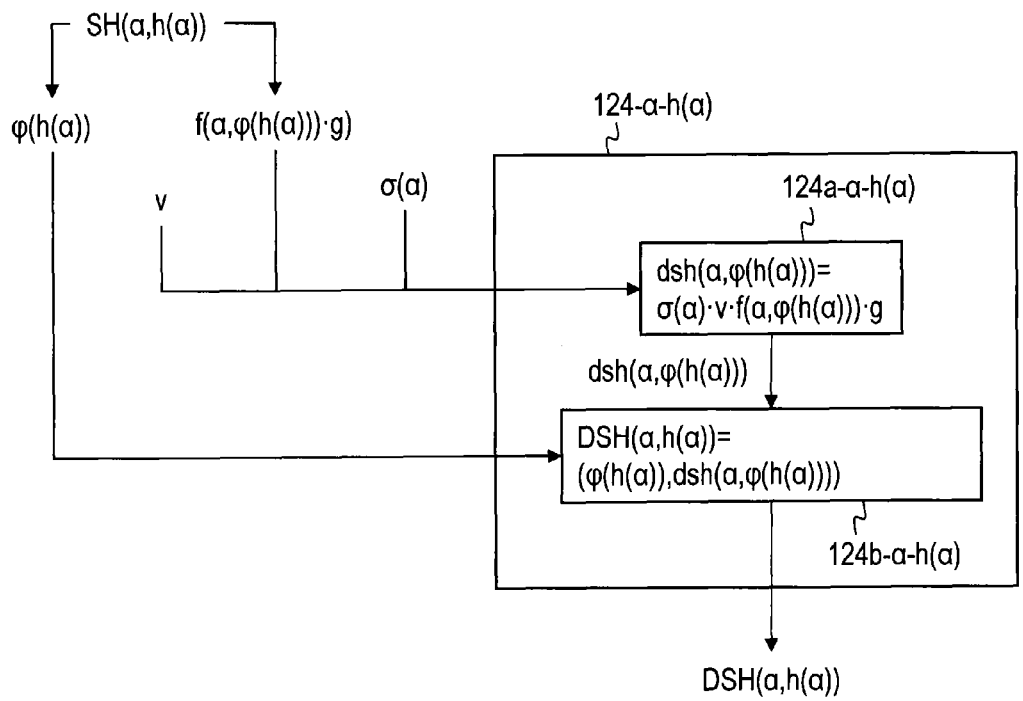
FIG. 5B is a block diagram for illustrating details of a share secret value generation unit shown in FIG. 3A.

FIG. 3A is a block diagram for illustrating a configuration of the share management apparatus [PA($\alpha$, h($\alpha$))] 120-$\alpha$-h($\alpha$) according to the first embodiment. FIG. 5B is a block diagram for illustrating details of a share secret value generation unit 124-$\alpha$-h($\alpha$) shown in FIG. 3A.

As illustrated in FIG. 3A, the share management apparatus [PA($\alpha$, h($\alpha$))] 120-$\alpha$-h($\alpha$) has a temporary storage 121-$\alpha$-h($\alpha$), a storage 122-$\alpha$-h($\alpha$), a controller 123-$\alpha$-h($\alpha$), a share secret value generation unit 124-$\alpha$-h($\alpha$), a transmitter 125-$\alpha$-h($\alpha$) and a receiver 126-$\alpha$-h($\alpha$). As illustrated in FIG. 5B, the share secret value generation unit 124-$\alpha$-h($\alpha$) has a linear calculation unit 124$a$-$\alpha$-h($\alpha$) and a share secret value synthesis unit 124$b$-$\alpha$-h($\alpha$).

The share management apparatus [PA($\alpha$, h($\alpha$))] 120-$\alpha$-h($\alpha$) is a particular apparatus including a well-known or dedicated computer comprising a CPU, a RAM, a ROM and the like and a particular program. More specifically, the temporary storage 121-$\alpha$-h($\alpha$) and the storage 122-$\alpha$-h($\alpha$) are storage areas provided by a RAM, a register, a cache memory, an element in an integrated circuit or an auxiliary storage device, such as a hard disk, or a combination of at least some of these devices. The controller 123-$\alpha$-h($\alpha$) and the share secret value generation unit 124-$\alpha$-h($\alpha$) are processing units implemented by the CPU executing a predetermined program. At least part of the controller 123-$\alpha$-h($\alpha$) and the share secret value generation unit 124-$\alpha$-h($\alpha$) can be a particular integrated circuit. The transmitter 125-$\alpha$-h($\alpha$) and the receiver 126-$\alpha$-h($\alpha$) are communication devices, such as a modem and a local area network (LAN) card.

The share management apparatus [PA($\alpha$, h($\alpha$))] 120-$\alpha$-h($\alpha$) performs each processing under the control of the controller 123-$\alpha$-h($\alpha$). Although only simply described in the following, every data output from each processing unit is stored in the temporary storage 121-$\alpha$-h($\alpha$) or the storage 122-$\alpha$-h($\alpha$). The data stored in the temporary storage 121-$\alpha$-h($\alpha$) or the storage 122-$\alpha$-h($\alpha$) is read as required and input to each processing unit for the processing thereof.

<Common Value Generation Apparatus 140-$\alpha$>

Figure 3B:
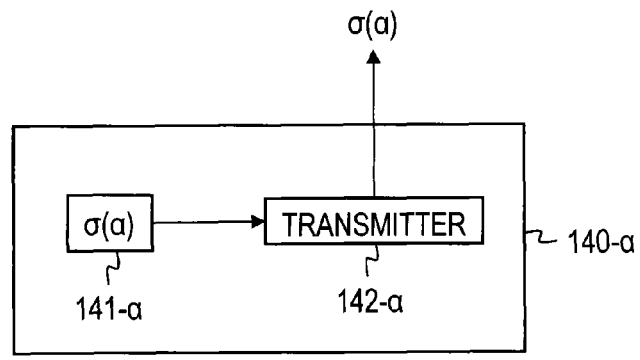
FIG. 3B is a block diagram for illustrating a configuration of a common value generation apparatus according to the first embodiment.

FIG. 3B is a block diagram for illustrating a configuration of the common value generation apparatus 140-$\alpha$ according to the first embodiment.

As illustrated in FIG. 3B, the common value generation apparatus 140-$\alpha$ according to this embodiment has a random number generation unit 141-$\alpha$ and a transmitter 142-$\alpha$. The common value generation apparatus 140-$\alpha$ according to this embodiment is a particular apparatus including a well-known or dedicated computer comprising a CPU, a RAM, a ROM and the like and a particular program, for example. And the random number generation unit 141-$\alpha$ can be a particular integrated circuit.

<Acquisition Apparatus 130>

Figure 4:
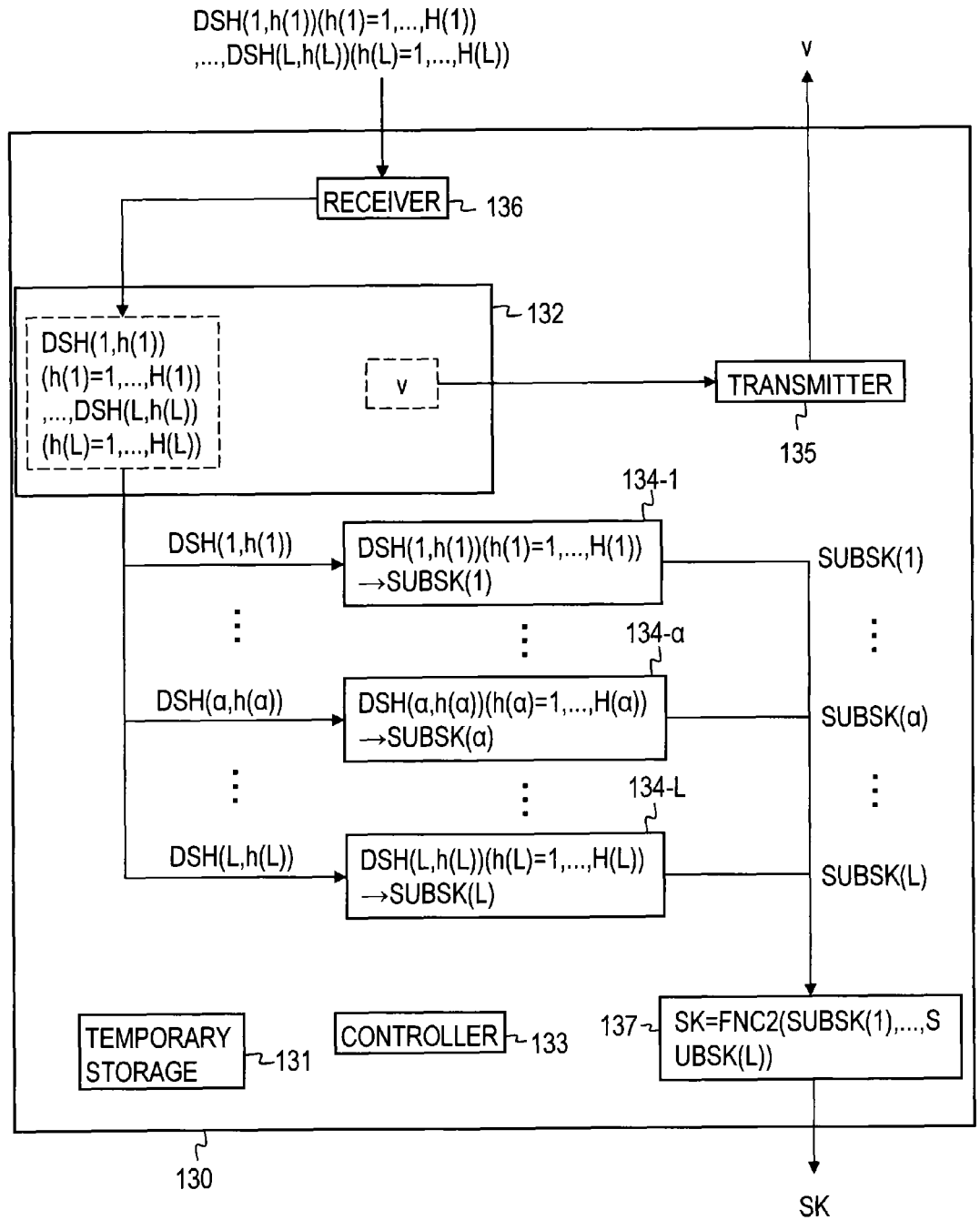
FIG. 4 is a block diagram for illustrating a configuration of an acquisition apparatus according to the first embodiment.
Figure 6:
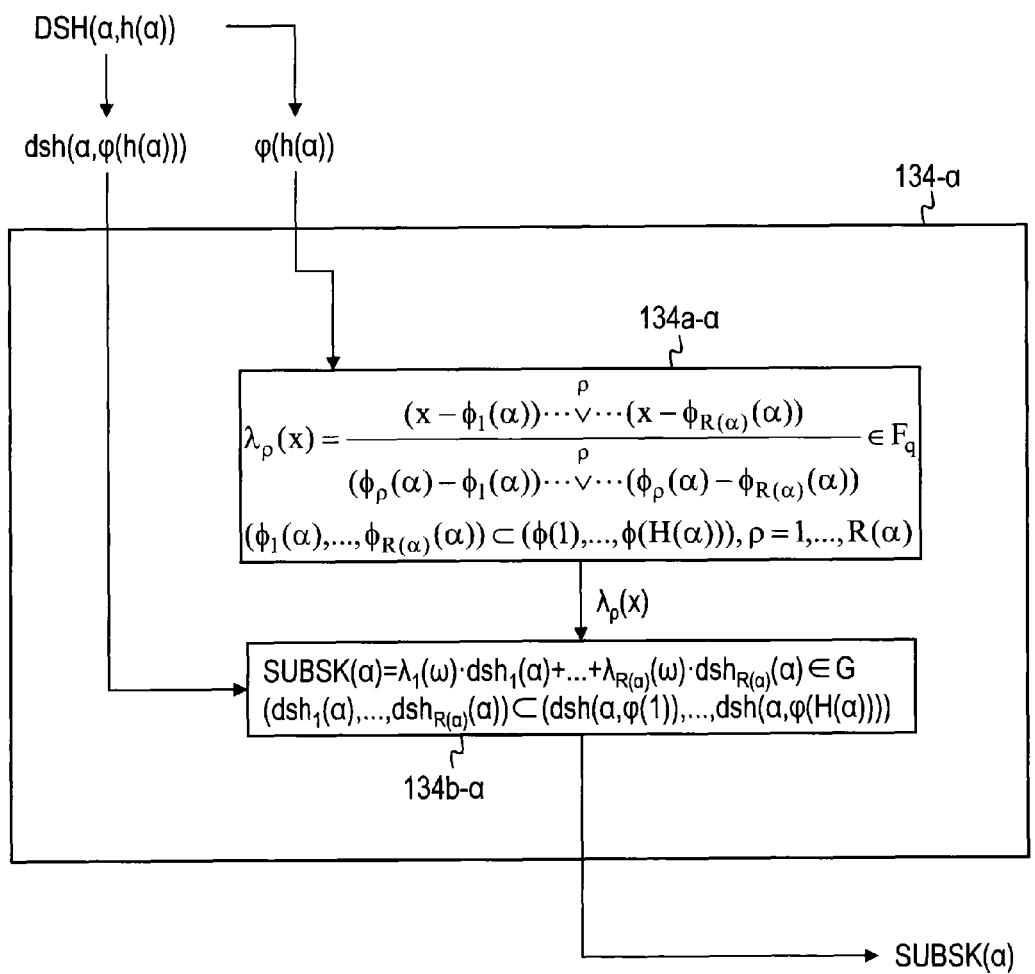
FIG. 6 is a block diagram for illustrating details of a reconstruction unit shown in FIG. 4.

FIG. 4 is a block diagram for illustrating a configuration of the acquisition apparatus 130 according to the first embodiment. FIG. 6 is a block diagram for illustrating details of a reconstruction unit 134-α shown in FIG. 4.

As illustrated in FIG. 4, the acquisition apparatus 130 according to this embodiment has a temporary storage 131, a storage 132, a controller 133, reconstruction units 134-α (α=1, . . . , L), a synthesis unit 137, a transmitter 135 and a receiver 136. As illustrated in FIG. 6, the reconstruction unit 134-α has a coefficient calculation unit 134a-α and a polynomial calculation unit 134b-α.

The acquisition apparatus 130 according to this embodiment is a particular apparatus including a well-known or dedicated computer comprising a CPU, a RAM, a ROM and the like and a particular program. More specifically, the temporary storage 131 and the storage 132 are storage areas provided by a RAM, a register, a cache memory, an element in an integrated circuit or an auxiliary storage device, such as a hard disk, or a combination of at least some of these devices. The controller 133, the reconstruction units 134-α (α=1, . . . , L) and the synthesis unit 137 are processing units implemented by the CPU executing a predetermined program, for example. At least part of the controller 133, the reconstruction units 134-α (α=1, . . . , L) and the synthesis unit 137 can be a particular integrated circuit. The transmitter 135 and the receiver 136 are communication devices, such as a modem and a local area network (LAN) card, for example.

The acquisition apparatus 130 performs each processing under the control of the controller 133. Although only simply described in the following, every data output from each processing unit is stored in the temporary storage 131 or the storage 132. The data stored in the temporary storage 131 or the storage 132 is read as required and input to each processing unit for the processing thereof.

<Secret Sharing Processing>

A secret sharing processing according to this embodiment will be described.

[Preprocessing]

As a preprocessing for the secret sharing processing according to this embodiment, information $\theta \in F_q$ for identifying secret information $\theta \cdot g \in G$ is stored in the storage 112 of the sharing apparatus 110.

[General Description of Secret Sharing Processing]

Figure 7:
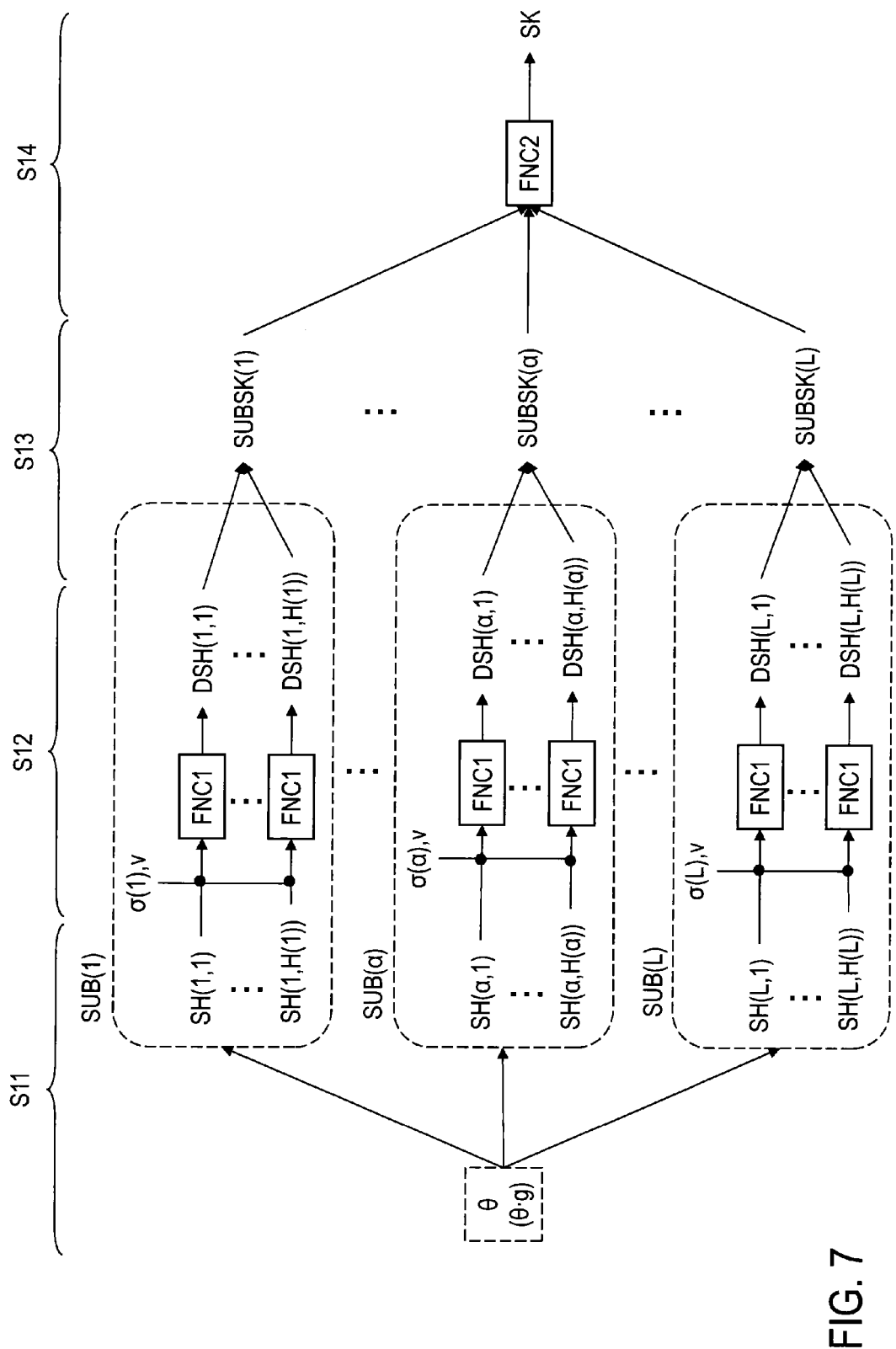
FIG. 7 is a diagram for generally illustrating a secret sharing processing according to the first embodiment.

FIG. 7 is a diagram for generally illustrating the secret sharing processing according to the first embodiment. In the following, the secret sharing processing according to this embodiment will be generally described with reference to FIG. 7.

According to this embodiment, first, the sharing apparatus 110 (FIG. 1) independently performs the secret sharing of the secret information $\theta \cdot g \in G$ among each subset SUB(α) to generate pieces of share information SH(α, h(α)) (h(α)= 1, . . . , H(α)) and outputs the share information SH(α, h(α)) (Step S11). The pieces of share information SH(α, h(α)) are transmitted and distributed to the respective share management apparatuses [PA(α, h(α))] 120-α-h(α) via the network 150.

Each share management apparatus [PA(α, h(α))] 120-α-h (α) having received the corresponding share information SH(α, h(α)) performs a predetermined common calculation using the share information SH(α, h(α)) and the common information including a common value σ(α) shared in the subset SUB(α) to generate share secret value DSH(α, h(α)), and outputs the share secret value DSH(α, h(α)) (Step S12).

According to this embodiment, the common values σ(α) shared in different subsets SUB(α) are independent of each other. The share management apparatuses [PA(α, h(α))] 120-α-h(α) belonging to the same subset SUB(α) use the same "common information." In particular, the "common information" illustrated in this embodiment includes the common value σ(α) and provided information v common to all the share management apparatuses PA(α, h(α)) 120-α-h(α) provided by the acquisition apparatus 130. The share management apparatuses [PA(α, h(α))] 120-α-h(α) belonging to the same subset SUB(α) perform the same "common calculation". According to this embodiment, all the "common calculations" are the same. The "common calculation" according to this embodiment is a linear calculation.

The share secret value DSH(α, h(α)) output from each share management apparatus [PA(α, h(α))] 120-α-h(α) is transmitted to the acquisition apparatus 130 via the network 150. The acquisition apparatus 130 generates a reconstructed secret value SUBSK(α) by performing a reconstruction processing for each subset SUB(α) using a plurality of share secret values DSH(α, h(α)) for the subset SUB(α) (Step S13).

Then, the acquisition apparatus 130 generates generation information SK using the reconstructed secret value SUBSK (α) generated for each subset SUB(α) and outputs the generation information SK (Step S14). According to this embodiment, the acquisition apparatus 130 generates the generation information SK by linear combination of the reconstructed secret values SUBSK(α).

[Processing of Sharing Apparatus (Step S11)]

Figure 8A:
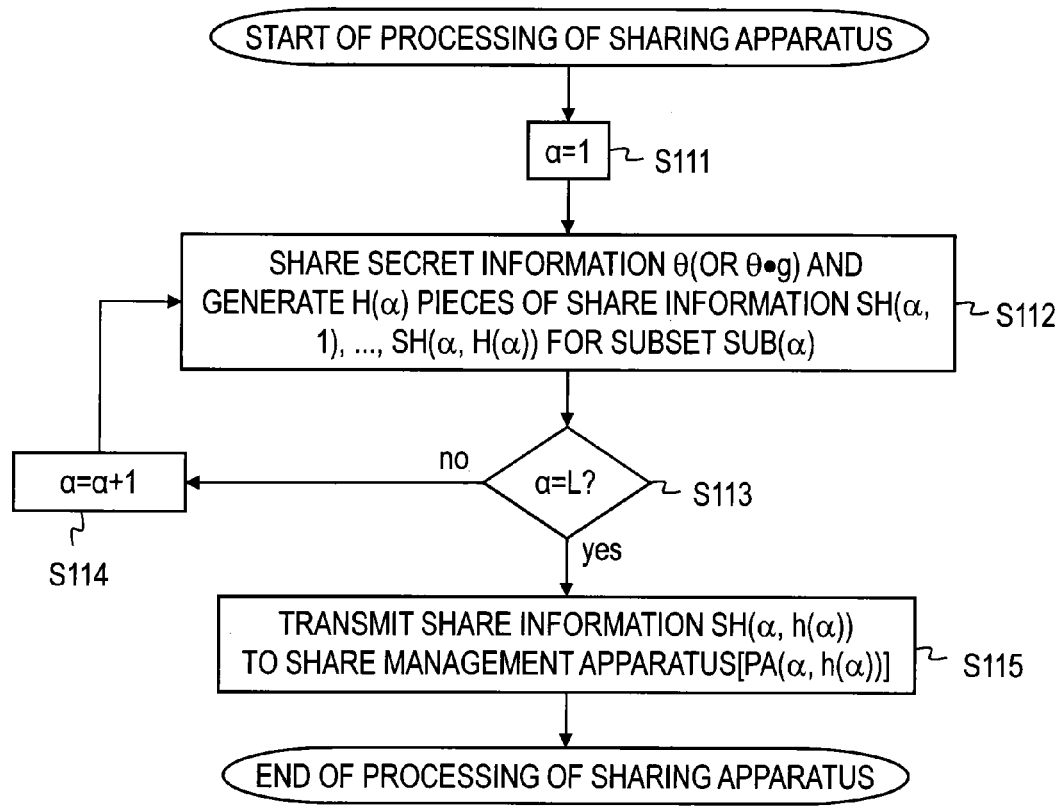
FIG. 8A is a diagram for illustrating a processing of the sharing apparatus according to the first embodiment.
Figure 8B:
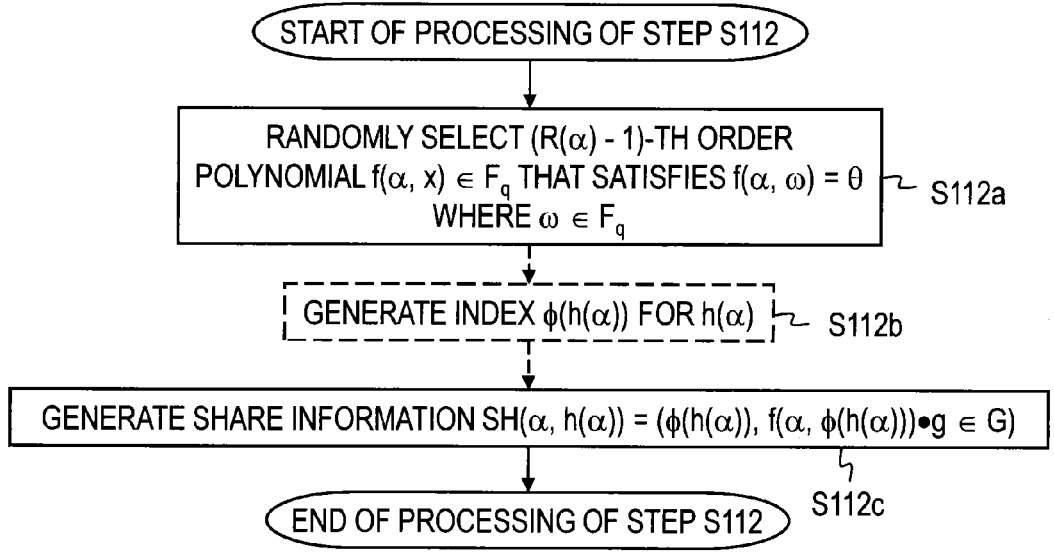
FIG. 8B is a diagram for illustrating details of a processing of Step S112.

FIG. 8A is a diagram for illustrating a processing of the sharing apparatus according to the first embodiment, and FIG. 8B is a diagram for illustrating details of the processing of Step S112. In the following, details of the processing of the sharing apparatus 110 will be described with reference to these drawings.

First, the controller 113 of the sharing apparatus 110 (FIG. 2) sets α at 1 (α=1) and stores the setting in the temporary storage 111 (Step S111). Then, the information $\theta \in F_q$ for identifying the secret information $\theta \cdot g \in G$ is read from the storage 112 and input to the secret sharing unit 114-α. The secret sharing unit 114-α shares the secret information $\theta \cdot g$ or the information $\theta$ using the information $\theta \in F_q$ according to a predetermined secret sharing scheme to generate H(α) pieces of share information SH(α, 1), . . . , SH(α, H(α)) for each of the subsets SUB(α) and outputs the share information (Step S112).

<<Details of Step S112>>

The secret sharing unit 114-α according to this embodiment generates the share information SH(α, h(α)) (h(α)= 1, . . . , H(α)) for each subset SUB(α) by sharing the secret information according to an (R(α), H(α)) threshold secret sharing scheme (R(α) is a constant that satisfies a relation: R(α)<H(α)).

As illustrated in FIG. 8B, first, the function selection unit 114a-α of the secret sharing unit 114-α (FIG. 5A) randomly selects an R(α)-1-th order polynomial $f(α, x) \in F_q$ that satisfies a relation $f(α, ω)=θ$ with regard to a predetermined element ω of the finite field $F_q$ ($ω \in F_q$) and outputs the polynomial (Step S112a). Note that x represents a variable that is an element of the finite field $F_q$, and the $ω \in F_q$ is $0_F$, for example.

Then, the index generation unit 114b-α generates respective indexes $φ(h(α)) \in F_q$ for h(α)=1, . . . , H(α) and outputs the indexes (Step S112b). Note that the processing of Step S112b can be omitted if the indexes are h(α), i.e., $φ(h(α))=h(α) \in F_q$, or the indexes $φ(h(α)) \in F_q$ have already been obtained.

Then, the sharing processing unit 114c-α generates the following share information SH(α, h(α)) (h(α)=1, . . . , H(α)) using the polynomial f(α, x)∈F$_q$ and the indexes φ(h(α))∈F$_q$.

$$SH(\alpha, h(\alpha)) = (\phi(h(\alpha)), f(\alpha, \phi(h(\alpha))) \cdot g \in G \quad (5)$$

The sharing processing unit 114c-α outputs the share information SH(α, h(α)) (Step S112c) (this is the end of the description of <<Details of Step S112>>).

Then, the controller 113 determines whether or not the value α stored in the temporary storage 111 equals to L (Step S113). If it is not determined that α=L, the controller 113 sets α+1 as a new α, stores the setting in the temporary storage 111 (Step S114), and instructs to perform the processing of Step S112 using the new α. On the other hand, if it is determined in Step S113 that α=L, the share information SH(α, h(α)) (α=1, . . . , L) output from each secret sharing unit 114-α is transmitted to the transmitter 115. The transmitter 115 transmits each share information SH(α, h(α)) (α=1, . . . , L) to the corresponding share management apparatus [PA(α, h(α))] 120-α-h(α) (α=1, . . . , L) via the network 150 (Step S115). That is, the share information SH(1, 1) is transmitted to the share management apparatus [PA(1,1)] 120-1-1, the share information SH(1, 2) is transmitted to the share management apparatus [PA(1,2)] 120-1-2, . . . , and the share information SH(L, H(L)) is transmitted to the share management apparatus [PA(L, H(L))] 120-L-H(L).

[Processing of Common Value Generation Apparatus]

Each common value generation apparatus 140-α (FIG. 3B) generates the common value σ(α) shared among the share management apparatuses [PA(α, h(α))] 120-α-h(α) forming the subset SUB(α) associated with the common value generation apparatus 140-α. According to this embodiment, each common value σ(α) is a random number generated by the random number generation unit 141-α, and the transmitter 142-α transmits the common value σ(α) to each share management apparatus [PA(α, h(α))] 120-α-h(α) forming the subset SUB(α).

[Processing of Share Management Apparatus (Step S12)]

Figure 9A:
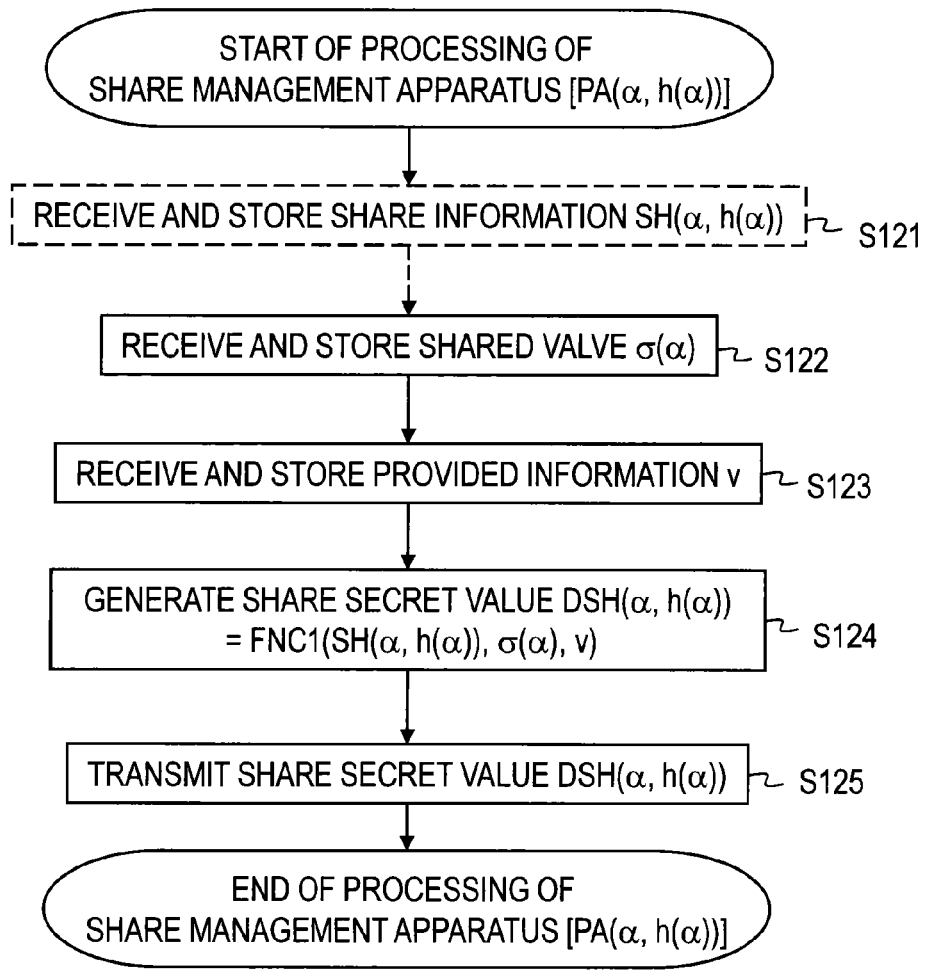
FIG. 9A is a diagram for illustrating a processing of the share management apparatus according to the first embodiment.
Figure 9B:
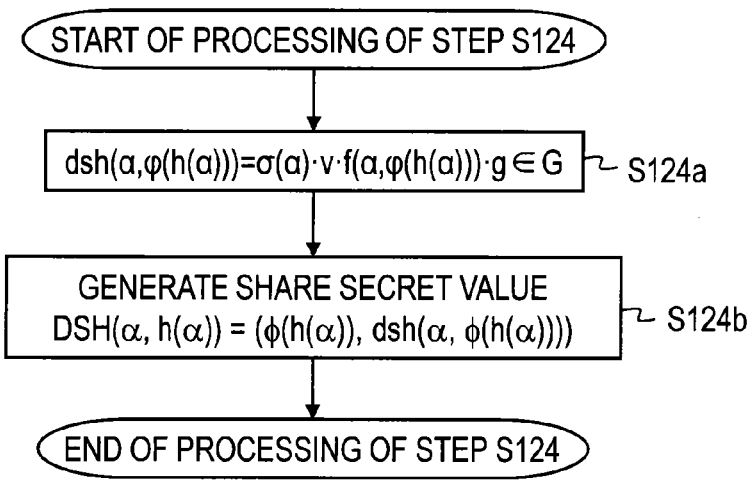
FIG. 9B is a diagram for illustrating details of a processing of Step S124.

FIG. 9A is a diagram for illustrating a processing of the share management apparatus [PA(α, h(α))] 120-α-h(α) according to the first embodiment, and FIG. 9B is a diagram for illustrating details of the processing of Step S124. In the following, the processing of the share management apparatus [PA(α, h(α))] 120-α-h(α) according to this embodiment will be described with reference to these drawings.

First, the receiver 126-α-h(α) of the share management apparatus [PA(α, h(α))] 120-α-h(α) (FIG. 3A) receives the transmitted share information SH(α, h(α)) and stores the share information in the storage 122-α-h(α) (Step S121). Note that the processing of Step S121 can be omitted if the share information SH(α, h(α)) has already been stored in the storage 122-α-h(α) of the share management apparatus [PA(α, h(α))] 120-α-h(α).

The receiver 126-α-h(α) of the share management apparatus [PA(α, h(α))] 120-α-h(α) receives the common value σ(α) transmitted from the common value generation apparatus 140-α and stores the common value in the storage 122-α-h(α) (Step S122).

According to this embodiment, the provided information v read from the storage 132 of the acquisition apparatus 130 (FIG. 4) is transmitted by the transmitter 135 to each share management apparatus [PA(α, h(α))] 120-α-h(α) via the network 150. The provided information v is common to all the share management apparatus PA(α, h(α)) 120-α-h(α). The provided information v is received by the receiver 126-α-h(α) of the share management apparatus [PA(α, h(α))] 120-α-h(α) (FIG. 3A) and stored in the storage 122-α-h(α) (Step S123).

Then, the share secret value generation unit 124-α-h(α) reads the share information SH(α, h(α)), the common value σ(α) and the provided information v from the storage 122-α-h(α). The share secret value generation unit 124-α-h(α) generates the share secret value DSH(α, h(α)) by performing a common calculation FNC1 using the share information SH(α, h(α)) and the common information including the common value σ(α) and the provided information v, and outputs the share secret value DSH(α, h(α)) (Step S124).

<<Details of Step S124>>

The share secret value generation units 124-α-h(α) of the share management apparatuses PA(α, h(α)) 120-α-h(α) belonging to the same subset SUB(α) use the same common information and perform the same common calculation. The share information according to this embodiment is expressed by the formula (5).

As illustrated in FIG. 9B, first, the common value σ(α), the provided information v and f(α, φ(h(α)))·g of the share information. SH(α, h(α))=(φ(h(α)), f(α, φ(h(α)))·g) are input to the linear calculation unit 124a-α-h(α) of the share secret value generation unit 124-α-h(α) according to this embodiment. The linear calculation unit 124a-α-h(α) performs the following calculation and outputs the calculation result dsh (α, φ(h(α))) (Step S124a).

$$dsh(\alpha, \phi(h(\alpha))) = \sigma(\alpha) \cdot v \cdot f(\alpha, \phi(h(\alpha))) \cdot g \in G \quad (6)$$

The output calculation result dsh(α, φ(h(α))) is input to the share secret value synthesis unit 124b-α-h(α). In addition, the index φ(h(α)) of the share information SH(α, h(α))=(φ(h(α)), f(α, φ(h(α)))·g) is input to the share secret value synthesis unit 124b-α-h(α), and the share secret value synthesis unit 124b-α-h(α) generates the share secret value DSH(cc, h(α)) according to the following calculation.

$$DSH(\alpha, h(\alpha)) = (\phi(h(\alpha)), dsh(\alpha, \phi(h(\alpha)))) \quad (7)$$

The share secret value synthesis unit 124b-α-h(α) outputs the share secret value DSH(α, h(α)) (Step S124b) (this is the end of the description of <<Details of Step S124>>).

The generated share secret value DSH(α, h(α)) is transmitted to the transmitter 125-α-h(α). The transmitter 125-α-h(α) transmits the share secret value DSH(cc, h(α)) to the acquisition apparatus 130 via the network 150 (Step S125).

[Processing of Acquisition Apparatus (Steps S13 and S14)]

Figure 10A:
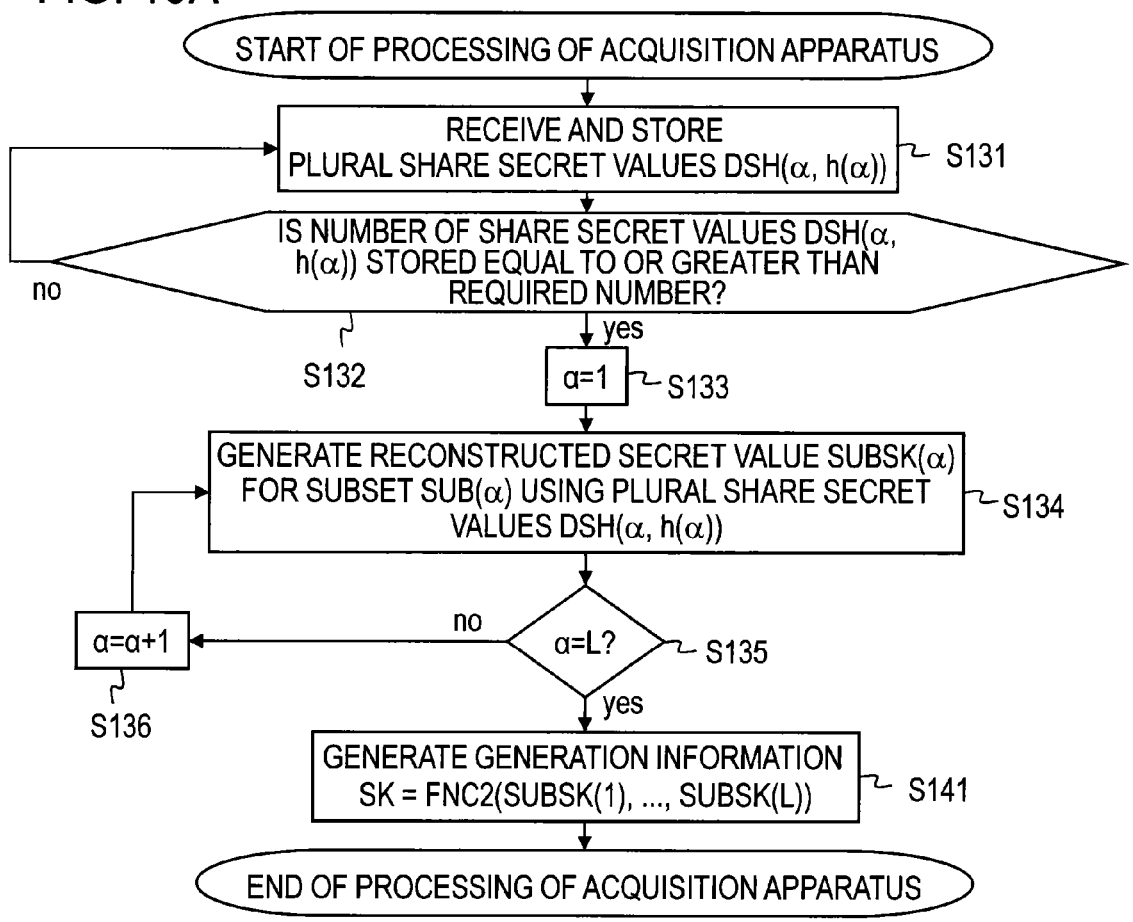
FIG. 10A is a diagram for illustrating a processing of the acquisition apparatus according to the first embodiment.
Figure 10B:
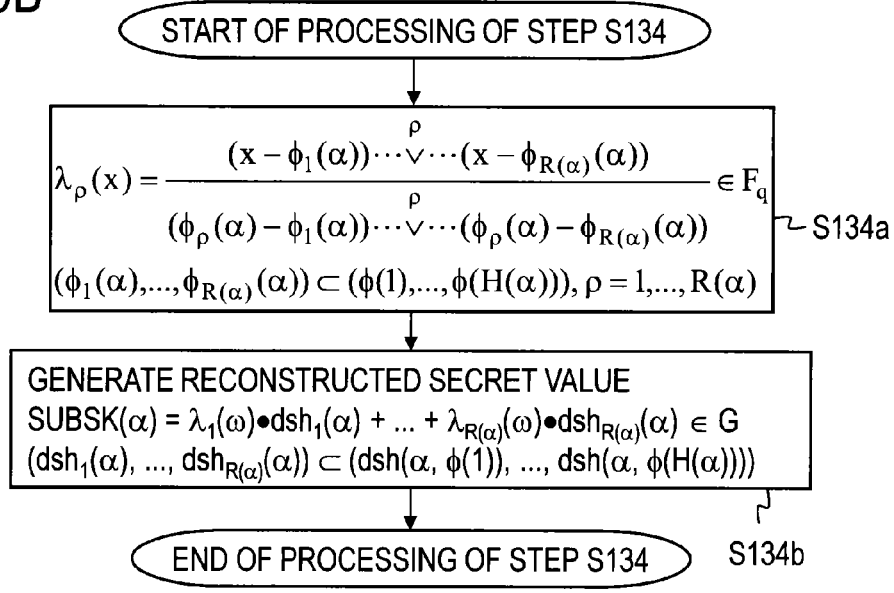
FIG. 10B is a diagram for illustrating details of a processing of Step S134.

FIG. 10A is a diagram for illustrating a processing of the acquisition apparatus according to the first embodiment, and FIG. 10B is a diagram for illustrating the processing of Step S134.

The share secret value DSH(α, h(α)) transmitted from each share management apparatus PA(α, h(α)) 120-α-h(α) is received by the receiver 136 of the acquisition apparatus 130 (FIG. 4) and stored in the storage 132 (Step S131).

Then, the controller 133 determines whether or not the number of share secret values DSH(α, h(α)) stored in the storage 132 is equal to or greater than a required number (Step S132). According to this embodiment, it is determined whether or not R(α) or more different share secret values DSH(α, h(α)) are stored in the storage 132 for each α=1, . . . , L (2≤R(α)<H(α)). If it is not determined that the number of share secret values DSH(α, h(α)) stored in the storage 132 is equal to or greater than the required number, the process returns to the processing of Step S131.

On the other hand, if it is determined that the number of share secret values DSH(α, h(α)) stored in the storage 132 is equal to or greater than the required number, the controller 133 sets α at 1 (α=1) and stores the setting in the temporary storage 131 (Step S133). Then, the required number of share secret values DSH(α, h(α)) for the subset SUB(α) are read from the storage 132 and input to the reconstruction unit 134-α. The reconstruction unit 134-α generates the reconstructed secret value SUBSK(α) by performing a reconstruction processing for each subset SUB(α) according to the secret sharing scheme used in Step S122 described above using the input share secret values DSH(α, h(α)), and outputs the reconstructed secret value SUBSK(α) for the subset SUB (α) (Step S134).

<<Details of Step S134>>

The share secret value DSH(α, h(α)) according to this embodiment is expressed by formula (7). To the reconstruction unit 134-α (FIG. 6), R(α) different share secret values DSH(α, h(α)) are input for each α. In the following, the share secret values DHS(α, h(α)) for each α input to the reconstruction unit 134-α are expressed as follows.

$$DSH(\alpha, \phi_1(\alpha)) = (\phi_1(\alpha), dsh_1(\alpha)) \quad (8)$$

$$DSH(\alpha, \phi_{R(\alpha)}(\alpha)) = (\phi_{R(\alpha)}, dsh_{R(\alpha)}(\alpha))$$

Note that the following relations hold.

$$(\phi_1(\alpha), \ldots, \phi_{R(\alpha)}(\alpha)) \subset (\phi(1), \ldots, \phi(H(\alpha))) \quad (9)$$

$$(dsh_1(\alpha), \ldots, dsh_{R(\alpha)}(\alpha)) \subset (dsh(\alpha, \phi(1)), \ldots, dsh(\alpha, \phi(H(\alpha)))) \quad (10)$$

As illustrated in FIG. 10B, the indexes $\phi_1(\alpha), \ldots, \phi_{R(\alpha)}(\alpha)$ of DSH(α, $\phi_1(\alpha)$), ..., DSH(α, $\phi_{R(\alpha)}(\alpha)$) expressed by formula (8) are input to the coefficient calculation unit 134a-α, and the coefficient calculation unit 134a-α generates the coefficients $\lambda_\rho(x)$ (ρ=1, ..., R(α)) for each ρ=1, ..., R(α) by performing the calculation expressed by the following formula and outputs the coefficients (Step S134a).

$$\lambda_\rho(x) = \frac{(x - \phi_1(\alpha)) \ldots \overset{\rho}{\vee} \ldots (x - \phi_{R(\alpha)}(\alpha))}{(\phi_\rho(\alpha) - \phi_1(\alpha)) \ldots \overset{\rho}{\vee} \ldots (\phi_\rho(\alpha) - \phi_{R(\alpha)}(\alpha))} \in F_q \quad (11)$$

The generated coefficients $\lambda_\rho(x)$ and $dsh_1(\alpha), dsh_{R(\alpha)}(\alpha)$ of DSH(α, $\phi_1(\alpha)$), ..., DSH(α, $\phi_{R(\alpha)}(\alpha)$) are input to the polynomial calculation unit 134b-α. The polynomial calculation unit 134b-α generates the reconstructed secret value SUBSK(α) for the subset SUB(α) by performing the following calculation.

$$SUBSK(\alpha) = \lambda_1(\omega) \cdot dsh_1(\alpha) + \ldots + \lambda_{R(\alpha)}(\omega) \cdot dsh_{R(\alpha)}(\alpha) \in G \quad (12)$$

The polynomial calculation unit 134b-α outputs the reconstructed secret value SUBSK(α) (Step S134b) (this is the end of the description of <<Details of Step S134>>).

The controller 133 determines whether or not the value α stored in the temporary storage 131 equals to L (Step S135). If it is not determined that α=L, the controller 133 sets α+1 as a new α, stores the setting in the temporary storage 131 (Step S136), and instructs to perform the processing of Step S134 using the new α.

On the other hand, if it is determined in Step S135 that α=L, the reconstructed secret value SUBSK(α) output from each reconstruction unit 134-α is sent to the synthesis unit 137. The synthesis unit 137 generates the generation information SK expressed by the following formula using the reconstructed secret values SUBSK(α) generated for the subsets SUB(α), and outputs the generation information SK (Step S141).

$$SK = FNC2(SUBSK(1), \ldots, SUBSK(L)) \quad (13)$$

<<Details of Step S141>>

The following are specific examples of formula (13).

Specific example 1: $SK = SUBSK(1) + \ldots + SUBSK(L)$
$\in G$ (14)

Specific example 2: $SK = CE_1 \cdot SUBSK(1) + \ldots + CE_L \cdot SUBSK(L) \in G$ (15)

Note that each $CE_\alpha \in F_q$ is a coefficient, for example, a multiplicative inverse of L: $(L)^{-1} \in F_q$. Any one of the coefficients $CE_1, \ldots, CE_L$ can be $0_F$. In that case, the generation information SK is generated by using only part of SUBSK (1)+...+SUBSK(L). In the generation, the synthesis unit 137 can randomly selects the coefficient or coefficients to be set at $0_F$ from among the coefficients $CE_1, \ldots, CE_L$. This improves security. The synthesis unit 137 can also arbitrarily set the coefficients $CE_1, \ldots, CE_L$. This allows the acquisition apparatus 130 to generate the generation information SK without using the reconstructed secret values SUBSK(α') for a less reliable subset SUB(α') (this is the end of the description of <<Details of Step S141>>).

<Characteristics of First Embodiment>

According to this embodiment, the sharing apparatus 110 performs the secret sharing of the secret information θ·g∈G independently for each subset SUB(α) to generate the share information SH(α, h(α)), each share management apparatus PA(α, h(α)) 120-α-h(α) generates the share secret value DSH (α, h(α)) by performing a common calculation using the share information SH(α, h(α)) and the common information including the common value σ(α) and the provided information v, and the acquisition apparatus 130 generates each of the reconstructed secret values SUBSK(α) by performing a reconstruction processing for each subset SUB(α) using a plurality of share secret values DSH(α, h(α)) for the subset SUB(α) and generates the generation information SK from the reconstructed secret values SUBSK(α).

Since the secret sharing, the common calculation and the reconstruction processing are performed for each subset SUB (α) by using the common value σ(α) shared in the subset SUB(α), these processings are possible. In addition, the value σ is not shared among all the share management apparatuses PA(α, h(α)) 120-α-h(α), but the common value σ(α) is independently shared in each subset SUB(α), so that high security is ensured. In particular, according to this embodiment, the common values σ(α) shared in the different subsets SUB(α) are independent of each other. This ensures high security.

According to this embodiment, all the share management apparatuses PA(α, h(α)) 120-α-h(α) (α=1, ..., L) performs the same common calculation FNC1. The common calculation FNC1 according to this embodiment is a linear calculation. Therefore, according to this embodiment, the generation information SK can be generated by linear combination of the reconstructed secret values SUBSK(α), so that the generation information SK generated from the reconstructed secret values SUBSK(α) can be the same as the result of the common calculation FNC1 with respect to the secret information θ·g and a certain value σ as operands.

According to this embodiment, the (R(α), H(α)) threshold secret sharing scheme is used to share the secret information θ·g∈G among the subset SUB(α). Such an arrangement is possible if the share information SH(α, h(α)) includes an element f(α, φ(h(α)))·g of the cyclic group G (i.e., f(α, φ(h (α)))·g∈G) provided that x is a variable that is an element of the finite field $F_q$, an R(α)-1-th order polynomial that satisfies a relation f(α, ω)=θ for a predetermined element ω of the finite field $F_q$ (ω ∈$F_q$) is expressed as f(α, x)∈$F_q$, and the index for h(α) is φ(h(α)). Since the secret information θ·g∈G that is an element of the cyclic group is shared by secret sharing, even if the secret information θ·g reconstructed from the share information SH(α, h(α)) leaks to the outside, θ does not leaks to the outside if it is difficult to solve the discrete logarithm problem on the cyclic group G. Thus, high security is ensured.

Modification 1 of First Embodiment

Next, modification 1 of the first embodiment will be described.

According to the first embodiment, the secret information θ·g∈G, which is an element of the cyclic group G, is shared by secret sharing. However, the element θ of the finite field $F_q$ (θ∈$F_q$) can be shared by secret sharing. In that case, the share information SH(α, h(α)) shared according to the (R(α), H(α)) threshold secret sharing scheme includes an element f(α, φ(h(α))) of the finite field $F_q$ (f(α, φ(h(α)))∈$F_q$) provided that x is a variable that is an element of the finite field $F_q$, an R(α)-1-th order polynomial that satisfies a relation f(α, ω)=θ for a predetermined element ω of the finite field $F_q$ (ω∈$F_q$) is expressed as f(α, x)∈$F_q$, and the index for h(α) is φ(h(α)).

Figure 11A:
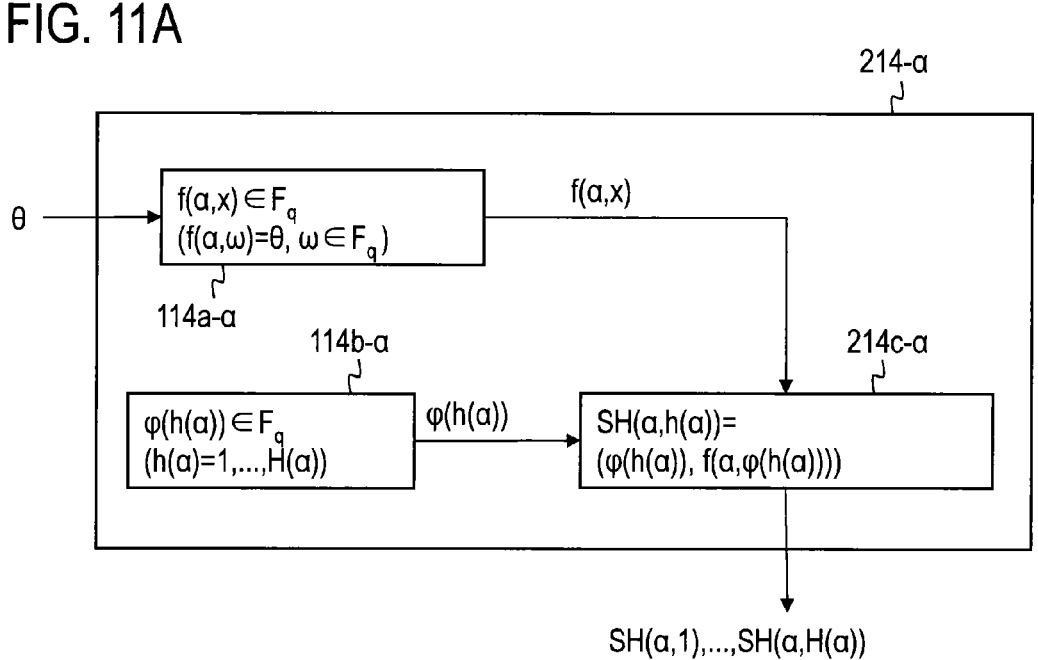
FIG. 11A is a diagram for illustrating a configuration of a secret sharing unit according to a modification 1 of the first embodiment.
Figure 11B:
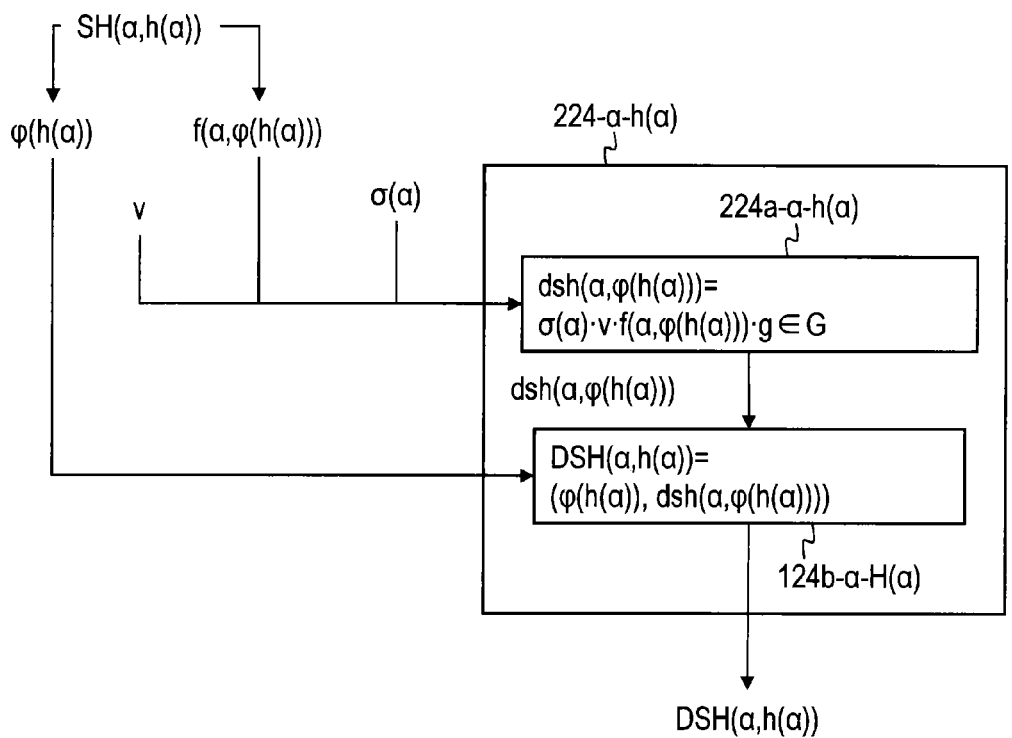
FIG. 11B is a diagram for illustrating a configuration of a share secret value generation unit according to modification 1 of the first embodiment.

FIG. 11A is a diagram for illustrating a configuration of a secret sharing unit 214-α according to modification 1 of the first embodiment, and FIG. 11B is a diagram for illustrating a configuration of a share secret value generation unit 224-α-h(α) according to modification 1 of the first embodiment. In these drawings, the same parts as those in the first embodiment are denoted by the same reference numerals as those in the first embodiment.

A secret sharing system 2 according to modification 1 of the first embodiment comprises a sharing apparatus 210 that replaces the sharing apparatus 110 and share management apparatuses 220-α-h(α) (α=1, . . . , L) that replace the share management apparatuses 120-α-h(α) (α=1, . . . , L). The secret sharing units 114-α (α=1, . . . , L) are replaced by secret sharing units 214-α (α=1, . . . , L) shown in FIG. 11A, and the share secret value generation units 124-α-h(α) (α=1, . . . , L) are replaced by share secret value generation units 224-α-h(α) (α=1, . . . , L) shown in FIG. 11B. The remainder of the configuration is the same as that according to the first embodiment.

<<Modification of Step S112 According to Modification 1 of First Embodiment>>

According to modification 1 of the first embodiment, the processing of Step S112 shown in FIG. 8B is modified as described below.

First, Steps S112a and S112b shown in FIG. 8B are performed. Then, instead of Step S112c, a sharing processing unit 214c-α of the secret sharing unit 214-α (FIG. 11A) generates pieces of share information SH(α, h(α)) described below using the polynomial f(α, x)∈$F_q$ and the indexes φ(h(α))∈$F_q$ and outputs the share information.

$$SH(\alpha,h(\alpha))=(\phi(h(\alpha)), f(\alpha,\phi(h(\alpha)))) \quad (16)$$

<<Modification of Step S124 According to Modification 1 of First Embodiment>>

According to modification 1 of the first embodiment, the processing of Step S124 shown in FIG. 9B is modified as described below.

First, instead of Step S124a, the common value σ(α), the provided information v and f(α, φ(h(α))) of the share information SH(α, h(α))=(φ(h(α)), f(α, φ(h(α)))) are input to a linear calculation unit 224a-α-h(α) (FIG. 11B), and the linear calculation unit 224a-α-h(α) performs the following calculation and outputs the calculation result dsh(α, φ(h(α)))∈G.

$$dsh(\alpha,\phi(h(\alpha)))=\sigma(\alpha)\cdot v\cdot f(\alpha,\phi(h(\alpha)))\cdot g\in G \quad (17)$$

The calculation result dsh(α, φ(h(α)))∈G is information that is part of the share secret value DSH(α, h(α)). Then, the processing of Step S124b shown in FIG. 9B is performed (this is the end of the description of <<Modification of Step S124 according to Modification 1 of First Embodiment>>). The remainder of the processing is the same as that in the first embodiment.

Modification 2 of First Embodiment

Next, modification 2 of the first embodiment will be described.

According to modification 2 of the first embodiment, again, an element θ of the finite field $F_q$ (θ∈$F_q$) is shared. The modification 2 of the first embodiment differs from modification 1 in that the calculation result dsh(α, φ(h(α))) is not an element of the cyclic group but an element of the finite field $F_q$.

Figure 12A:
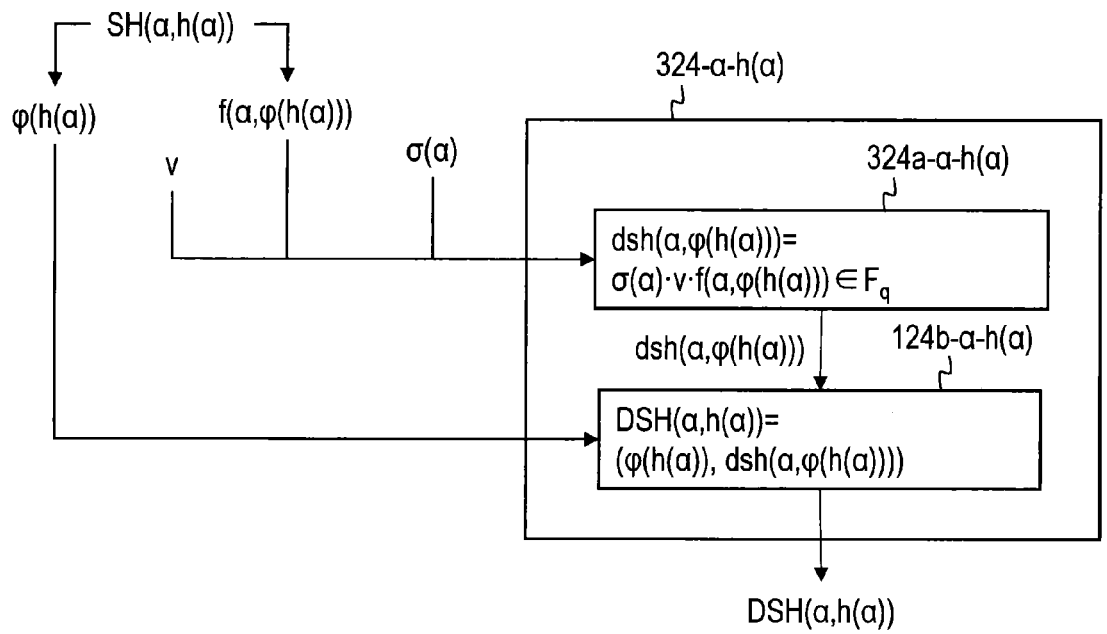
FIG. 12A is a diagram for illustrating a configuration of a share secret value generation unit according to modification 2 of the first embodiment.
Figure 12B:
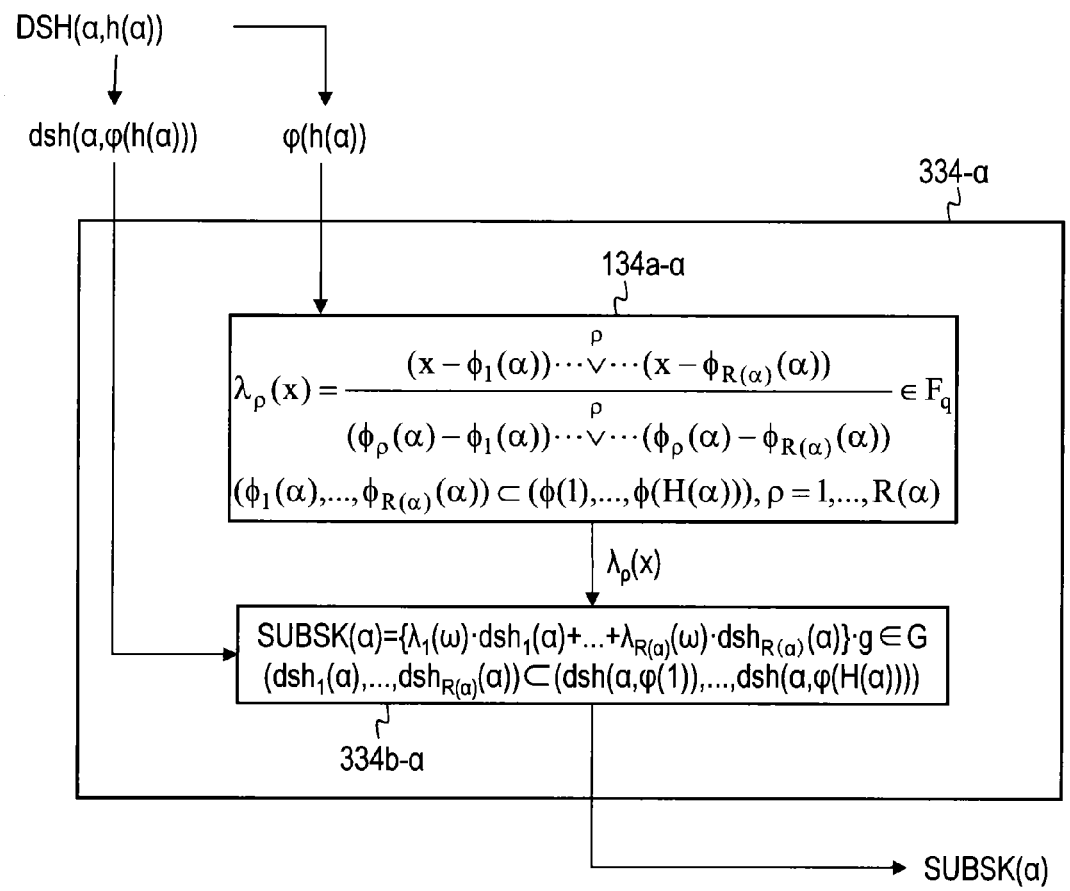
FIG. 12B is a diagram for illustrating a configuration of a reconstruction unit according to modification 2 of the first embodiment.

FIG. 12A is a diagram for illustrating a configuration of a share secret value generation unit 324-α-h(α) according to modification 2 of the first embodiment, and FIG. 12B is a diagram for illustrating a configuration of a reconstruction unit 334-α according to modification 2 of the first embodiment. In these drawings, the same parts as those in the first embodiment are denoted by the same reference numerals as those in the first embodiment.

A secret sharing system 3 according to modification 2 of the first embodiment comprises the sharing apparatus 210 that replaces the sharing apparatus 110, share management apparatuses 320-α-h(α) (α=1, . . . , L) that replace the share management apparatuses 120-α-h(α) (α=1, . . . , L), and an acquisition apparatus 330 that replaces the acquisition apparatus 130. The share secret value generation units 124-α-h(α) (α=1, . . . , L) are replaced by the share secret value generation units 324-α-h(α) (α=1, . . . , L) shown in FIG. 12A, and the reconstruction units 134-α (α=1, . . . , L) are replaced by the reconstruction units 334-α (α=1, . . . , L) shown in FIG. 12B. The remainder of the configuration is the same as that according to the first embodiment.

<<Modification of Step S112 according to Modification 2 of First Embodiment>>

Step S112 is modified in the same way as in modification 1 of the first embodiment.

<<Modification of Step S124 According to Modification 2 of First Embodiment>>

According to modification 2 of the first embodiment, the processing of Step S124 shown in FIG. 9B is modified as described below.

First, instead of Step S124a, the common value σ(α), the provided information v and f(α, φ(h(α))) of the share information SH(α, h(α))=(φ(h(α)), f(α, φ(h(α)))) are input to a linear calculation unit 324a-α-h(α) (FIG. 12A), and the linear calculation unit 324a-α-h(α) performs the following calculation and outputs the calculation result dsh(α, φ(h(α)))∈$F_q$.

$$dsh(\alpha,\phi(h(\alpha)))=\sigma(\alpha)\cdot v\cdot f(\alpha,\phi(h(\alpha)))\in F_q \quad (18)$$

The calculation result dsh(α, φ(h(α)))∈$F_q$ is information that is part of the share secret value DSH(α, h(α)). Then, the processing of Step S124b shown in FIG. 9B is performed.

<<Modification of Step S134 According to Modification 2 of First Embodiment>>

First, the processing of Step S134a shown in FIG. 10B is performed. Then, instead of Step S134b shown in FIG. 10B, each coefficient $\lambda_\rho(x)$ and $dsh_1(\alpha), \ldots, dsh_{R(\alpha)}(\alpha)$ of DSH(α, φ$_1$(α)), . . . , DSH(α, φ$_{R(\alpha)}$(α)) expressed by formula (8) are input to a polynomial calculation unit 334b-α (FIG. 12B), and the polynomial calculation unit 334b-α generates the reconstructed secret value SUBSK(α) for the subset SUB(α) by performing the following calculation.

$$SUBSK(\alpha)=\{\lambda_1(\omega) \cdot dsh_1(\alpha)+ \ldots +\lambda_{R(\alpha)}(\omega) \cdot dsh_{R(\alpha)}\} \cdot g \in G \quad (19)$$

The polynomial calculation unit 334b-α outputs the reconstructed secret value SUBSK(α) for the subset SUB(α) (this is the end of the description of <<Modification of Step S134 according to Modification 2 of First Embodiment>>). The remainder of the processing is the same as that in the first embodiment.

Modification 3 of First Embodiment

According to modification 3 of the first embodiment, instead of the (R(α), H(α)) threshold secret sharing scheme, an (H(α), H(α)) threshold secret sharing scheme is used to share secret information.

Figure 13A:
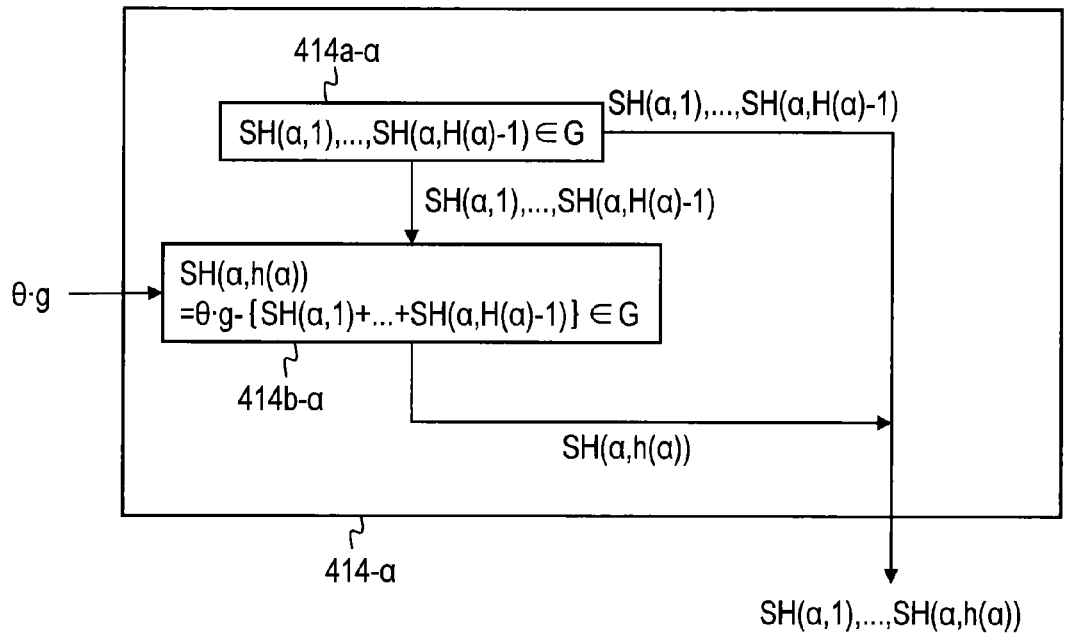
FIG. 13A is a diagram for illustrating a configuration of a secret sharing unit according to modification 3 of the first embodiment.
Figure 13B:
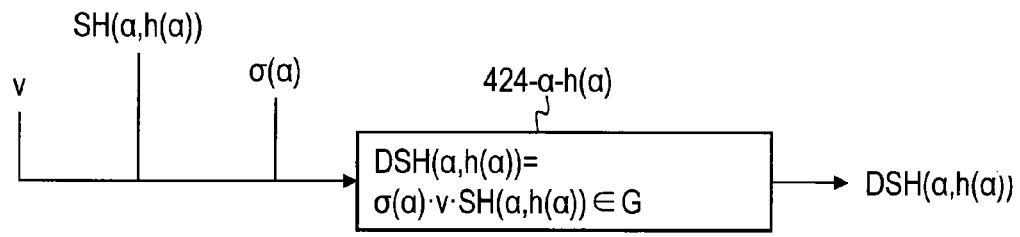
FIG. 13B is a diagram for illustrating a configuration of a share secret value generation unit according to modification 3 of the first embodiment.
Figure 13C:
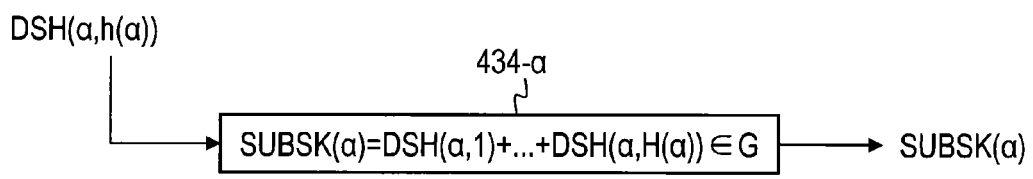
FIG. 13C is a diagram for illustrating a configuration of a reconstruction unit according to modification 3 of the first embodiment.

FIG. 13A is a diagram for illustrating a configuration of a secret sharing unit 414-α according to modification 3 of the first embodiment, FIG. 13B is a diagram for illustrating a configuration of a share secret value generation unit 424-α-h(α) according to modification 3 of the first embodiment, and FIG. 13C is a diagram for illustrating a configuration of a reconstruction unit 434-α according to modification 3 of the first embodiment.

A secret sharing system 4 according to modification 3 of the first embodiment comprises a sharing apparatus 410 that replaces the sharing apparatus 110, a share management apparatuses 420-α-h(α) (α=1, ..., L) that replace the share management apparatuses 120-α-h(α) (α=1, ..., L), and an acquisition apparatus 430 that replaces the acquisition apparatus 130. The secret sharing units 114-α (α=1, ..., L) are replaced by the secret sharing units 414-α (α=1, ..., L) shown in FIG. 13A, the share secret value generation units 124-α-h(α) (α=1, ..., L) are replaced by the share secret value generation units 424-α-h(α) (α=1, ..., L) shown in FIG. 13B, and the reconstruction units 134-α (α=1,..., L) are replaced by the reconstruction units 434-α (α=1, ..., L) shown in FIG. 13C. The remainder of the configuration is the same as that according to the first embodiment.

<<Modification of Step S112 According to Modification 3 of First Embodiment>>

According to modification 3 of the first embodiment, the processing of Step S112 shown in FIG. 8B is modified as described below.

First, a random number generation unit 414a-α of the secret sharing unit 414-α (FIG. 13A) randomly selects H(α)-1 elements of the cyclic group G described below and outputs the elements.

$$SH(\alpha,1), \ldots, SH(\alpha,H(\alpha)-1) \in G \quad (20)$$

Then, the secret information θ·g∈G and the H(α)-1 elements SH(α, 1), ..., SH(α, H(α)-1) of the cyclic group G (SH(α, 1), ..., SH(α, H(α)-1)∈G) are input to an inverse calculation unit 414b-α. The inverse calculation unit 414b-α generates SH(α, h(α)) by performing the following calculation and outputs SH(α, h(α)).

$$SH(\alpha,h(\alpha))=\theta \cdot g-\{SH(\alpha,1)+ \ldots +SH(\alpha,H(\alpha)-1)\} \in G \quad (21)$$

The secret sharing unit 414-α outputs the following information as share information for the subset SUB(α).

$$SH(\alpha,1), \ldots, SH(\alpha,H(\alpha)) \in G$$

The share information satisfies the following relation.

$$SH(\alpha,1)+SH(\alpha,2)+ \ldots +SH(\alpha,H(\alpha))=\theta \cdot g \in G \quad (22)$$

<<Modification of Step S124 According to Modification 3 of First Embodiment>>

According to modification 3 of the first embodiment, the processing of Step S124 shown in FIG. 9B is modified as described below.

First, the common value σ(α), the provided information v and the share information SH(α, 1), ..., SH(α, H(α)) are input to the share secret value generation unit 424-α-h(α) (FIG. 13B). The share secret value generation unit 424-α-h(α) generates the share secret value DSH(α, h(α)) by performing the following calculation and outputs the share secret value.

$$DSH(\alpha,h(\alpha))=\sigma(\alpha) \cdot v \cdot SH(\alpha,h(\alpha)) \in G \quad (23)$$

<<Modification of Step S132 According to Modification 3 of First Embodiment>>

According to modification 3 of the first embodiment, the processing of Step S132 shown in FIG. 10A is modified as described below.

According to modification 3, again, the controller 133 determines whether or not the number of share secret values DSH(α, h(α)) stored in the storage 132 is equal to or greater than a required number, where the "required number" in modification 3 is H(α). That is, according to modification 3, it is determined for each α=1, ..., L whether or not all the share secret values DSH(α, h(α)) are stored in the storage 132.

<<Modification of Step S134 According to Modification 3 of First Embodiment>>

According to modification 3 of the first embodiment, the processing of Step S134 shown in FIG. 10B is modified as described below.

The share secret value DSH(α, h(α)) according to modification 3 is expressed by formula (23). To the reconstruction unit 434-α (FIG. 13C), all the share secret values DSH(α, h(α)) (h(α)=1, ..., H(α)) for α are input. The reconstruction unit 434-α generates the reconstructed secret value SUBSK(α) for the subset SUB(α) by performing the following calculation and outputs the reconstructed secret value.

$$SUBSK(\alpha)=DSH(\alpha,1)+ \ldots +DSH(\alpha,H(\alpha)) \in G \quad (24)$$

The remainder of the processing is the same as that in the first embodiment.

Modification 4 of First Embodiment

According to modification 4 of the first embodiment, again, instead of the (R(α), H(α)) threshold secret sharing scheme, the (H(α), H(α)) threshold secret sharing scheme is used to share secret information. Modification 4 differs from modification 3 in that secret information θ∈$F_q$ that is an element of the finite field $F_q$ is shared by secret sharing.

Figure 14A:
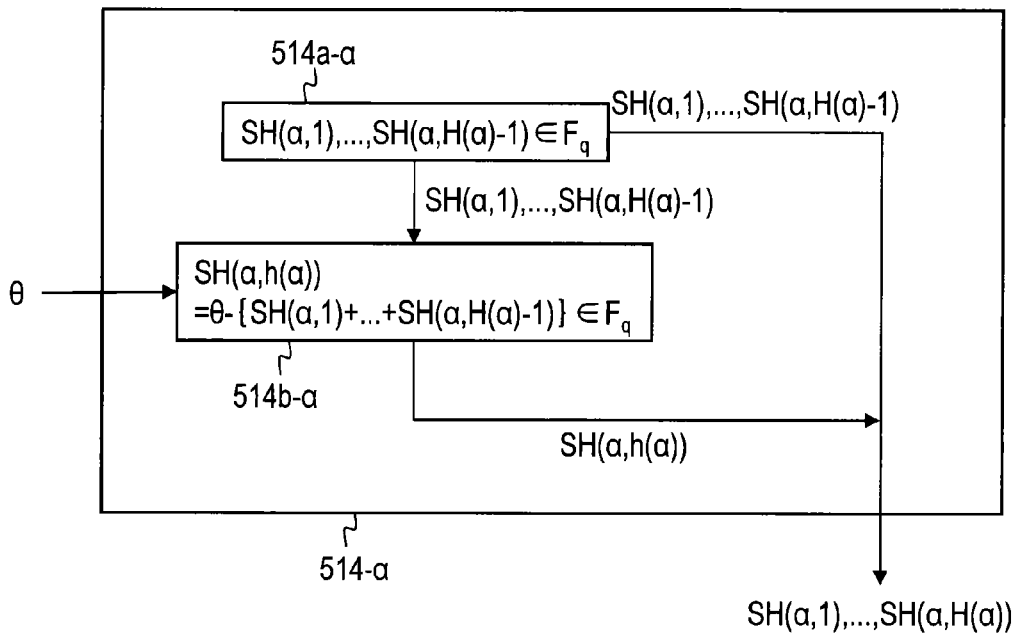
FIG. 14A is a diagram for illustrating a configuration of a secret sharing unit according to modification 4 of the first embodiment.
Figure 14B:
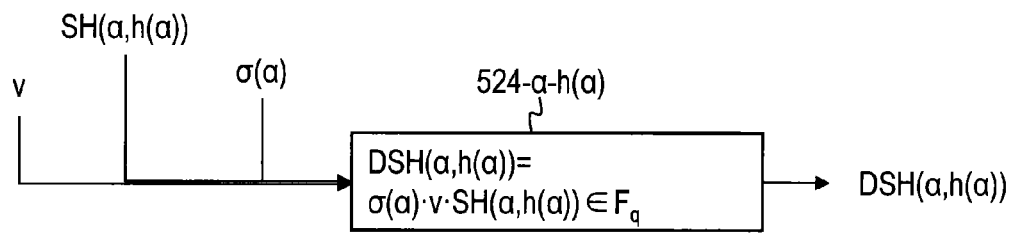
FIG. 14B is a diagram for illustrating a configuration of a share secret value generation unit according to modification 4 of the first embodiment.
Figure 14C:
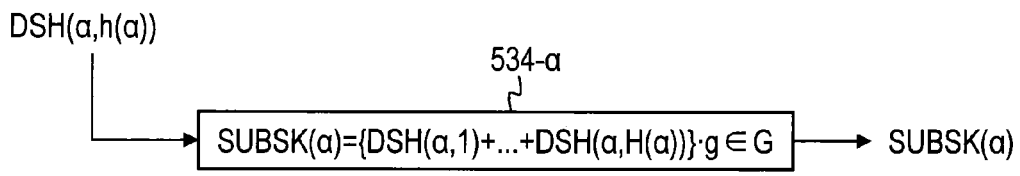
FIG. 14C is a diagram for illustrating a configuration of a reconstruction unit according to modification 4 of the first embodiment.

FIG. 14A is a diagram for illustrating a configuration of a secret sharing unit 514-α according to modification 4 of the first embodiment, FIG. 14B is a diagram for illustrating a configuration of a share secret value generation unit 524-α-h(α) according to modification 4 of the first embodiment, and FIG. 14C is a diagram for illustrating a configuration of a reconstruction unit 534-α according to modification 4 of the first embodiment.

A secret sharing system 5 according to modification 4 of the first embodiment comprises a sharing apparatus 510 that replaces the sharing apparatus 110, share management apparatuses 520-α-h(α) (α=1, ..., L) that replace the share management apparatuses 120-α-h(α) (α=1, ..., L), and an acquisition apparatus 530 that replaces the acquisition apparatus 130. The secret sharing units 114-α (α=1, ..., L) are replaced by the secret sharing units 514-α (α=1, ..., L)

shown in FIG. 14A, the share secret value generation units 124-α-h(α) (α=1, . . . , L) are replaced by the share secret value generation units 524-α-h(α) (α=1, . . . , L) shown in FIG. 14B, and the reconstruction units 134-α (α=1, . . . , L) are replaced by the reconstruction units 534-α (α=1, . . . , L) shown in FIG. 14C. The remainder of the configuration is the same as that according to the first embodiment.

<<Modification of Step S112 According to Modification 4 of First Embodiment>>

According to modification 4 of the first embodiment, the processing of Step S112 shown in FIG. 8B is modified as described below.

First, a random number generation unit 514a-α of the secret sharing unit 514-α (FIG. 14A) randomly selects H(α)-1 elements of the finite field $F_q$ described below and outputs the elements.

$$SH(\alpha,1), \ldots, SH(\alpha,H(\alpha)-1) \in F_q \quad (25)$$

Then, the secret information θ∈$F_q$ and the H(α)-1 elements SH(α, 1), . . . , SH(α, H(α)-1) of the finite field $F_q$ (SH(α, 1), . . . , SH(α, H(α)-1) ∈$F_q$) are input to an inverse calculation unit 514b-α. The inverse calculation unit 514b-α generates SH(α, h(α)) by performing the following calculation and outputs SH(α, h(α)).

$$SH(\alpha,h(\alpha)) = \theta - \{SH(\alpha,1) + \ldots + SH(\alpha,H(\alpha)-1)\} \in F_q \quad (26)$$

The secret sharing unit 514-α outputs the following as share information for the subset SUB(α).

$$SH(\alpha,1), \ldots, SH(\alpha,H(\alpha)) \in F_q \quad (27)$$

The share information satisfies the following relation.

$$SH(\alpha,1) + SH(\alpha,2) + \ldots + SH(\alpha,H(\alpha)) = \theta \in F_q \quad (28)$$

<<Modification of Step S124 According to Modification 4 of First Embodiment>>

According to modification 4 of the first embodiment, the processing of Step S124 shown in FIG. 9B is modified as described below.

First, the common value σ(α), the provided information v and the share information SH(α, 1), . . . , SH(α, H(α)) are input to the share secret value generation unit 524-α-h(α) (FIG. 14B). The share secret value generation unit 524-α-h(α) generates the share secret value DSH(α, h(α)) by performing the following calculation and outputs the share secret value.

$$DSH(\alpha,h(\alpha)) = \sigma(\alpha) \cdot v \cdot SH(\alpha,h(\alpha)) \in F_q \quad (29)$$

<<Modification of Step S132 According to Modification 4 of First Embodiment>>

Step S132 is modified in the same way as in modification 3 of the first embodiment.

<<Modification of Step S134 According to Modification 4 of First Embodiment>>

According to modification 4 of the first embodiment, the processing of Step S134 shown in FIG. 10B is modified as described below.

The share secret value DSH(α, h(α)) according to modification 4 is expressed by formula (29). To the reconstruction unit 534-α (FIG. 14C), all the share secret values DSH(α, h(α)) (h(α)=1, . . . , H(α)) for α are input. The reconstruction unit 534-α generates the reconstructed secret value SUBSK(α) for the subset SUB(α) by performing the following calculation and outputs the reconstructed secret value.

$$SUBSK(\alpha) = \{DSH(\alpha,1) + \ldots + DSH(\alpha,H(\alpha))\} g \in G \quad (30)$$

The remainder of the processing is the same as that in the first embodiment.

Other Modifications of First Embodiment

Various other modifications can be made without departing from the spirit of the present invention. For example, the calculation expressed by the following formula (31) can be performed instead of formula (29) in modification 4 of the first embodiment, and the calculation expressed by formula (24) can be performed instead of the calculation expressed by formula (30).

$$DSH(\alpha,h(\alpha)) = \sigma(\alpha) \cdot v \cdot SH(\alpha,h(\alpha)) \in F_q \quad (31)$$

The reconstructed secret value SUBSK(α) can be an element of the finite field $F_q$.

Although the same secret sharing scheme is used for the subsets SUB(α) in this embodiment, different secret sharing schemes can also be used for different subsets SUB(α).

Although the common value generation apparatus 140-α is provided for each subset SUB(α) in this embodiment, any one of the share management apparatuses in each subset SUB(α) can have the function of the common value generation apparatus. In that case, the common value generation apparatus 140-α is unnecessary.

In this embodiment, the share secret value DSH(α, h(α)) is generated by performing the common calculation FNC1 using the share information SH(α, h(α)) and the common information including the common value σ(α) and the provided information v. However, the share secret value DSH(α, h(α)) can also be generated without using the provided information v by using the common value σ(α) alone as the common information. The common information can also include other information as well as the common value σ(α) and the provided information v.

Although the same common calculation for determining the share secret value DSH(α, h(α)) has to be used in each subset SUB(α), different common calculations can be used in different subsets SUB(α).

Second Embodiment

Next, a second embodiment of the present invention will be described. This embodiment is an application of the first embodiment to key generation in functional encryption.

DEFINITIONS

Terms and symbols used in the description of this embodiment will be defined below.

Matrix: the term "matrix" means a rectangular array of elements of a set for which a calculation is defined. Not only elements of a ring but also elements of a group can form the matrix.

(●)$^T$: (●)$^T$ represents a transposed matrix of ●.

(●)$^{-1}$: (●)$^{-1}$ represents an inverse matrix of ●.

∧ : ∧ is a logical symbol that represents logical conjunction (AND).

∨ : ∨ is a logical symbol that represents logical disjunction (OR).

¬ : ¬ is a logical symbol that represents negation (NOT).

Propositional variable: a propositional variable is a variable in a set {true, false} consisting of "true" and "false" of a proposition. That is, the domain of the propositional variable is a set consisting of "true" and "false". The propositional variable and the negation of the propositional variable are collectively called literals.

Logical formula: the term "logical formula" means an expression of a proposition in mathematical logic. More specifically, "true" and "false" are logical formulas, a propositional variable is a logical formula, the negation of a logical formula is a logical formula, the conjunction of logical formulas is a logical formula, and the disjunction of logical formulas is a logical formula.

Z: Z represents the integer set.

sec: sec represents a security parameter (sec∈Z, sec>0).

0*: 0* represents a string of * 0s.

1*: 1* represents a string of * 1s.

$F_q$: $F_q$ represents a finite field having an order q (same definition as in the first embodiment).

$0_F$: $0_F$ represents an additive identity of the finite field $F_q$ (same definition as in the first embodiment).

$1_F$: $1_F$ represents a multiplicative identity of the finite field $F_q$ (same definition as in the first embodiment).

δ(i, j): δ(i, j) represents a Kronecker delta function. δ(i, j)=$1_F$ when i=j, and δ(i, j)=$0_F$ when i≠j.

E: E represents an elliptic curve defined on the finite field $F_q$ (same definition as in the first embodiment).

A finite set comprising rational points on the elliptic curve E has a subgroup having an order p (p≥1). For example, provided that the number of elements of the finite set comprising rational points on the elliptic curve E is denoted by #E, and p is a large prime number that divides #E, a finite set E[p] consisting of p-division points on the elliptic curve E forms a subgroup of the finite set consisting of the rational points on the elliptic curve E. The "p-division points on the elliptic curve E" means those of the points A on the elliptic curve E whose elliptic curve scalar products p A on the elliptic curve E satisfy a relation p·A=O.

$G_1$, $G_2$, $G_T$: $G_1$, $G_2$ and $G_T$ each represent a cyclic group having an order q. Specific examples of the cyclic groups $G_1$ and $G_2$ include the finite set E[p] comprising p-division points on the elliptic curve E and a subgroup thereof. $G_1$ may be the same as $G_2$ ($G_1$=$G_2$) or differ from $G_2$ ($G_1$≠$G_2$). Specific examples of the cyclic group $G_T$ include a finite set forming an extension field of the finite field $F_q$, which is a prime field. One example is a finite set consisting of p-th roots of 1 in an algebraic closure of the finite field $F_q$. The security is improved if the cyclic groups $G_1$, $G_2$ and $G_T$ and the finite field $F_q$ have the same order.

In this embodiment, calculations defined on the cyclic groups $G_1$ and $G_2$ are additively expressed, and a calculation defined on the cyclic group $G_T$ is multiplicatively expressed. For example, $\chi \cdot \Omega \in G_1$ for $\chi \in F_q$ and $\Omega \in G_1$ means that a calculation defined on the cyclic group $G_1$ is performed $\chi$ times on $\Omega \in G_1$, and $\Omega_1+\Omega_2 \in G_1$ for $\Omega_1$ and $\Omega_2 \in G$ means that a calculation defined on the cyclic group $G_1$ is performed on operands $\Omega_1 \in G_1$ and $\Omega_2 \in G_1$. Similarly, $\chi \cdot \Omega \in G_2$ for $\Omega \in F_q$ and $\Omega \in G_2$ means that a calculation defined on the cyclic group $G_2$ is performed $\chi$ times on $\Omega \in G_2$, and $\Omega_1+\Omega_2 \in G_2$ for $\Omega_1$ and $\Omega_2 \in G_2$ means that a calculation defined on the cyclic group $G_2$ is performed on operands $\Omega_1 \in G_2$ and $\Omega_2 \in G_2$. On the other hand, $\Omega^{\chi} \in G_T$ for $\chi \in F_q$ and $\Omega \in G_T$ means that a calculation defined on the cyclic group $G_T$ is performed $\chi$ times on $\Omega \in G_T$, and $\Omega_1 \cdot \Omega_2 \in G_T$ for $\Omega_1$ and $\Omega_2 \in G_T$ means that a calculation defined on the cyclic group $G_1$ is performed on operands $\Omega_1 \in G_T$ and $\Omega_2 \in G_T$.

Ψ: Ψ represents an integer equal to or greater than 1.

ψ: ψ represents an integer equal to or greater than 0 and equal to or smaller than Ψ (ψ=0, ..., Ψ).

λ: λ represents an integer equal to or greater than 1 and equal to or smaller than Ψ (λ=1, ..., Ψ).

n(ψ): n(ψ) represents an integer equal to or greater than 1.

ζ(ψ): ζ(ψ) represents an integer equal to or greater than 0.

$G_1^{n(\psi)+\zeta(\psi)}$: $G_1^{n(\psi)+\zeta(\psi)}$ represents a direct product of n(ψ)+ζ(ψ) cyclic groups $G_1$.

$G_2^{n(\psi)+\zeta(\psi)}$: $G_2^{n(\psi)+\zeta(\psi)}$ represents a direct product of n(ψ)+ζ(ψ) cyclic groups $G_2$.

$g_1$, $g_2$, $g_T$: $g_1$, $g_2$ and $g_T$ represent generators of the cyclic groups $G_1$, $G_2$ and $G_T$, respectively.

V(ψ): V(ψ) represents an n(ψ)+ζ(ψ)-dimensional vector space formed by a direct product of n(ψ)+ζ(ψ) cyclic groups $G_1$.

V*(ψ): V*(ψ) represents an n(ψ)+ζ(ψ)-dimensional vector space formed by a direct product of n(ψ)+ζ(ψ) cyclic groups $G_2$.

$e_\psi$: $e_\psi$ represents a nondegenerate bilinear map that maps a direct product $G_1^{n(\psi)+\zeta(\psi)} \times G_2^{n(\psi)+\zeta(\psi)}$ of the direct product $G_1^{n(\psi)+\zeta(\psi)}$ and the direct product $G_2^{n(\psi)+\zeta(\psi)}$ to the cyclic group $G_T$. The bilinear map $e_\psi$ outputs one element of the cyclic group $G_T$ in response to input of n(ψ)+ζ(ψ) elements $\gamma_\beta$ (β=1, ..., n(ψ)+ζ(ψ)) of the cyclic group $G_1$ and n(ψ)+ζ(ψ) elements $\gamma_\beta^*$(β=1, ... n(ψ)+(ψ)) of the cyclic group $G_2$.

$$e_\psi: G_1^{n(\psi)+\zeta(\psi)} \times G_2^{n(\psi)+\zeta(\psi)} \to G_T \quad (32)$$

The bilinear map $e_\psi$ has the following properties.

[Bilinearity]

The bilinear map $e_\psi$ satisfies the following relation for any elements of $\Gamma_1 \in G_1^{n(\psi)+\zeta(\psi)}$, $\Gamma_2 \in G_2^{n(\psi)+\zeta(\psi)}$, and ν, κ∈$F_q$.

$$e_\psi(\nu \cdot \Gamma_1, \kappa \cdot \Gamma_2) = e_\psi(\Gamma_1, \Gamma_2)^{\nu \cdot \kappa} \quad (33)$$

[Nondegenerateness]

The bilinear map $e_\psi$ is not a map that maps all the elements of $\Gamma_1 \in G_1^{n(\psi)+\zeta(\psi)}$ and $\Gamma_2 \in G_2^{n(\psi)+\zeta(\psi)}$ to the identity element of the cyclic group $G_T$.

[Computability]

There is an efficient calculation algorithm for $e_\psi(\Gamma_1, \Gamma_2)$ for any of the following elements.

$$\Gamma_1 \in G_1^{n(\psi)+\zeta(\psi)}, \Gamma_2 \in G_2^{n(\psi)+\zeta(\psi)} \quad (34)$$

According to this embodiment, a nondegenerate bilinear map that maps the direct current $G_1 \times G_2$ of the cyclic groups $G_1$ and $G_2$ to the cyclic group $G_T$ shown below is used to provide the bilinear map $e_\psi$.

$$\text{Pair}: G_1 \times G_2 \to G_T \quad (35)$$

The bilinear map $e_\psi$ according to this embodiment outputs one element of the cyclic group $G_T$ in response to input of an n(ψ)+ζ(ψ)-dimensional vector $(\gamma_1, \ldots, \gamma_{n(\psi)+\zeta(\psi)})$ formed by n(ψ)+ζ(ψ) elements $\gamma_\beta$ (β=1, ..., n(ψ)+ζ(ψ)) of the cyclic group $G_1$ and an n(ψ)+ζ(ψ)-dimensional vector $(\gamma_1^*, \gamma_{n(\psi)+\zeta(\psi)}^*)$ formed by n(ψ)+ζ(ψ) elements $\gamma_\beta^*$(β=1, ... n(ψ)+ζ(ψ)) of the cyclic group $G_2$.

$$e_\psi: \Pi_{\beta=1}^{n(\psi)+\zeta(\psi)} \text{Pair}(\gamma_\beta, \gamma_\beta^*) \quad (36)$$

The bilinear map Pair outputs one element of the cyclic group $G_T$ in response to a set of one element of the cyclic group $G_1$ and one element of the cyclic group $G_2$. The bilinear map Pair has the following properties.

[Bilinearity]

The bilinear map Pair satisfies the following relation for any elements of $\Omega_1 \in G_1$, $\Omega_2 \in G_2$, and ν, κ ∈$F_q$.

$$\text{Pair}(\nu \cdot \Omega_1, \kappa \cdot \Omega_2) = \text{Pair}(\Omega_1, \Omega_2)^{\nu \cdot \kappa} \quad (37)$$

[Nondegenerateness]

The bilinear map Pair is not a map that maps all the elements of $$\Omega_1 \in G_1, \Omega_2 \in G_2 \quad (38)$$

to the identity element of the cyclic group $G_T$.

[Computability]

There is an efficient calculation algorithm for Pair($\Omega_1$, $\Omega_2$) for any of the elements of $\Omega_1 \in G_1$ and $\Omega_2 \in G_2$.

Specific examples of the bilinear map Pair include functions for pairing calculations, such as Weil pairing and Tate pairing (see Reference literature 4 (Alfred. J. Menezes, "ELLIPTIC CURVE PUBLIC KEY CRYPTOSYSTEMS," KLUWER ACADEMIC PUBLISHERS, ISBN0-7923-9368-6, pp. 61 to 81), for example). Depending on the type of the elliptic curve E, a modified pairing function $e(\Omega_1, \text{phi}(\Omega_2))$ ($\Omega_1 \in G_1$, $\Omega_2 \in G_2$) that is a combination of a function for a pairing calculation, such as Tate pairing, and a predetermined function phi may be used as the bilinear map Pair (see Reference literature 2, for example). An algorithm for performing the paring calculation on a computer is the well-known Millers algorithm (see Reference literature 5 (V. S. Miller, "Short Programs for functions on Curves," 1986, Internet <http://crypto.stanford.edu/miller/miller.pdf>). Methods for forming an elliptic curve or a cyclic group that improves efficiency of the pairing calculation are well-known (see Reference literature 2, Reference literature 6 (A. Miyaji, M. Nakabayashi, S. Takano, "New explicit conditions of elliptic curve Traces for FR-Reduction," IEICE Trans. Fundamentals, vol. E84-A, no 05, pp. 1234 to 1243, May 2001), Reference literature 7 (P. S. L. M. Barreto, B. Lynn, M. Scott, "Constructing elliptic curves with prescribed embedding degrees," Proc. SCN '2002, LNCS 2576, pp. 257 to 267, Springer-Verlag. 2003), and Reference literature 8 (R. Dupont, A. Enge, F. Morain, "Building curves with arbitrary small MOV degree over finite prime fields," http://eprint.iacr.org/2002/094/), for example).

$a_i(\psi)$ ($i=1, \ldots, n(\psi)+\zeta(\psi)$): $a_i(\psi)$ represent $n(\psi)+\zeta(\psi)$-dimensional basis vectors each consisting of $n(\psi)+\zeta(\psi)$ elements of the cyclic group $G_1$. For example, the basis vectors $a_i(\psi)$ are $n(\psi)+\zeta(\psi)$-dimensional vectors the i-th elements of which are $\kappa_1 \cdot g_1 \in G_1$ and the remaining $n(\psi)+\zeta(\psi)-1$ elements of which are the identity elements of the cyclic group $G_1$ (expressed as "0" in additive terms). In this example, the elements of the $n(\psi)+\zeta(\psi)$-dimensional basis vectors $a_i(\psi)$ ($i=1, \ldots, n(\psi)+\zeta(\psi)$) are expressed as follows.

$$a_1(\psi) = (\kappa_1 \cdot g_1, 0, 0, \ldots, 0) \quad (39)$$

$$a_2(\psi) = (0, \kappa_1 \cdot g_1, 0, \ldots, 0)$$

$$\ldots$$

$$a_{n(\psi)+\zeta(\psi)}(\psi) = (0, 0, 0, \ldots, \kappa_1 \cdot g_1)$$

$\kappa_1$ represents a constant that is an element of the finite field $F_q$ other than the additive identity $0_F$, and a specific example of $\kappa_1 \in F_q$ is $\kappa_1=1_F$. The basis vectors $a_i(\psi)$ are orthogonal bases, and any $n(\psi)+\zeta(\psi)$-dimensional vector consisting of $n(\psi)+\zeta(\psi)$ elements of the cyclic group $G_1$ is expressed by a linear sum of the $n(\psi)+\zeta(\psi)$-dimensional basis vectors $a_i(\psi)$ ($i=1, \ldots, n(\psi)+\zeta(\psi)$). That is, the $n(\psi)+\zeta(\psi)$-dimensional basis vectors $a_i(\psi)$ span the vector space $V(\psi)$.

$a_i^*(\psi)$ ($i=1, \ldots, n(\psi)+\zeta(\psi)$): $a_i^*(\psi)$ represent $n(\psi)+\zeta(\psi)$-dimensional basis vectors each consisting of $n(\psi)+\zeta(\psi)$ elements of the cyclic group $G_2$. For example, the basis vectors $a_i^*(\psi)$ are $n(\psi)+\zeta(\psi)$-dimensional vectors the i-th elements of which are $\kappa_2 \cdot g_2 \in G_2$ and the remaining $n(\psi)+\zeta(\psi)-1$ elements of which are the identity elements of the cyclic group $G_2$ (expressed as "0" in additive terms). In this example, the elements of the $n(\psi)-\zeta(\psi)$-dimensional basis vectors $a_i^*(\psi)$ ($i=1, \ldots, n(\psi)+\zeta(\psi)$) are expressed as follows.

$$a_1^*(\psi) = (\kappa_2 \cdot g_2, 0, 0, \ldots, 0) \quad (40)$$

$$a_2^*(\psi) = (0, \kappa_2 \cdot g_2, 0, \ldots, 0)$$

$$\ldots$$

$$a_{n(\psi)+\zeta(\psi)}^*(\psi) = (0, 0, 0, \ldots, \kappa_2 \cdot g_2)$$

$\kappa_2$ represents a constant that is an element of the finite field $F_q$ other than the additive identity $0_F$, and a specific example of $\kappa_2 \in F_q$ is $\kappa_2=1_F$. The basis vectors $a_i^*(\psi)$ are orthogonal bases, and any $n(\psi)+\zeta(\psi)$-dimensional vector consisting of $n(\psi)+\zeta(\psi)$ elements of the cyclic group $G_2$ is expressed by a linear sum of the $n(\psi)+\zeta(\psi)$-dimensional basis vectors $a_i^*(\psi)$ ($i=1, \ldots, n(\psi)+\zeta(\psi)$). That is, the $n(\psi)+\zeta(\psi)$-dimensional basis vectors $a_i^*(\psi)$ span the vector space $V^*(\psi)$.

The basis vectors $a_i(\psi)$ and $a_i^*(\psi)$ satisfy the following relation with respect to the elements $\tau=\kappa_1 \cdot \kappa_2$ of the finite field $F_q$ other than $0_F$.

$$e_\psi(a_i(\psi), a_j^*(\omega)) = g_T^{\tau \cdot \delta(i,j)} \quad (41)$$

That is, if i=j, the following relation holds from the relations expressed by formulas (36) and (37).

$$e_\psi(a_i(\psi), a_j^*(\psi)) = \text{Pair}(\kappa_1 \cdot g_1, \kappa_2 \cdot g_2) \cdot \text{Pair}(0, 0) \cdot \ldots \cdot \text{Pair}(0, 0)$$

$$= \text{Pair}(g_1, g_2)^{\kappa_1 \cdot \kappa_2} \cdot \text{Pair}(g_1, g_2)^{0 \cdot 0} \cdot \ldots \cdot \text{Pair}(g_1, g_2)^{0 \cdot 0}$$

$$= \text{Pair}(g_1, g_2)^{\kappa_1 \cdot \kappa_2}$$

$$= g_T^\tau$$

The superscripts $\kappa 1$ and $\kappa 2$ represent $\kappa_1$ and $\kappa_2$, respectively. On the other hand, if i≠j, the right side of $e_\psi(a_i(\psi), a_j^*(\psi)) = \prod_{i=1}^{n(\psi)+\zeta(\psi)} \text{Pair}(a_i(\psi), a_j^*(\psi))$ does not include $\text{Pair}(\kappa_1 \cdot g_1, \kappa_2 \cdot g_2)$ but is the product of $\text{Pair}(\kappa_1 \cdot g_1, 0)$, $\text{Pair}(0, \kappa_2 \cdot g_2)$ and $\text{Pair}(0, 0)$. Furthermore, from the relation expressed by formula (37), a relation holds: $\text{Pair}(g_1, 0) = \text{Pair}(0, g_2) = \text{Pair}(g_1, g_2)^0$. Therefore, if i≠j, the following relation holds.

$$e_\psi(a_i(\psi), a_j^*(\psi)) = e_\psi(g_1, g_2)^0 = g_T^0$$

In particular, if $\tau=\kappa_1 \cdot \kappa_2=1_F$ (if $\kappa_1=\kappa_2=1_F$, for example), the following relation holds.

$$e(a_i(\psi), a_j^*(\psi)) = g_T^{\delta(i,j)} \quad (42)$$

$g_T^0=1$ is the identity element of the cyclic group $G_T$, and $g_T^1=g_T$ is the generator of the cyclic group $G_T$. The basis vectors $a_i(\psi)$ and $a_i^*(\psi)$ are dual normal orthogonal bases, and the vector spaces $V(\psi)$ and $V^*(\psi)$ are dual vector spaces capable of forming a bilinear map (dual pairing vector spaces (DPVSs)).

$A(\psi)$: $A(\psi)$ represents an $n(\psi)+\zeta(\psi)$ row by $n(\psi)+\zeta(\psi)$ column matrix consisting of the basis vectors $a_i(\psi)$ ($i=1, \ldots, n(\psi)+\zeta(\psi)$). For example, if the basis vectors $a_i(\psi)$ ($i=1, \ldots, n(\psi)+\zeta(\psi)$ are expressed by formula (39), the matrix $A(\psi)$ is expressed as follows.

$$A(\psi) = \begin{pmatrix} a_1(\psi) \\ a_2(\psi) \\ \vdots \\ a_{n(\psi)+\zeta(\psi)}(\psi) \end{pmatrix} = \begin{pmatrix} \kappa_1 \cdot g_1 & 0 & \ldots & 0 \\ 0 & \kappa_1 \cdot g_1 & & \vdots \\ \vdots & & \ddots & 0 \\ 0 & \ldots & 0 & \kappa_1 \cdot g_1 \end{pmatrix} \quad (43)$$

$A^*(\psi)$: $A^*(\psi)$ represents an $n(\psi)+\zeta(\psi)$ row by $n(\psi)+\zeta(\psi)$ column matrix consisting of the basis vectors $a_i^*(\psi)$ ($i=1, \ldots, n(\psi)+\zeta(\psi)$) For example, if the basis vectors $a_i^*(\psi)$ ($i=1, \ldots, n(\psi)+\zeta(\psi)$) are expressed by formula (40), the matrix $A^*(\psi)$ is expressed as follows.

$$A^*(\psi) = \begin{pmatrix} a_1^*(\psi) \\ a_2^*(\psi) \\ \vdots \\ a_{n(\psi)+\zeta(\psi)}^*(\psi) \end{pmatrix} = \begin{pmatrix} \kappa_2 \cdot g_2 & 0 & \cdots & 0 \\ 0 & \kappa_2 \cdot g_2 & & \vdots \\ \vdots & & \ddots & 0 \\ 0 & \cdots & 0 & \kappa_2 \cdot g_2 \end{pmatrix} \quad (44)$$

$X(\psi)$: $X(\psi)$ represents an $n(\psi)+\zeta(\psi)$ row by $n(\psi)+\zeta(\psi)$ column matrix consisting of the elements of the finite field $F_q$. The matrix $X(\psi)$ is used for coordinate transformation of the basis vectors $a_i(\psi)$. If i rows by j columns of elements of the matrix $X(\psi)$ ($i=1, \ldots, n(\psi)+\zeta(\psi)$, $j=1, \ldots, n(\psi)+\zeta(\psi)$) are denoted by $\chi_{i,j}(\psi) \in F_q$, the matrix $X(\psi)$ is expressed as follows.

$$X(\psi) = \begin{pmatrix} \chi_{1,1}(\psi) & \chi_{1,2}(\psi) & \cdots & \chi_{1,n(\psi)+\zeta(\psi)}(\psi) \\ \chi_{2,1}(\psi) & \chi_{2,2}(\psi) & & \vdots \\ \vdots & & \ddots & \vdots \\ \chi_{n(\psi)+\zeta(\psi),1}(\psi) & \chi_{n(\psi)+\zeta(\psi),2}(\psi) & \cdots & \chi_{n(\psi)+\zeta(\psi),n(\psi)+\zeta(\psi)}(\psi) \end{pmatrix} \quad (45)$$

Each element $\chi_{i,j}(\psi)$ of the matrix $X(\psi)$ is referred to as a transformation coefficient.

$X^*(\psi)$: $X^*(\psi)$ represents a matrix that satisfies a relation: $X^*(\psi) = \tau' \cdot (X(\psi)^{-1})^T$. $\tau' \in F_q$ is an arbitrary constant belonging to the finite field $F_q$, e.g., $\tau' = 1_F$. The matrix $X^*(\psi)$ is used for coordinate transformation of the basis vectors $a_i^*(\psi)$. If i rows by j columns of elements of the matrix $X^*(\psi)$ are denoted by $\chi_{i,j}^*(\psi) \in F_q$, the matrix $X^*(\psi)$ is expressed as follows.

$$X^*(\psi) = \begin{pmatrix} \chi_{1,1}^*(\psi) & \chi_{1,2}^*(\psi) & \cdots & \chi_{1,n(\psi)+\zeta(\psi)}^*(\psi) \\ \chi_{2,1}^*(\psi) & \chi_{2,2}^*(\psi) & & \vdots \\ \vdots & & \ddots & \vdots \\ \chi_{n(\psi)+\zeta(\psi),1}^*(\psi) & \chi_{n(\psi)+\zeta(\psi),2}^*(\psi) & \cdots & \chi_{n(\psi)+\zeta(\psi),n(\psi)+\zeta(\psi)}^*(\psi) \end{pmatrix} \quad (46)$$

Each element $\chi_{i,j}^*(\psi)$ of the matrix $X^*(\psi)$ is referred to as a transformation coefficient.

In this case, provided that a unit matrix with $n(\psi)+\zeta(\psi)$ rows and $n(\psi)+\zeta(\psi)$ columns is denoted by $I(\psi)$, a relation holds: $X(\psi)(X^*(\psi))^T = \tau' \cdot I(\psi)$. That is, the unit matrix is defined as follows.

$$I(\psi) = \begin{pmatrix} 1_F & 0_F & \cdots & 0_F \\ 0_F & 1_F & & \vdots \\ \vdots & & \ddots & 0_F \\ 0_F & 0_F & \cdots & 1_F \end{pmatrix} \quad (47)$$

With regard to this, the following relation holds.

$$\begin{pmatrix} \chi_{1,1}(\psi) & \chi_{1,2}(\psi) & \cdots & \chi_{1,n(\psi)+\zeta(\psi)}(\psi) \\ \chi_{2,1}(\psi) & \chi_{2,2}(\psi) & & \vdots \\ \vdots & & \ddots & \vdots \\ \chi_{n(\psi)+\zeta(\psi),1}(\psi) & \chi_{n(\psi)+\zeta(\psi),2}(\psi) & \cdots & \chi_{n(\psi)+\zeta(\psi),n(\psi)+\zeta(\psi)}(\psi) \end{pmatrix} \times \quad (48)$$

-continued $$\begin{pmatrix} \chi_{1,1}^*(\psi) & \chi_{2,1}^*(\psi) & \cdots & \chi_{n(\psi)+\zeta(\psi),1}^*(\psi) \\ \chi_{1,2}^*(\psi) & \chi_{2,2}^*(\psi) & & \vdots \\ \vdots & & \ddots & \vdots \\ \chi_{1,n(\psi)+\zeta(\psi)}^*(\psi) & \chi_{2,n(\psi)+\zeta(\psi)}^*(\psi) & \cdots & \chi_{n(\psi)+\zeta(\psi),n(\psi)+\zeta(\psi)}^*(\psi) \end{pmatrix} =$$

$$\tau' \cdot \begin{pmatrix} 1_F & 0_F & \cdots & 0_F \\ 0_F & 1_F & & \vdots \\ \vdots & & \ddots & 0_F \\ 0_F & 0_F & \cdots & 1_F \end{pmatrix}$$

The $n(\psi)+\zeta(\psi)$-dimensional vectors are defined as follows.

$$\vec{\chi_i}(\psi) = (\chi_{i,1}(\psi), \ldots, \chi_{i,n(\psi)+\zeta(\psi)}(\psi)) \quad (49)$$

$$\vec{\chi_j}^*(\psi) = (\chi_{j,1}^*(\psi), \ldots, \chi_{j,n(\psi)+\zeta(\psi)}^*(\psi)) \quad (50)$$

Then, from the relation expressed by formula (48), the inner product of the $n(\psi)+\zeta(\psi)$-dimensional vectors $\vec{\chi_i}(\psi)$ and $\vec{\chi_j}^*(\psi)$ is expressed as follows.

$$\vec{\chi_i}(\psi) \cdot \vec{\chi_j}^*(\psi) = \tau' \cdot \delta(i,j) \quad (51)$$

$b_i(\psi)$: $b_i(\psi)$ represent $n(\psi)+\zeta(\psi)$-dimensional basis vectors each consisting of $n(\psi)+\zeta(\psi)$ elements of the cyclic group $G_1$. $b_i(\psi)$ are obtained by coordinate transformation of the basis vectors $a_i(\psi)$ ($i=1, \ldots, n(\psi)+\zeta(\psi)$) using the matrix $X(\psi)$. More specifically, the basis vectors $b_i(\psi)$ are obtained by the following calculation.

$$b_i(\psi) = \sum_{j=1}^{n(\psi)+\zeta(\psi)} \chi_{i,j}(\psi) \cdot a_j(\psi) \quad (52)$$

For example, if the basis vectors $a_j(\psi)$ ($j=1, \ldots, n(\psi)+\zeta(\psi)$) are expressed by formula (39), the elements of the basis vectors $b_i(\psi)$ are expressed as follows.

$$b_i(\psi) = (\chi_{i,1}(\psi) \cdot \kappa_1 \cdot g_1, \chi_{i,2}(\psi) \cdot \kappa_1 \cdot g_1, \ldots, \chi_{i,n(\psi)+\zeta(\psi)}(\psi) \cdot \kappa_1 \cdot g_1) \quad (53)$$

Any $n(\psi)+\zeta(\psi)$-dimensional vector consisting of $n(\psi)+\zeta(\psi)$ elements of the cyclic group $G_1$ is expressed by a linear sum of the $n(\psi)+\zeta(\psi)$-dimensional basis vectors $b_i(\psi)$ ($i=1, \ldots, n(\psi)+\zeta(\psi)$). That is, the $n(\psi)+\zeta(\psi)$-dimensional basis vectors $b_i(\psi)$ span the vector space $V(\psi)$ described above.

$b_i^*(\psi)$: $b_i^*(\psi)$ represents $n(\psi)+\zeta(\psi)$-dimensional basis vectors each consisting of $n(\psi)+\zeta(\psi)$ elements of the cyclic group $G_2$. $b_i^*(\psi)$ are obtained by coordinate transformation of the basis vectors $a_i^*(\psi)$ ($i=1, \ldots, n(\psi)+\zeta(\psi)$) using the matrix $X^*(\psi)$. More specifically, the basis vectors $b_i^*(\psi)$ are obtained by the following calculation.

$$b_i^*(\psi) = \sum_{j=1}^{n(\psi)+\zeta(\psi)} \chi_{i,j}^*(\psi) \cdot a_j^*(\psi) \quad (54)$$

For example, if the basis vectors $a_{j^*(\psi)}$ ($j=1, \ldots, n(\psi)+\zeta(\psi)$) are expressed by formula (40), the elements of the basis vectors $b_i^*(\psi)$ are expressed as follows.

$$b_i^*(\psi) = (\chi_{i,1}^*(\psi) \cdot \kappa_2 \cdot g_2, \chi_{i,2}^*(\psi) \cdot \kappa_2 g_2, \ldots, \chi_{i,n(\psi)+\zeta(\psi)}^*(\psi) \cdot \kappa_2 g_2) \quad (55)$$

Any $n(\psi)+\zeta(\psi)$-dimensional vector consisting of $n(\psi)+\zeta(\psi)$ elements of the cyclic group $G_2$ is expressed by a linear sum of the $n(\psi)+\zeta(\psi)$-dimensional basis vectors $b_i^*(\psi)$ ($i=1, \ldots, n(\psi)+\zeta(\psi)$). That is, the $n(\psi)+\zeta(\psi)$-dimensional basis vectors $b_i^*(\psi)$ span the vector space $V^*(\psi)$ described above.

The basis vectors $b_i(\psi)$ and $b_i^*(\psi)$ satisfy the following relation with respect to the elements $\tau = \kappa_1 \cdot \kappa_2$ of the finite field $F_q$ other than $0_F$.

$$e_\psi(b_i(\psi), b_j^*(\psi)) = g_T^{\tau \cdot \tau' \cdot \delta(i,j)} \quad (56)$$

That is, from the relations expressed by formulas (36), (51), (53) and (55), the following relation holds.

$$e_\psi(b_i(\psi), b_j^*(\psi)) = \prod_{\beta=1}^{n(\psi)+\zeta(\psi)} \text{Pair}(\chi_{i,\beta}(\psi) \cdot \kappa_1 \cdot g_1, \chi_{j,\beta}^*(\psi) \cdot \kappa_2 \cdot g_2)$$
$$= \text{Pair}(g_1, g_2)^{\kappa_1 \cdot \kappa_2 \cdot \vec{\chi_i}(\psi) \cdot \vec{\chi_j}^*(\psi)}$$
$$= \text{Pair}(g_1, g_2)^{\tau \cdot \tau' \cdot \delta(i,j)}$$
$$= g_T^{\tau \cdot \tau' \cdot \delta(i,j)}$$

In particular, if $\tau = \kappa_1 \cdot \kappa_2 = 1_F$ ($\kappa_1 = \kappa_2 = 1_F$, for example) and $\tau' = 1_F$, the following relation holds.

$$e_\psi(b_i(\psi), b_j^*(\psi)) = g_T^{\delta(i,j)} \tag{57}$$

The basis vectors $b_i(\psi)$ and $b_i^*(\psi)$ are dual normal orthogonal bases of dual pairing vector spaces (the vector spaces $V(\psi)$ and $V^*(\psi)$).

If the relation expressed by formula (56) holds, other basis vectors $a_i(\psi)$ and $a_i^*(\psi)$ than those illustrated by formulas (39) and (40) or other basis vectors $b_i(\psi)$ and $b_i^*(\psi)$ than those illustrated by formulas (52) and (54) can also be used.

$B(\psi)$: $B(\psi)$ represents an $n(\psi)+\zeta(\psi)$ row by $n(\psi)+\zeta(\psi)$ column matrix consisting of the basis vectors $b_i(\psi)$ ($i=1, \ldots, n(\psi)+\zeta(\psi)$). A relation holds: $B(\psi) = X(\psi) \cdot A(\psi)$. For example, if the basis vectors $b_i(\psi)$ are expressed by formula (53), the matrix $B(\psi)$ is expressed as follows.

$$B(\psi) = \begin{pmatrix} b_1(\psi) \\ b_2(\psi) \\ \vdots \\ b_{n(\psi)+\zeta(\psi)}(\psi) \end{pmatrix} = \tag{58}$$

$$\begin{pmatrix} \chi_{1,1}(\psi) \cdot \kappa_1 \cdot g_1 & \cdots & \chi_{1,n(\psi)+\zeta(\psi)}(\psi) \cdot \kappa_1 g_1 \\ \vdots & \ddots & \vdots \\ \chi_{n(\psi)+\zeta(\psi),1}(\psi) \cdot \kappa_1 \cdot g_1 & \cdots & \chi_{n(\psi)+\zeta(\psi),n(\psi)+\zeta(\psi)}(\psi) \cdot \kappa_1 \cdot g_1 \end{pmatrix}$$

$B^*(\psi)$: $B^*(\psi)$ represents an $n(\psi)+\zeta(\psi)$ row by $n(\psi)+\zeta(\psi)$ column matrix consisting of the basis vectors $b_i^*(\psi)$ ($i=1, \ldots, n(\psi)+\zeta(\psi)$). A relation holds: $B^*(\psi) = X^*(\psi) \cdot A^*(\psi)$. For example, if the basis vectors $b_i^*(\psi)$ ($i=1, \ldots, n(\psi)+\zeta(\psi)$) are expressed by formula (55), the matrix $B^*(\psi)$ is expressed as follows.

$$B^*(\psi) = \begin{pmatrix} b_1^*(\psi) \\ b_2^*(\psi) \\ \vdots \\ b_{n(\psi)+\zeta(\psi)}^*(\psi) \end{pmatrix} = \tag{59}$$

$$\begin{pmatrix} \chi_{1,1}^*(\psi) \cdot \kappa_2 \cdot g_2 & \cdots & \chi_{1,n(\psi)+\zeta(\psi)}^*(\psi) \cdot \kappa_2 \cdot g_2 \\ \vdots & \ddots & \vdots \\ \chi_{n(\psi)+\zeta(\psi),1}^*(\psi) \cdot \kappa_2 \cdot g_2 & \cdots & \chi_{n(\psi)+\zeta(\psi),n(\psi)+\zeta(\psi)}^*(\psi) \cdot \kappa_2 \cdot g_2 \end{pmatrix}$$

$v(\lambda)^{\rightarrow}$: $v(\lambda)^{\rightarrow}$ represent $n(\lambda)$-dimensional vectors each consisting of elements of the finite field $F_q$.

$$v(\lambda)^{\rightarrow} = (v_1(\lambda), \ldots, v_{n(\lambda)}(\lambda)) \in F_q^{n(\lambda)} \tag{60}$$

$v_\mu(\lambda)$: $v_\mu(\lambda)$ represent $\mu$-th elements ($\mu=1, \ldots, n(\lambda)$) of the $n(\lambda)$-dimensional vectors $v(\lambda)^{\rightarrow}$.

$w(\lambda)^{\rightarrow}$: $w(\lambda)^{\rightarrow}$ represent $n(\lambda)$-dimensional vectors each consisting of elements of the finite field $F_q$.

$$w(\lambda)^{\rightarrow} = (w_1(\lambda), \ldots, w_{n(\lambda)}(\lambda)) \in F_q^{n(\lambda)} \tag{61}$$

$w_\mu(\lambda)$: $w_\mu(\lambda)$ represent $\mu$-th elements ($\mu=1, \ldots, n(\lambda)$) of the $n(\lambda)$-dimensional vectors $w_\mu(\lambda)^{\rightarrow}$.

Enc: Enc represents a common key encryption function that represents an encryption processing according to the common key cryptography.

$\text{Enc}_K(M)$: $\text{Enc}_K(M)$ represents a ciphertext obtained by encryption of a plaintext M according to the common key encryption function Enc using a common key K.

Dec: Dec represents a common key decryption function that represents a decryption processing according to the common key cryptography.

$\text{Dec}_K(C)$: $\text{Dec}_K(C)$ represents a decryption result obtained by decryption of a ciphertext C according to the common key decryption function Dec using the common key K.

<Functional Encryption Scheme>

Next, a basic configuration of a functional encryption scheme will be described.

The functional encryption scheme is a scheme according to which a ciphertext is decrypted if the truth value of a logical formula determined by a combination of first information and second information is "true." One of the first and second information is embedded in the ciphertext, and the other is embedded in key information. For example, the predicate encryption scheme disclosed in "Predicate Encryption Supporting Disjunctions, Polynomial Equations, and Inner Products," with Amit Sahai and Brent Waters One of 4 papers from Eurocrypt 2008 invited to the Journal of Cryptology (Reference literature 9) is a functional encryption scheme.

There are various other well-known functional encryption schemes. In the following, however, a new functional encryption scheme that has not been published yet will be described. According to the new functional encryption scheme described below, a value corresponding to secret information is hierarchically secret-shared in a mode that depends on a predetermined logical formula. The predetermined logical formula includes propositional variables whose truth value are determined by the combination of first information and second information and includes some or all of the logical symbols $\wedge$, $\vee$ and $\neg$ as required. If the truth value of the predetermined logical formula determined by the truth values of propositional variables is "true," the value corresponding to the secret value is reconstructed, and the ciphertext is decrypted based on the reconstructed value.

<Relationship Between Logical Formula and Hierarchical Secret Sharing>

A relationship between the predetermined logical formula and the hierarchical secret sharing will be described.

As described above, according to the (N, N) threshold secret sharing scheme, although the secret information SE can be reconstructed if all the share information share(1), share(N) are given, the secret information SE cannot be obtained at all if N−1 arbitrary pieces of share information share($\phi_1$), share($\phi_{N-1}$) are given. According to the ($K_t$,N) threshold secret sharing scheme, although the secret information SE can be reconstructed if $K_t$ different arbitrary pieces of share information share($\phi_1$), share($\phi_{Kt}$) are given, the secret information SE cannot be obtained at all if $K_t$-1 arbitrary pieces of share information share($\phi$1), share($\phi_{Kt-1}$) are given.

These secret sharing schemes can be performed on a field. Furthermore, these schemes can be extended to share a value corresponding to secret information SE into values corresponding to share information, shares, by secret sharing. The value corresponding to secret information SE is the secret information SE itself or a function value of the secret information SE, and values corresponding to the share information, shares, are the pieces of share information, shares, themselves or function values of the share information. For example, an element $g_T^{SE} \in G_T$ corresponding to secret information $SE \in F_q$ that is an element of the finite field $F_q$ can be secret-shared into elements $g_T^{share(1)}$, $g_T^{share(2)} \in G_T$ of the cyclic group $G_T$ that correspond to share information, share (1), share(2) by secret sharing. The secret information SE described above is a linear combination of the share information "share." The secret sharing scheme in which the secret information SE is a linear combination of share information, share, is referred to as a linear secret sharing scheme.

The predetermined logical formula described above can be represented by tree-structure data obtained by hierarchical secret sharing of secret information. That is, according to the De Morgan's laws, the predetermined logical formula described above can be represented by a logical formula comprising literals or a logical formula comprising at least some of the logical symbols ∧ and ∨ and literals (such a logical formula will be referred to as the "normal form logical formula"), and the normal form logical formula can be represented by tree-structure data obtained by hierarchical secret sharing of secret information.

The tree-structure data that represents the normal form logical formula includes a plurality of nodes, at least some of the nodes are parent nodes of one or more child nodes, one of the parent nodes is a root node, and at least some of the child nodes are leaf nodes. A parent node of a root node or a child node of a leaf node does not exist. The root node corresponds to the value corresponding to the secret information, and the child nodes of each parent node correspond to the values corresponding to the pieces of share information obtained by secret sharing of the value corresponding to the parent node. The way of secret sharing in each node (the secret sharing scheme and the threshold) depends on the normal form logical formula. The leaf nodes correspond to literals forming the normal form logical formula, and the truth values of literals are determined by the combination of the first information and the second information.

It is assumed that the value corresponding to the share information corresponding to the leaf node corresponding to the literal whose truth value is true is obtained, although the value corresponding to the share information corresponding to the leaf node corresponding to the literal whose truth value is false is not obtained. Because of the property of the secret sharing described above, the value corresponding to the share information corresponding to the parent node (the value corresponding to the secret information if the parent node is the root node) is reconstructed only if the number of values corresponding to the share information corresponding to the child nodes of the parent node is equal to or greater than the threshold associated with the parent node. Accordingly, whether the value that is dependent on the secret information corresponding to the root node can be recovered or not is ultimately determined by which leaf node's literal has returned true as its truth value and by the configuration (including the way of secret sharing at each node) of the tree-structure data. The tree-structure data represents the normal logical formula if the tree-structure data is configured in such a way that the value dependent on the secret information corresponding to the root node can be ultimately recovered only when the truth values of the literals corresponding to the leaf nodes allow the normal logical formula to return true as its truth value. The tree-structure data that represents the normal form logical formula can be readily set. The following are specific examples thereof.

Figure 15:
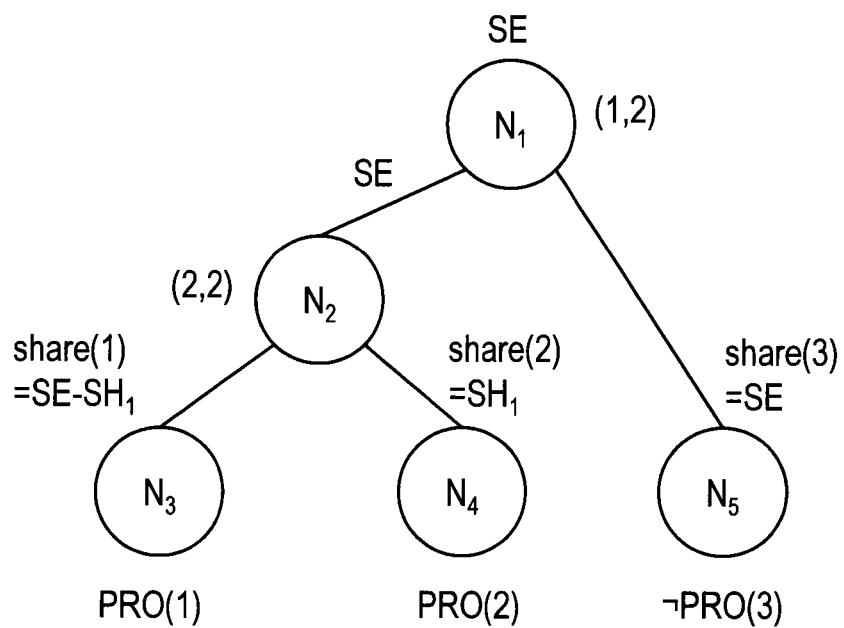
FIG. 15 is a diagram illustrating tree-structure data that represents a normal form logical formula.

FIG. 15 is a diagram illustrating tree-structure data that represents a normal form logical formula PRO(1)∧ PRO(2) ∨¬ PRO(3) including propositional variables PRO(1) and PRO(2), the negation ¬ PRO(3) of a propositional variable PRO(3) and the logical symbols ∧ and ∨. The tree-structure data illustrated in FIG. 15 includes a plurality of nodes $N_1, \ldots, N_5$. The node $N_1$ is a parent node of the nodes $N_2$ and $N_5$, the node $N_2$ is a parent node of the nodes $N_3$ and $N_4$, one node $N_1$ of the parent nodes is the root node, and some nodes $N_3$, $N_4$ and $N_5$ of the child nodes are leaf nodes. The node $N_1$ corresponds to the value corresponding to the secret information SE, the child nodes $N_2$ and $N_5$ of the node $N_1$ correspond to the values corresponding to share information SE and SE obtained by secret sharing of the value corresponding to the secret information SE according to a (1, 2) threshold secret sharing scheme. The child nodes $N_3$ and $N_4$ of the node $N_2$ correspond to the values corresponding to share information $SE-SH_1$ and $SH_1$ obtained by secret sharing of the value corresponding to the share information SE according to a (2, 2) threshold secret sharing scheme, respectively. That is, the leaf node $N_3$ corresponds to the value corresponding to share information share(1)=$SE-SH_1$, the leaf node $N_4$ corresponds to the value corresponding to share information share(2)= $SH_1$, and the leaf node $N_5$ corresponds to the value corresponding to share information share(3)=SE. The leaf nodes $N_3$, $N_4$ and $N_5$ correspond to the literals PRO(1), PRO(2) and ¬ PRO(3) forming the normal form logical formula PRO (1)∧ PRO(2)∨ ¬ PRO(3), respectively, and the truth values of the literals PRO(1), PRO(2) and ¬ PRO(3) are determined by the combination of the first information and the second information. The value corresponding to the share information corresponding to the leaf node corresponding to the literal whose truth value is true is obtained, although the value corresponding to the share information corresponding to the leaf node corresponding to the literal whose truth value is false is not obtained. In this case, the value corresponding to the secret information SE is reconstructed only if the combination of the first information and the second information makes the truth value of the normal form logical formula PRO(1)∧ PRO(2)∨ a ¬ PRO(3) true.

Figure 16:
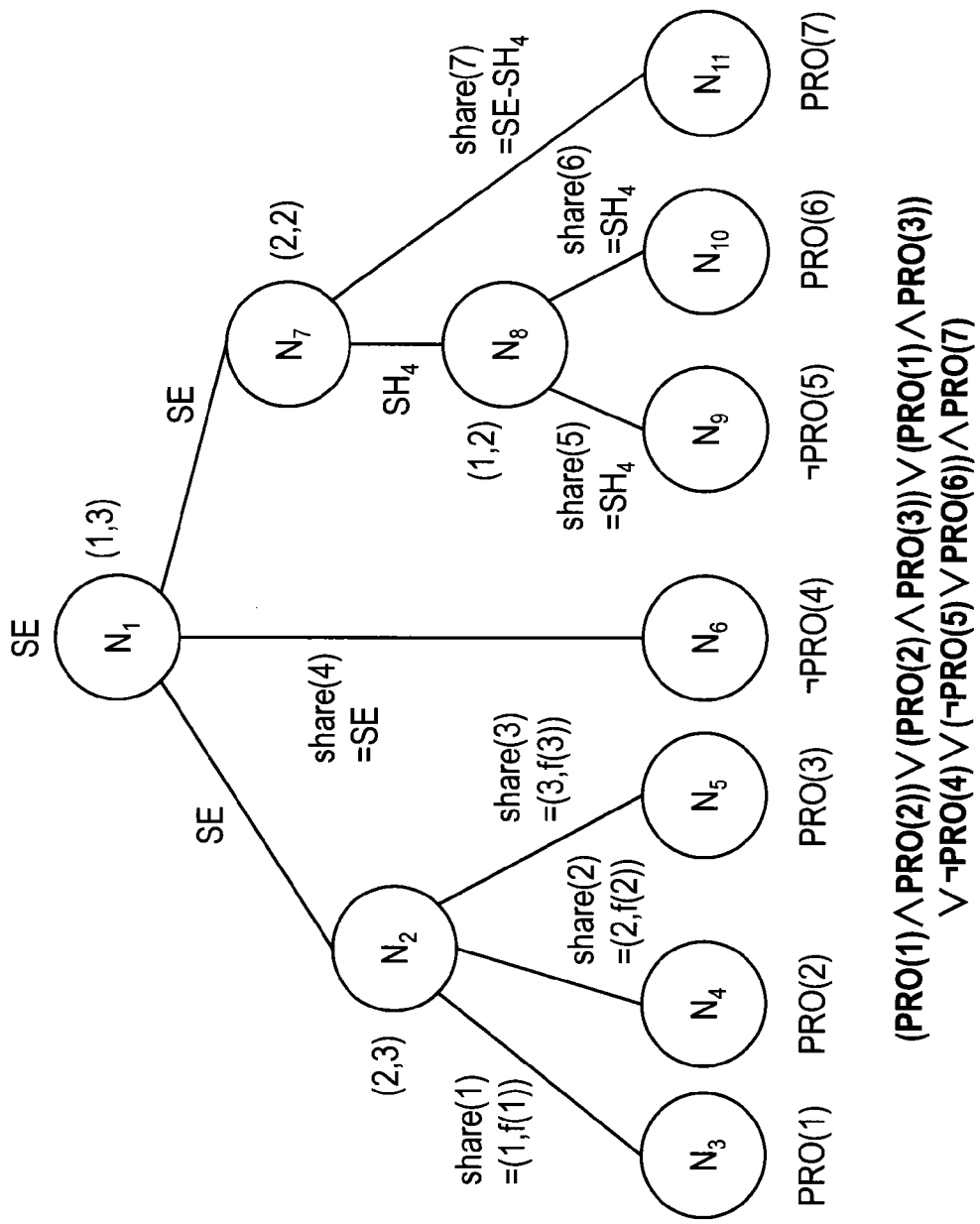
FIG. 16 is a diagram illustrating tree-structure data that represents a normal form logical formula.

FIG. 16 is a diagram illustrating tree-structure data that represents a normal form logical formula (PRO(1)∧ PRO(2)) ∨ (PRO(2)∧ PRO(3))∨ (PRO(1)∧ PRO(3))∨¬ PRO(4) ∨ (PRO(5)∨ PRO(6))∧ PRO(7) including propositional variables PRO(1), PRO(2), PRO(3), PRO(6) and PRO(7), negations ¬ PRO(4) and ¬ PRO(5) of propositional variables PRO(4) and PRO(5) and logical symbols ∧ and ∨.

The tree-structure data illustrated in FIG. 16 includes a plurality of nodes $N_1, \ldots, N_{11}$. The node $N_1$ is a parent node of the nodes $N_2$, $N_6$ and $N_7$, the node $N_2$ is a parent node of the nodes $N_3$, $N_4$ and $N_5$, the node $N_7$ is a parent node of the nodes $N_8$ and $N_{11}$, the node $N_8$ is a parent node of the nodes $N_9$ and $N_{10}$, one node $N_1$ of the parent nodes is the root node, and some nodes $N_3$, $N_4$, $N_5$, $N_6$, $N_9$, $N_{10}$ and $N_{11}$ of the child nodes are leaf nodes. The node $N_1$ corresponds to the value corresponding to the secret information SE, the child nodes $N_2$, $N_6$ and $N_7$ of the node $N_1$ correspond to the values corresponding to share information SE, SE and SE obtained by secret sharing of the value corresponding to the secret information SE according to a (1, 3) threshold secret sharing scheme. The child nodes $N_3$, $N_4$ and $N_5$ of the node $N_2$ correspond to the values corresponding to share information (1, f(1)), (2, f(2)) and (3, f(3)) obtained by secret sharing of the value corresponding to the share information SE according to a (2, 3) threshold secret sharing scheme, respectively. The child nodes $N_8$ and $N_{11}$ of the node $N_7$ correspond to the values corresponding to share information $SH_4$ and $SE-SH_4$ obtained by secret sharing of the value corresponding to the share information SE according to a (2, 2) threshold secret sharing scheme, respectively. The child nodes $N_9$ and $N_{10}$ of the node $N_8$ correspond to the values corresponding to share information $SH_4$ and $SH_4$ obtained by secret sharing of the value corresponding to the share information $SH_4$ according to a (1, 2) threshold secret sharing scheme, respectively. That is, the leaf node $N_3$ corresponds to the value corresponding to share information share(1)=(1, f(1)), the leaf node $N_4$ corresponds to the value corresponding to share information share(2)=(2, f(2)), the leaf node $N_5$ corresponds to the value corresponding to share information share(3)=(3, f(3)), the leaf node $N_6$ corresponds to the value corresponding to share information share(4)=SE, the leaf node $N_9$ corresponds to the value corresponding to share information share(5)=$SH_4$, the leaf node $N_{10}$ corresponds to the value corresponding to share information share(6)=$SH_4$, and the leaf node $N_{11}$ corresponds to the value corresponding to share information share(7)= SE−$SH_4$. The leaf nodes $N_3$, $N_4$, $N_5$, $N_6$, $N_9$, $N_{10}$ and $N_{11}$ correspond to the literals PRO(1), PRO(2), PRO(3), ¬ PRO(4), ¬ PRO(5), PRO(6) and PRO(7) forming the normal form logical formula (PRO(1)∧ PRO(2))∨ (PRO(2)∧ PRO(3)) ∨ (PRO(1)∧ PRO(3))∨¬ PRO(4)  ∨ (¬ PRO(5)∨ PRO(6)) ∧ PRO(7), respectively, and the truth values of the literals PRO(1), PRO(2), PRO(3), ¬ PRO(4), ¬ PRO(5), PRO(6) and PRO(7) are determined by the combination of the first information and the second information. The values corresponding to the share information corresponding to the leaf node corresponding to the literal whose truth value is true is obtained, although the value corresponding to the share information corresponding to the leaf node corresponding to the literal whose truth value is false is not obtained. In this case, the value corresponding to the secret information SE is reconstructed only if the combination of the first information and the second information makes the truth value of the normal form logical formula (PRO(1)∧ PRO(2))∨ (PRO(2)∧ PRO(3))∨ (PRO(1)∧ PRO(3))∨¬ PRO(4)∨ (¬ PRO(5) ∨ PRO(6))∧ PRO(7) true.

<Access Structure>

In the case where the predetermined logical formula is represented by the tree-structure data obtained by hierarchical secret sharing of the secret information as described above, whether the truth value of the logical formula determined by the combination of the first information and the second information is "true" or "false" can be determined based on whether or not the value corresponding to the secret information can be reconstructed from the values corresponding to the share information corresponding to the leaf nodes obtained for the combination of the first information and the second information. In the following, a mechanism that accepts the combination of the first information and the second information if the truth value of the logical formula determined by the combination of the first information and the second information is "true" and rejects the combination of the first information and the second information if the truth value is "false" will be referred to as an access structure.

It is assumed that the total number of leaf nodes in the tree-structure data that represents the predetermined logical formula as described above is denoted by $\Psi$, and identifiers corresponding to the leaf nodes are denoted by $\lambda=1, \ldots, \Psi$. It is also assumed that the first information is a set $\{v(\lambda)^{\rightarrow}\}_{\lambda=1, \ldots, \Psi}$ of $n(\lambda)$-dimensional vectors $v(\lambda)^{\rightarrow}$ corresponding to the leaf nodes, and the second information is a set $\{w(\lambda)^{\rightarrow}\}_{\lambda=1, \ldots, \Psi}$ of $n(\lambda)$-dimensional vectors $w(\lambda)^{\rightarrow}$. The tree-structure data described above is implemented as a labeled matrix LMT(MT, LAB).

The labeled matrix LMT(MT, LAB) includes the following matrix MT with $\Psi$ rows and COL columns (COL≥1) and labels LAB($\lambda$) associated with rows $\lambda=1, \ldots, \Psi$ of the matrix MT.

$$MT = \begin{pmatrix} mt_{1,1} & \cdots & mt_{1,COL} \\ \vdots & \ddots & \vdots \\ mt_{\Psi,1} & \cdots & mt_{\Psi,COL} \end{pmatrix} \quad (62)$$

Each element $mt_{\lambda,col}$ (col=1, ..., COL) of the matrix MT satisfies two requirements described below. First, if the root node of the tree-structure data that represents the predetermined logical formula corresponds to the value corresponding to the secret information SE$\in F_q$ as described above, the following relations hold between a COL-dimensional vector $GV^{\rightarrow}$ consisting of elements of the predetermined finite field $F_q$ and COL-dimensional vector $CV^{\rightarrow}$ consisting of elements of the finite field $F_q$ corresponding to the secret information SE.

$$GV^{\rightarrow}=(gv_1, \ldots, gv_{COL}) \in F_q^{COL} \quad (63)$$

$$CV^{\rightarrow}=(cv_1, \ldots, cv_{COL}) \in F_q^{COL} \quad (64)$$

$$SE=GV^{\rightarrow} \cdot (CV^{\rightarrow})^T \quad (65)$$

The following is a specific example of the COL-dimensional vector $GV^{\rightarrow}$.

$$GV^{\rightarrow}=(1_F, \ldots, 1_F) \in F_q^{COL} \quad (66)$$

Note that other COL-dimensional vectors $GV^{\rightarrow}$, such as $GV^{\rightarrow}=(1_F, 0_F, \ldots, 0_F) \in F_q^{COL}$, are also possible.

Second, if the leaf nodes corresponding to the identifiers $\lambda$ correspond to the values corresponding to the share information share($\lambda$)$\in F_q$, the following relation holds.

$$(share(1), \ldots, share(\Psi))^T = MT \cdot (CV^{\rightarrow})^T \quad (67)$$

As described above, if the tree-structure data that represents the predetermined logical formula is determined, the matrix MT that satisfies the two requirements can be readily selected. Even if the secret information SE or the share information share($\lambda$) is a variable, the matrix MT that satisfies the two requirements can be readily selected. That is, the value of the secret information SE or the share information share($\lambda$) may be determined after the matrix MT is determined.

The label LAB($\lambda$) associated with each row $\lambda=1, \ldots, \Psi$ of the matrix MT corresponds to the literal (PRO($\lambda$) or ¬ PRO($\lambda$)) corresponding to the leaf node corresponding to the identifier $\lambda$. It is assumed herein that if the truth value of the propositional variable PRO($\lambda$) is "true", it is equivalent to that the inner product $v(\lambda)^{\rightarrow} \cdot w(\lambda)^{\rightarrow}$ of the $v(\lambda)^{\rightarrow}$ included in the first information VSET1=$\{\lambda, v(\lambda)^{\rightarrow}|\lambda=1, \ldots, \Psi\}$ and $w(\lambda)^{\rightarrow}$ included in the second information VSET2=$\{\lambda, w(\lambda)^{\rightarrow}|\lambda=1, \ldots, \Psi\}$ is 0, and that if the truth value of the propositional variable PRO($\lambda$) is "false," it is equivalent to that the inner product $v(\lambda)^{\rightarrow} \cdot w(\lambda)^{\rightarrow}$ is not 0. It is also assumed that the label LAB($\lambda$) corresponding to PRO($\lambda$) represents $v(\lambda)^{\rightarrow}$, and the label LAB($\lambda$) corresponding to ¬ PRO($\lambda$) represents ¬ $v(\lambda)^{\rightarrow}$. ¬ $v(\lambda)^{\rightarrow}$ is a logical formula of the negation of $v(\lambda)^{\rightarrow}$, and $v(\lambda)^{\rightarrow}$ can be identified from ¬ $v(\lambda)^{\rightarrow}$. The expression "LAB($\lambda$)=$v(\lambda)^{\rightarrow}$" means that LAB($\lambda$) represents $v(\lambda)^{\rightarrow}$, and the expression "LAB($\lambda$)=¬ $v(\lambda)^{\rightarrow}$" means that LAB($\lambda$) represents ¬ $v(\lambda)^{\rightarrow}$. A set $\{LAB(\lambda)\}_{\lambda=1, \ldots, \Psi}$ of LAB($\lambda$)'s ($\lambda=1, \ldots, \Psi$) is expressed as LAB.

A $\Psi$-dimensional vector $TFV^{\rightarrow}$ is defined as follows.

$$TFV^{\rightarrow}=(tfv(1), \ldots, tfv(\Psi)) \quad (68)$$

The element tfv(λ) is 1 (tfv(λ)=1) if the inner product $v(\lambda)^{\rightarrow} \cdot w(\lambda)^{\rightarrow}$ is 0, and 0 (tfv(λ)=0) if the inner product is not 0.

$$tfv(\lambda)=1(\text{PRO}(\lambda) \text{ is true}) \text{ if } v(k)^{\rightarrow} \cdot w(\lambda)^{\rightarrow}=0 \quad (69)$$

$$tfv(\lambda)=0(\text{PRO}(\lambda) \text{ is false}) \text{ if } v(\lambda)^{\rightarrow} \cdot w(\lambda)^{\rightarrow} \neq 0 \quad (70)$$

Furthermore, LIT(λ)=1 if the truth value of the following logical formula is "true," and LIT(λ)=0 if the logical formula is "false."

$$\{(LAB(\lambda)=v(\lambda)^{\rightarrow}) \wedge (tfv(\lambda)=1)\} \vee \{(LAB(\lambda)=\neg v(\lambda)^{\rightarrow})) \wedge (tfv(\lambda)=0)\} \quad (71)$$

That is, LIT(λ)=1 if the truth value of the literal corresponding to the leaf node corresponding to the identifier λ is "true," and LIT(λ)=0 if the truth value is "false." Then, a submatrix $MT_{TFV}$ made up only of row vectors $mt_\lambda^{\rightarrow}=(mt_{\lambda,1},\ldots,mt_{\lambda,COL})$ that yield LIT(λ)=1 among the vectors in the matrix MT can be written as $$MT_{TFV}=(MT)_{LIT(\lambda)=1} \quad (72)$$

If the secret sharing scheme described above is a linear secret sharing scheme, that the value corresponding to the secret information SE can be reconstructed from the values corresponding to the share information share(λ) corresponding to the identifiers λ is equivalent to that the COL-dimensional vector $GV^{\rightarrow}$ belongs to the vector space formed by the row vectors $mt_\lambda^{\rightarrow}$ corresponding to the identifiers λ. That is, whether the value corresponding to the secret information SE can be reconstructed from the values corresponding to the share information share(λ) corresponding to the identifiers λ can be determined by determining whether or not the COL-dimensional vector $GV^{\rightarrow}$ belongs to the vector space spanned by the row vectors $mt_\lambda^{\rightarrow}$ corresponding to the identifiers λ. The "vector space formed by the row vectors $mt_\lambda^{\rightarrow}$" means a vector space that can be expressed by a linear combination of the row vectors $mt_\lambda^{\rightarrow}$.

It is assumed that the combination of the first information and the second information is accepted if the COL-dimensional vector $GV^{\rightarrow}$ belongs to a vector space "span<$MT_{TFV}$>" spanned by the row vectors $mt_\lambda^{\rightarrow}$ of the submatrix $MT_{TFV}$ described above, and is otherwise rejected. In this way, the access structure described above is embodied. In the case where the labeled matrix LMT(MT, LAB) corresponds to the first embodiment as described above, if the access structure accepts the combination of the first information and the second information, it is described as "the access structure accepts the second information," and if the access structure does not accept the combination of the first information and the second information, it is described as "the access structure rejects the second information."

accept if $GV^{\rightarrow} \in \text{span}<MT_{TFV}>$ reject if $\neg (GV^{\rightarrow} \in \text{span}<MT_{TFV}>)$ In the case where $GV^{\rightarrow} \in \text{span}<MT_{TFV}>$, there are constants const(μ) that satisfy the following relation, and the constants const(μ) can be determined in a polynomial time of the order of the size of the matrix MT.

$$SE=\Sigma_{\mu \in SET} \text{const}(\mu) \cdot \text{share}(\mu) \quad (73)$$

$$\{\text{const}(\mu) \in F_q | \mu \in SET\}, SET \subseteq \{1,\ldots,\lambda | LIT(\lambda)=1\}$$

<Basic Scheme of Functional Encryption Scheme Using Access Structure>

In the following, a basic scheme for forming key encapsulation mechanisms (KEM) with the functional encryption scheme using the access structure will be illustrated. The basic scheme involves Setup($1^{sec}$, (Ψ; n(1), ..., n(Ψ))), GenKey(PK, MSK, LMT(MT, LAB)), Enc(PK, M, {λ, v(λ)$^{\rightarrow}$|λ=1, ..., Ψ})($v_1(\lambda)=1_F$) and Dec(PK, SKS, C). In addition, the first element $w_1(\lambda)$ of the second information VSET2={λ, w(λ)$^{\rightarrow}$|λ=1, ..., Ψ} is $1_F$.

[Setup($1^{sec}$, (Ψ; n(1), ..., n(Ψ))); setup]

Input: $1^{sec}$, (Ψ; n(1), ..., n(Ψ))

Output: master key information MSK, public parameters PK

In setup, the following processing is performed for each ψ=0, ..., Ψ.

(Setup-1) Using $1^{sec}$ as an input, the order q, the elliptic curve E, the cyclic groups $G_1$, $G_2$ and $G_T$, the bilinear map $e_\psi(\psi=0, \ldots, \Psi)$ for the security parameter sec are generated (param=(q, E, $G_1$, $G_2$, $G_T$, $e_\psi$).

(Setup-2) τ' $\in F_q$ is selected, and the matrixes X(ψ) and X*(ψ) that satisfy a relation: $X^*(\psi)=\tau' \cdot (X(\psi)^{-1})^T$ are selected.

(Setup-3) Coordinate transformation of the basis vectors $a_i(\psi)$ (i=1, ..., n(ψ)+ζ(ψ)) is performed according to formula (52) to generate n(ψ)+ζ(ψ)-dimensional basis vectors $b_i(\psi)$ (i=1, ..., n(ψ)+ζ(ψ)). The n(ψ)+ζ(ψ) row by n(ψ)+ζ(ψ) column matrix B(ψ) consisting of the basis vectors $b_i(\psi)$ (i=1, ..., n(ψ)+ζ(ψ)) is generated.

(Setup-4) Coordinate transformation of the basis vectors $a_i^*(\psi)$ (i=1, ..., n(ψ)+ζ(ψ)) is performed according to formula (54) to generate n(ψ)+ζ(ψ)-dimensional basis vectors $b_i^*(\psi)$ (i=1, ..., n(ψ)+ζ(ψ)). The n(ψ)+ζ(ψ) row by n(ψ)+ζ(ψ) column matrix B*(ψ) consisting of the basis vectors $b_i^*(\psi)$ (i=1, ..., n(ψ)+ζ(ψ)) is generated.

(Setup-5) A set $\{B^*(\psi)^{\wedge}\}_{\psi=0,\ldots,\Psi}$ of $B^*(\psi)^{\wedge}$ is set as the master key information (MSK=$\{B^*(\psi)^{\wedge}\}_{\psi=0,\ldots,\Psi}$). A set $\{B(\psi)^{\wedge}\}_{\psi=0,\ldots,\Psi}$ of $B(\psi)^{\wedge}$, $1^{sec}$ and param are set as the public parameters PK. Note that $B^*(\psi)^{\wedge}$ is the matrix B*(ψ) or a submatrix thereof, and $B(\psi)^{\wedge}$ is the matrix B(ψ) or a submatrix thereof. The set $\{B^*(\psi)^{\wedge}\}_{\psi=0,\ldots,\Psi}$ includes at least $b_1^*(0), b_1^*(\lambda), \ldots,$ and $b_{n(\lambda)}^*(\lambda)$ (λ=1, ..., Ψ). The set $\{B(\psi)^{\wedge}\}_{\psi=0,\ldots,\Psi}$ includes at least $b_1(0), b_1(\lambda), b_{n(\lambda)}(\lambda)$ (λ=1, ..., Ψ). The following is an example.

$$n(0)+\zeta(0) \geq 5, \zeta(\lambda)=3 \cdot n(\lambda)$$

$$B(0)^{\wedge}=(b_1(0) b_3(0) b_5(0))^T$$

$$B(\lambda)^{\wedge}=(b_1(\lambda) \ldots b_{n(\lambda)}(\lambda) b_{3 \cdot n(\lambda)+1}(\lambda) \ldots b_{4 \cdot n(\lambda)}(\lambda))^T$$
$$(\lambda=1,\ldots,\Psi)$$

$$B^*(0)^{\wedge}=(b_1^*(0) b_3^*(0) b_4^*(0))^T$$

$$B^*(\lambda)^{\wedge}=(b_1^*(\lambda) \ldots b_{n(\lambda)}^*(\lambda) b_{2 \cdot n(\lambda)+1}^*(\lambda) \ldots b_{3 \cdot n(\lambda)}^*(\lambda))^T (\lambda=1,\ldots,\Psi)$$

[GenKey (PK, MSK, LMT(MT, LAB)): Key Information Generation]

Input: public parameters PK, master key information MSK, labeled matrix LMT(MT, LAB) corresponding to first information VSET1={λ, v(λ)$^{\rightarrow}$|λ=1, ..., Ψ}

Output: key information SKS (GenKey-1) The following processing is performed on the secret information SE that satisfies formulas (63) to (67).

$$D^*(0)=-SE \cdot b_1^*(0)+\Sigma_{i=2}^I \text{coef}_i(0) \cdot b_i^*(0) \quad (74)$$

Note that I is a constant equal to or greater than 2 and equal to or smaller than n(0)+ζ(0). $\text{coef}_i(0) \in F_q$ are constants or random numbers.

The "random number" means a true random number or a pseudo-random number. The following is an example of D*(0). Note that $\text{coef}_4(0)$ in formula (75) is a random number.

$$D^*(0)=-SE \cdot b_1^*(0)+b_3^*(0)+\text{coef}_4(0) \cdot b_4^*(0) \quad (75)$$

(GenKey-2) The following processing is performed on each share($\lambda$) ($\lambda=1, \ldots, \Psi$) that satisfies formulas (63) to (67).

For $\lambda$ that satisfies a relation: $LAB(\lambda)=v(\lambda)^{\rightarrow}$, the following $D^*(\lambda)$ is generated.

$$D^*(\lambda) = (share(\lambda) + coef(\lambda) \cdot v_1(\lambda)) \cdot b_1^*(\lambda) + \sum_{i=2}^{n(\lambda)} coef(\lambda) \cdot v_i(\lambda) \cdot b_i^*(\lambda) + \sum_{i=n(\lambda)+1}^{n(\lambda)+\zeta(\lambda)} coef_i(\lambda) \cdot b_i^*(\lambda) \quad (76)$$

For $\lambda$, that satisfies a relation: $LAB(\lambda)=\neg v(\lambda)^{\rightarrow}$, the following $D^*(\lambda)$ is generated.

$$D^*(\lambda)=share(\lambda) \cdot \Sigma_{t=1}^{n(\lambda)} v_t(\lambda) \cdot b_t^*(\lambda) + \Sigma_{t=n(\lambda)+1}^{n(\lambda)+\zeta(\lambda)} coef_t(\lambda) \cdot b_t^*(\lambda) \cdot \quad (77)$$

Note that $coef(\lambda)$, $coef_t(\lambda) \in F_q$ are constants or random numbers. The following is an example.

For $\lambda$ that satisfies a relation: $LAB(\lambda)=v(\lambda)^{\rightarrow}$, the following $D^*(\lambda)$ is generated, for example.

$$D^*(\lambda) = (share(\lambda) + coef(\lambda) \cdot v_1(\lambda)) \cdot b_1^*(\lambda) + \sum_{i=2}^{n(\lambda)} coef(\lambda) \cdot v_i(\lambda) \cdot b_i^*(\lambda) + \sum_{i=2 \cdot n(\lambda)+1}^{3 \cdot n(\lambda)} coef_i(\lambda) \cdot b_i^*(\lambda) \quad (78)$$

For $\lambda$ that satisfies a relation: $LAB(\lambda)=\neg v(\lambda)^{\rightarrow}$, the following $D^*(\lambda)$ is generated, for example.

$$D^*(\lambda)=share(\lambda) \cdot \Sigma_{t=1}^{n(\lambda)} v_t(\lambda) \cdot b_t^*(\lambda) + \Sigma_{t=2 \cdot n(\lambda)+1}^{3 \cdot n(\lambda)} coef_t(\lambda) \cdot b_t^*(\lambda) \cdot \quad (79)$$

Note that $coef(\lambda)$ and $coef_t(\lambda)$ in formulas (78) and (79) are random numbers.

(GenKey-3) The following key information is generated.

$$SKS=(LMT(MT,LAB), D^*(0), D^*(1), \ldots, D(\psi)) \quad (80)$$

[Enc(PK, M, VSET2): Encryption]
Input: public parameter PK, plaintext M, second information $VSET2=\{\lambda, w(\lambda)^{\rightarrow} | \lambda=1, \ldots, \Psi\} (w_1(\lambda)=1_F)$
Output: ciphertext C
(Enc-1) A ciphertext $C(\psi)$ ($\psi=0, \ldots, \Psi$) with a common key K is generated by the following processing.

$$C(0)=\upsilon \cdot b_1(0) + \Sigma_{t=2}^{I} \upsilon_t(0) \cdot b_t(0) \quad (81)$$

$$C(\lambda)=\upsilon \cdot \Sigma_{t=1}^{n(\lambda)} w_t(\lambda) \cdot b_t(\lambda) + \Sigma_{t=n(\lambda)+1}^{n(\lambda)+\zeta(\lambda)} \upsilon_t(\lambda) \cdot b_t(\lambda) \quad (82)$$

Note that $\upsilon, \upsilon_t(\psi) \in F_q$ ($\psi=0, \ldots, \Psi$) are constants or random numbers, and the following relations hold.

$$(coef_2(0), \ldots, coef_I(0)) \cdot (\upsilon_2(0), \ldots, \upsilon_I(0))=\upsilon' \quad (83)$$

$$coef_t(\lambda) \cdot \upsilon_t(\lambda)=0_F (t=n(\lambda)+1, \ldots, n(\lambda)+\zeta(\lambda)) \quad (84)$$

An example of $\upsilon'$ is any one of $\upsilon_2(0), \ldots, \upsilon_I(0)$. For example, $\upsilon, \upsilon_3(0), \upsilon_5(0), \upsilon_{3 \cdot n(\lambda)+1}(\lambda), \ldots, \upsilon_{4 \cdot n(\lambda)}(\lambda)$ are random numbers, $\zeta(\lambda)=3 n(\lambda)$ and $I=5$, and the following relations hold.

$$(\upsilon_2(0), \ldots, \upsilon_I(0))=(0_F, \upsilon_3(0), 0_F, \upsilon_5(0))$$

$$\upsilon'=\upsilon_3(0)$$

$$(\upsilon_{n(\lambda)+1}(\lambda), \ldots, \upsilon_{3 \cdot n(\lambda)}(\lambda))=(0_F, \ldots, 0_F)$$

(Enc-2) The following common key is generated.

$$K=g_T^{\upsilon \cdot \upsilon \cdot \upsilon'} \in G_T \quad (85)$$

For example, if $\tau=\tau'=1_F$, the following relation holds.

$$K=g_T^{\upsilon \cdot \upsilon'} \in G_T \quad (86)$$

(Enc-3) The following ciphertext $C(\Psi+1)$ of the plaintext M is generated using the common key K.

$$C(\Psi+1)=Enc_K(M) \quad (87)$$

The common key encryption scheme Enc can be Camellia (registered trademark) capable of encryption using the common key K, AES or exclusive-OR of the common key and the plaintext. As another simple example, $Enc_K(M)$ may be generated as follows. Note that $M \in G_T$ in formula (88).

$$C(\Psi+1)=g_T^{\upsilon \cdot \upsilon'} \cdot M \quad (88)$$

(Enc-4) The following ciphertext is generated.

$$C=(VSET2, C(0), \{C(\lambda)\}_{(\lambda, w(\lambda)^{\rightarrow}) \in VSET2}, C(\Psi+1)) \quad (89)$$

Note that the subscript "$w(\lambda)^{\rightarrow}$" means "$w(\lambda)^{\rightarrow}$."

[Dec(PK, SKS, C): Decryption]
Input: public parameter PK, key information SKS, ciphertext C
Output: plaintext M'

(Dec-1) For $\lambda=1, \ldots, \Psi$, it is determined whether or not the inner product $v(\lambda)^{\rightarrow} \cdot w(\lambda)^{\rightarrow}$ of the $n(\lambda)$-dimensional vectors $v(\lambda)^{\rightarrow}$ and the $n(\lambda)$-dimensional vector $w(\lambda)^{\rightarrow}$ is 0, where the $n(\lambda)$-dimensional vector $v(\lambda)^{\rightarrow}$ is each of the labels $LAB(\lambda)$ of the labeled matrix $LMT(MT, LAB)$ included in the key information SKS and the $n(\lambda)$-dimensional vectors $w(\lambda)^{\rightarrow}$ is included in VSET2 of the ciphertext C, and based on the determination results and the labels $LAB(\lambda)$ of the labeled matrix $LMT(MT, LAB)$, it is determined whether or not $GV^{\rightarrow} \in span<MT_{TFV}>$ (formula (69) to (73)). The ciphertext C is rejected if $GV^{\rightarrow} \in span<MT_{TFV}>$ is not satisfied, and is accepted if $GV^{\rightarrow} \in span<MT_{TFV}>$ is satisfied.

(Dec-2) If the ciphertext C is accepted, $SET \subseteq \{1, \ldots, \lambda | LIT(\lambda)=1\}$ and the coefficients $const(\mu)$ ($\mu \in SET$) are calculated.

(Dec-3) The following common key is generated.

$$K = e_0(C(0), d^*(0)) \cdot \prod_{\mu \in SET \wedge LAB(\mu)=v(\mu)} e_\mu(C(\mu), D^*(\mu))^{const(\mu)} \cdot \prod_{\mu \in SET \wedge LAB(\mu)=\neg v(\mu)^{\rightarrow}} e_\mu(C(\mu), D^*(\mu))^{const(\mu)/(v(\mu)^{\rightarrow} \cdot w(\mu)^{\rightarrow})} \quad (90)$$

From formulas (37), (56) and (83), the following relation holds.

$$e_0(C(0), D^*(0)) = e_0\left(v \cdot b_1(0) + \sum_{i=2}^{I} v_i(0) \cdot b_i(0), -SE \cdot b_1^*(0) + \sum_{i=2}^{I} coef_i(0) \cdot b_i^*(0)\right) \quad (91)$$

$$= e_0(v \cdot b_1(0), -SE \cdot b_1^*(0)) \cdot \prod_{i=2}^{I} e_0(v_i(0)b_i(0), coef_i(0) \cdot b_i^*(0))$$

$$= e_0(b_1(0), b_1^*(0))^{-SE \cdot v} \cdot \prod_{i=2}^{I} e_0(b_i(0), b_i^*(0))^{v_i \cdot coef_i(0)}$$

$$= g_T^{\tau \cdot \tau' \cdot \delta(1,1) \cdot (-SE \cdot \upsilon)} \cdot \prod_{i=2}^{I} g_T^{\tau \cdot \tau' \cdot \delta(i,i) \cdot v_i(0) \cdot coef_i(0)}$$

$$= g_T^{\tau \cdot \tau' \cdot (-SE \cdot \upsilon + \upsilon')}$$

From formulas (37), (56), (69), (76), (82) and (84) and $w_1(\lambda) = 1_F$, the following relation holds.

$$\prod_{\mu \in SET \wedge LAB(\mu) = v(\mu)^{\rightarrow}} e_\mu(C(\mu), D^*(\mu))^{const(\mu)} = \tag{92}$$

$$\prod_{\mu \in SET \wedge LAB(\mu) = v(\mu)^{\rightarrow}} e_\mu \begin{pmatrix} \upsilon \cdot \sum_{i=1}^{n(\mu)} w_i(\mu) \cdot b_i(\mu) + \\ \sum_{i=n(\mu)+1}^{n(\mu)+\zeta(\mu)} v_i(\mu) \cdot b_i(\mu), \, share(\mu) \cdot b_1^*(\mu) + \\ \sum_{i=1}^{n(\mu)} coef(\mu) \cdot v_i(\mu) \cdot b_i^*(\mu) + \\ \sum_{i=n(\mu)+1}^{n(\mu)+\zeta(\mu)} coef_i(\mu) \cdot b_i^*(\mu) \end{pmatrix}^{const(\mu)} =$$

$$\prod_{\mu \in SET \wedge LAB(\mu) = v(\mu)^{\rightarrow}} \left\{ \begin{matrix} e_\mu \begin{pmatrix} \upsilon \cdot \sum_{i=1}^{n(\mu)} w_i(\mu) \cdot b_i(\mu), \\ share(\mu) \cdot b_1^*(\mu) \end{pmatrix} \cdot \\ e_\mu \begin{pmatrix} \upsilon \cdot \sum_{i=1}^{n(\mu)} w_i(\mu) \cdot b_i(\mu), \\ \sum_{i=1}^{n(\mu)} coef(\mu) \cdot v_i(\mu) \cdot b_i^*(\mu) \end{pmatrix} \end{matrix} \right\}^{const(\mu)} =$$

$$\prod_{\mu \in SET \wedge LAB(\mu) = v(\mu)^{\rightarrow}} \left( g_T^{\tau \cdot \tau' \cdot \upsilon \cdot share(\mu)} \cdot \prod_{i=1}^{n(\mu)} g_T^{\tau \cdot \tau' \cdot \upsilon \cdot coef(\mu) w_i(\mu) \cdot v_i(\mu)} \right)^{const(\mu)} =$$

$$\prod_{\mu \in SET \wedge LAB(\mu) = v(\mu)^{\rightarrow}} g_T^{\tau \cdot \tau' \cdot \upsilon \cdot const(\mu) \cdot share(\mu)}$$

From formulas (37), (56), (70), (77), (82) and (84), the following relation holds.

$$\prod_{\mu \in SET \wedge LAB(\mu) = \neg v(\mu)^{\rightarrow}} e_\mu(C(\mu), D^*(\mu))^{const(\mu)/(v(\mu)^{\rightarrow} \cdot w(\mu)^{\rightarrow})} = \tag{93}$$

$$\prod_{\mu \in SET \wedge LAB(\mu) = \neg v(\mu)^{\rightarrow}} e_\mu \begin{pmatrix} \upsilon \cdot \sum_{i=1}^{n(\mu)} w_i(\mu) \cdot b_i(\mu) + \\ \sum_{i=n(\mu)+1}^{n(\mu)+\zeta(\mu)} v_i(\mu) \cdot b_i(\mu), \\ share(\mu) \cdot \\ \sum_{i=1}^{n(\mu)} v_i(\mu) \cdot b_i^*(\mu) + \\ \sum_{i=n(\mu)+1}^{n(\mu)+\zeta(\mu)} coef_i(\mu) \cdot b_i^*(\mu) \end{pmatrix}^{const(\mu)/(v(\mu)^{\rightarrow} \cdot w(\mu)^{\rightarrow})} =$$

$$\prod_{\mu \in SET \wedge LAB(\mu) = \neg v(\mu)^{\rightarrow}} \left\{ \prod_{i=1}^{n(\mu)} e_\mu(b_i(\mu), b_i^*(\mu))^{\upsilon \cdot share(\mu) \cdot w_i(\mu) \cdot v_i(\mu)} \right\}^{const(\mu)/(v(\mu)^{\rightarrow} \cdot w(\mu)^{\rightarrow})} =$$

$$\prod_{\mu \in SET \wedge LAB(\mu) = \neg v(\mu)^{\rightarrow}} \left\{ \prod_{i=1}^{n(\mu)} g_T^{\tau \cdot \tau' \cdot \upsilon \cdot share(\mu) \cdot w_i(\mu) v_i(\mu)} \right\}^{const(\mu)/(v(\mu)^{\rightarrow} \cdot w(\mu)^{\rightarrow})} =$$

$$\prod_{\mu \in SET \wedge LAB(\mu) = \neg v(\mu)^{\rightarrow}} \left\{ g_T^{\tau \cdot \tau' \cdot \upsilon \cdot share(\mu) \cdot v(\mu)^{\rightarrow} \cdot w(\mu)^{\rightarrow}} \right\}^{const(\mu)/(v(\mu)^{\rightarrow} \cdot w(\mu)^{\rightarrow})} =$$

$$\prod_{\mu \in SET \wedge LAB(\mu) = \neg v(\mu)^{\rightarrow}} g_T^{\tau \cdot \tau' \cdot \upsilon \cdot const(\mu) \cdot share(\mu)}$$

From formulas (73) and (91) to (93), the following relation holds.

$$K = g_T^{\tau \cdot \tau' \cdot (-SE \cdot \upsilon + \upsilon')} \cdot \prod_{\mu \in SET \wedge LAB(\mu) = v(\mu)^{\rightarrow}} g_T^{\tau \cdot \tau' \cdot \upsilon \cdot const(\mu) \cdot share(\mu)} \cdot \tag{94}$$

$$\prod_{\mu \in SET \wedge LAB(\mu) = \neg v(\mu)^{\rightarrow}} g_T^{\tau \cdot \tau' \cdot \upsilon \cdot const(\mu) \cdot share(\mu)} =$$

$$g_T^{\tau \cdot \tau' \cdot (-SE \cdot \upsilon + \upsilon')} \cdot g_T^{\tau \cdot \tau' \cdot \upsilon \cdot SE} = g_T^{\tau \cdot \tau' \cdot \upsilon'}$$

For example, if $\tau = \tau' = 1_F$, the following relation holds.

$$K = g_T^{\upsilon'} \in G_T \tag{95}$$

(Dec-4) The plaintext M' is generated as follows using the common key K.

$$M' = Dec_K(C(\Psi+1)) = Dec_K(C(\Psi+1)) \tag{96}$$

For example, if the common key encryption scheme shown by formula (88) is used, the plaintext M' is generated as follows.

$$M' = C(\Psi+1)/K \tag{97}$$

The $g_T^\tau$, $g_T^{\tau'}$ or $g_T^{\tau \tau'}$ may be used, instead of $g_1$, as the generator of $G_T$. A map that determines the correspondence between $\lambda$ for the key information SKS and $\lambda$ for ciphertext may be used to determine the combination of $C(\lambda)$ and $D^*(\lambda)$, thereby performing the processing of [Dec(PK, SKS, C): Decryption]. Not only the first element $w_1(\lambda)$ of the second information VSET2 = $\{\lambda, w(\lambda)^{\rightarrow} | \lambda = 1, \ldots, \Psi\}$ but also the $n(\lambda)$-th element $v_{n(\lambda)}(\lambda)$ of the first information VSET1 = $\{\lambda, v(\lambda)^{\rightarrow} | \lambda = 1, \ldots, \Psi\}$ can be set at $1_F$. If the element $w_1(\lambda)$ is not $1_F$, $w(\lambda)^{\rightarrow}/w_1(\lambda)$ can be used instead of $w(\lambda)^{\rightarrow}$, and if the element $v_{n(\lambda)}(\lambda)$ is not $1_F$, $v(\lambda)^{\rightarrow}/v_{n(\lambda)}(\lambda)$ can be used instead of $v(\lambda)^{\rightarrow}$. The second information VSET2={$\lambda$, $w(\lambda)^{\rightarrow}|\lambda=1, \ldots, \Psi$}can be used instead of the first information VSET1={$\lambda$, $v(\lambda)^{\rightarrow}|\lambda=1, \ldots, \Psi$}, and the first information VSET1={$\lambda$, $v(\lambda)^{\rightarrow}|\lambda=1, \ldots, \Psi$} can be used instead of the second information VSET2={$\lambda$, $w(\lambda)^{\rightarrow}|\lambda=1, \ldots, \Psi$}. In that case, the first element $v_1(\lambda)$ of the first information VSET1={$\lambda$, $v(\lambda)^{\rightarrow}|\lambda=1, \ldots, \Psi$} is set at $1_F$.

<General Configuration>

Figure 17:
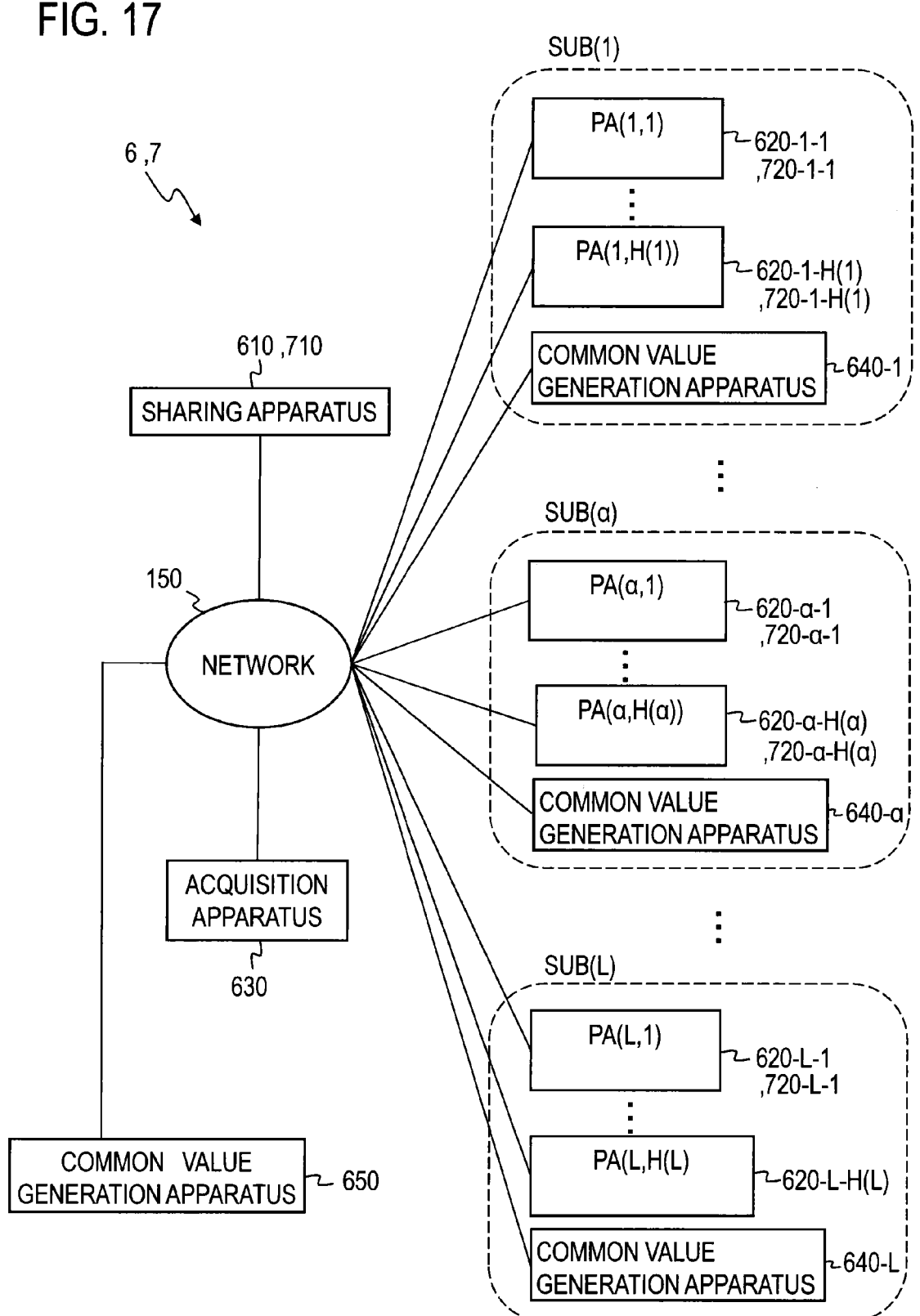
FIG. 17 is a block diagram for illustrating a general configuration of a secret sharing system according to a second embodiment.

FIG. 17 is a block diagram for illustrating a general configuration of a secret sharing system according to the second embodiment.

As illustrated in FIG. 17, a secret sharing system 6 according to this embodiment comprises a sharing apparatus 610, $\Sigma_{\alpha=1}^{L} h(\alpha)$ share management apparatuses [PA($\alpha$, h($\alpha$)) ($\alpha=1, \ldots, L, L\geq 2, h(\alpha)=1, \ldots, H(\alpha), H(\alpha)\geq 2$)] 620-$\alpha$-h($\alpha$), an acquisition apparatus 630 and common value generation apparatuses 640-1 to 640-L and 650, which can communicate with each other via the network 150. For simplicity of explanation, this embodiment will be described with regard to an example where there are only one sharing apparatus 610 and only one acquisition apparatus 630, there can be two or more sharing apparatuses 610 and two or more acquisition apparatuses 630. Similarly, this embodiment will be described with regard to an example where there is only one set of $\Sigma_{\alpha=1}^{L} h(\alpha)$ share management apparatuses [PA($\alpha$, h($\alpha$))] 620-$\alpha$-h($\alpha$), there can be a plurality of such sets.

As illustrated in FIG. 17, the set of $\Sigma_{\alpha=1}^{L} h(\alpha)$ share management apparatuses [PA($\alpha$, h($\alpha$))] 620-$\alpha$-h($\alpha$) is divided into a plurality of subsets SUB($\alpha$) each consisting of H($\alpha$) share management apparatuses PA($\alpha$, 1), ..., PA($\alpha$, H($\alpha$)). Each subset SUB($\alpha$) is associated with a common value generation apparatus 640-$\alpha$.

Figure 18:
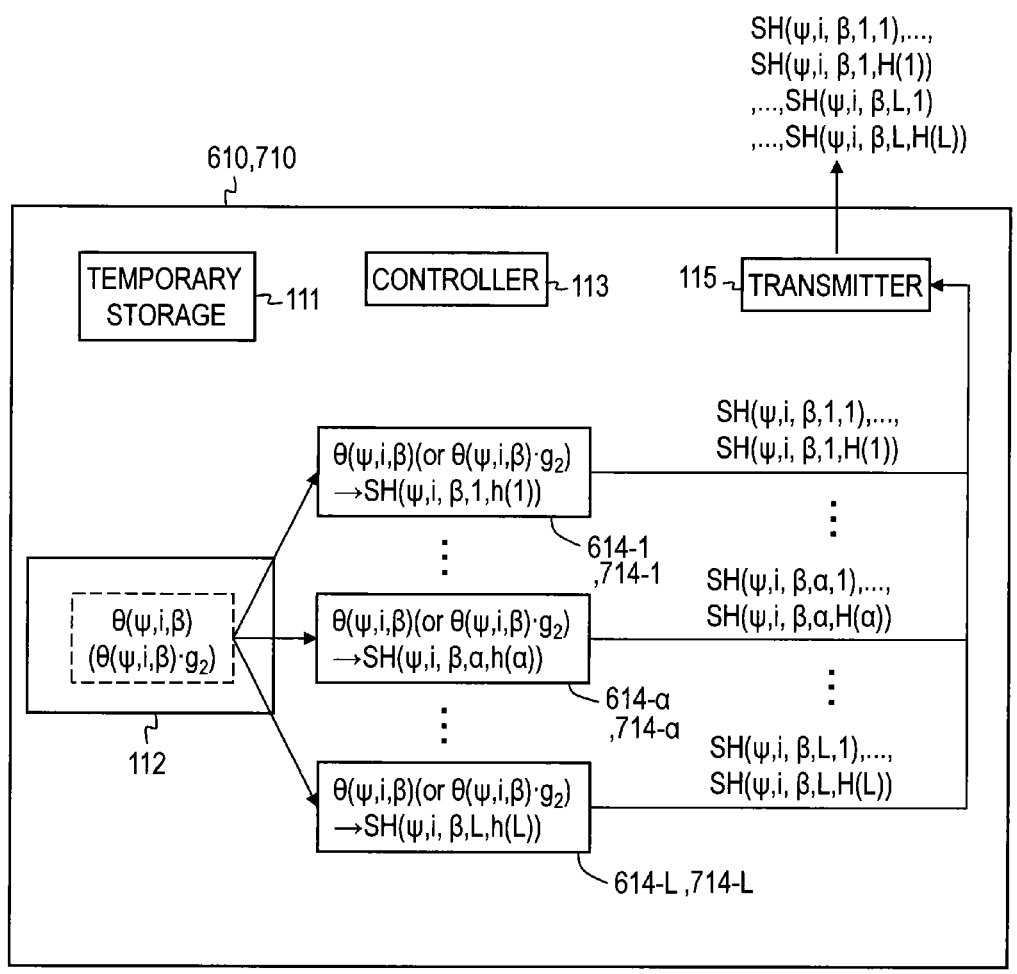
FIG. 18 is a block diagram for illustrating a configuration of a sharing apparatus according to the second embodiment.
Figure 19A:
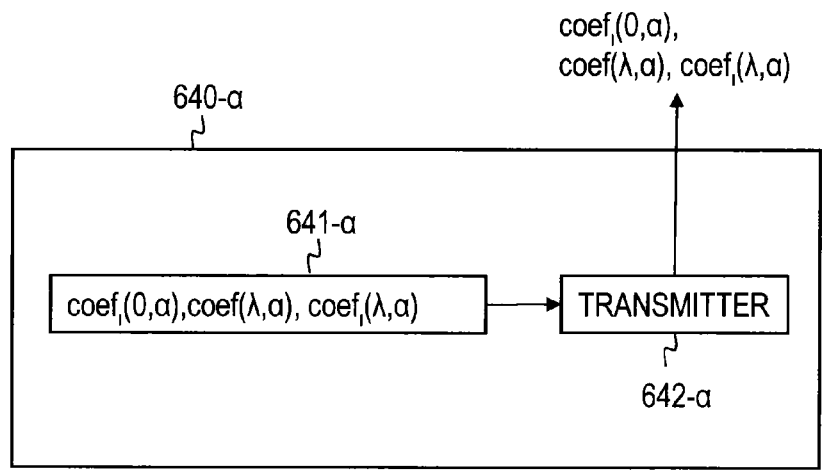
FIG. 19A is a block diagram for illustrating a configuration of a common value generation apparatus according to the second embodiment.
Figure 19B:
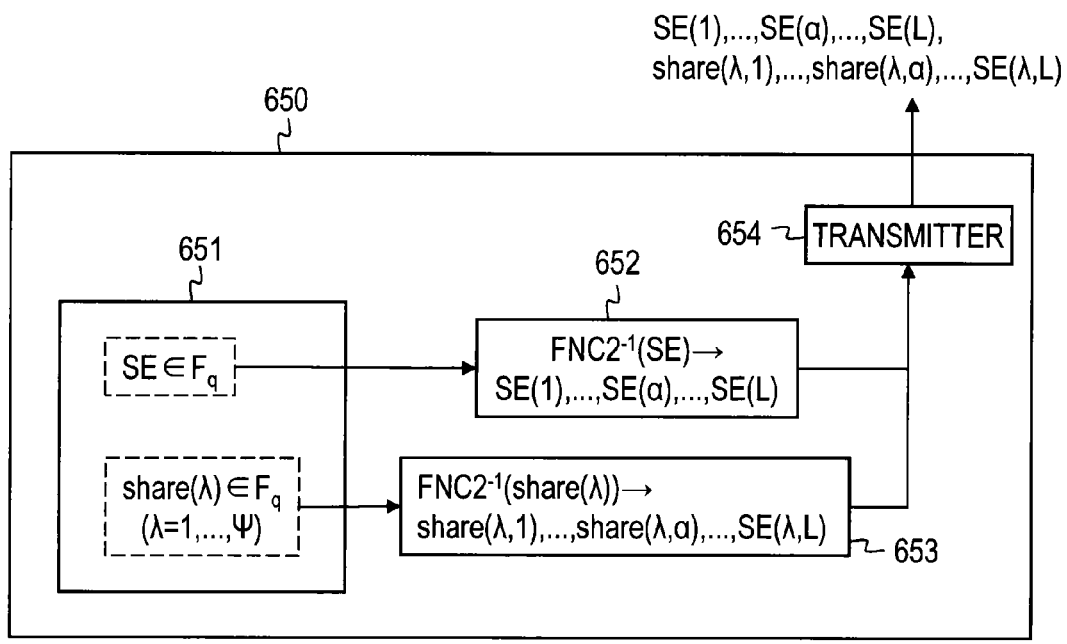
FIG. 19B is a block diagram for illustrating a configuration of a common value generation apparatus according to the second embodiment.
Figure 20:
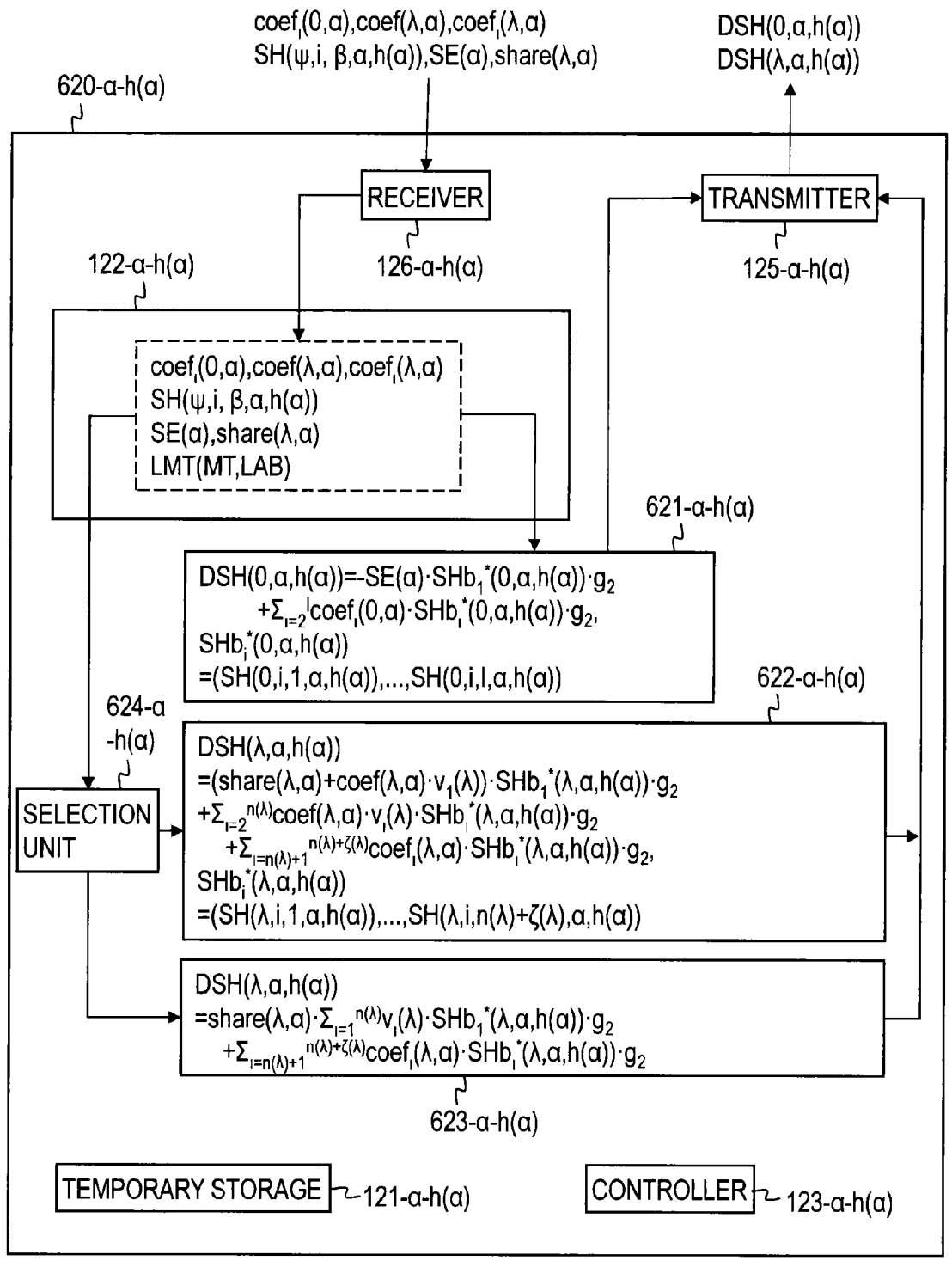
FIG. 20 is a block diagram for illustrating a configuration of a share management apparatus according to the second embodiment.
Figure 21:
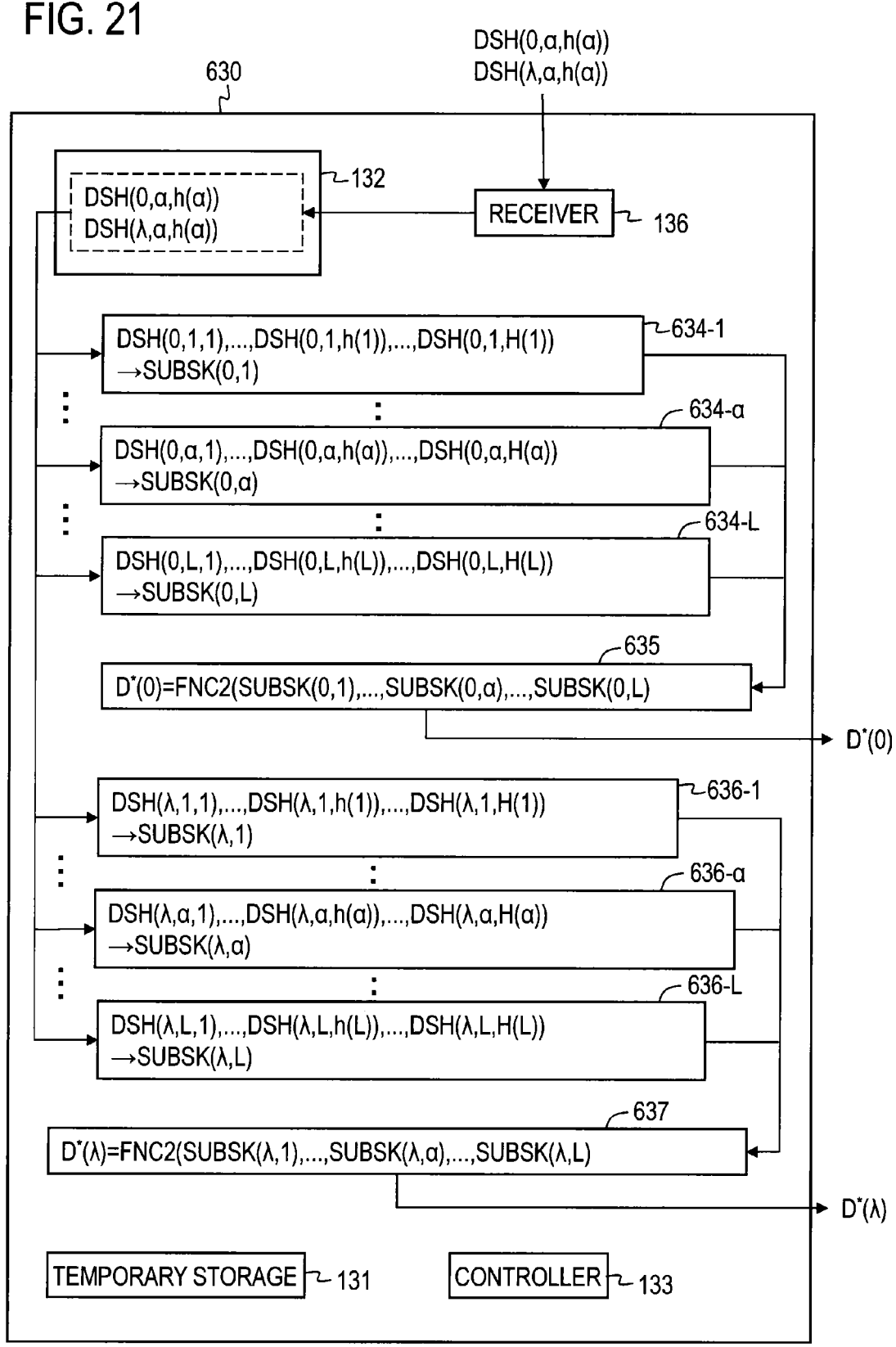
FIG. 21 is a block diagram for illustrating a configuration of an acquisition apparatus according to the second embodiment.

FIG. 18 is a block diagram for illustrating a configuration of the sharing apparatus 610 according to the second embodiment. FIGS. 19A and 19B are block diagrams for illustrating configurations of the common value generation apparatuses 640-1 to 640-L and 650. FIG. 20 is a block diagram for illustrating a configuration of the share management apparatus [PA($\alpha$, h($\alpha$))] 620-$\alpha$-h($\alpha$) according to th second embodiment. FIG. 21 is a block diagram for illustrating a configuration of the acquisition apparatus 630 according to the second embodiment. In these drawings, the same components as those in the first embodiment are denoted by the same reference numerals as those in the first embodiment and will be only simply described below.

<Sharing Apparatus 610>

As illustrated in FIG. 18, the sharing apparatus 610 according to this embodiment comprises the temporary storage 111, the storage 112, the controller 113, secret sharing units 614-$\alpha$ ($\alpha=1, \ldots, L$) and the transmitter 115. The sharing apparatus 610 according to this embodiment is implemented by a predetermined program loaded to and executed by a well-known computer comprising a CPU, a RAM, a ROM and the like, for example.

<Common Value Generation Apparatuses 640-$\alpha$, 650>

As illustrated in FIG. 19A, the common value generation apparatus 640-$\alpha$ according to this embodiment has a coefficient setting unit 641-$\alpha$ and a transmitter 642-$\alpha$. As illustrated in FIG. 19B, the common value generation apparatus 650 according to this embodiment has a storage 651, common information generation units 652 and 653 and a transmitter 654.

<Share Management Apparatus [PA($\alpha$, h($\alpha$))] 620-$\alpha$-h($\alpha$)>

As illustrated in FIG. 20, the share management apparatus [PA($\alpha$, h($\alpha$))] 620-$\alpha$-h($\alpha$) according to this embodiment has the temporary storage 121-$\alpha$-h($\alpha$), the storage 122-$\alpha$-h($\alpha$), the controller 123-$\alpha$-h($\alpha$), share secret value generation units 621-$\alpha$-h($\alpha$), 622-$\alpha$-h($\alpha$) and 623-$\alpha$-h($\alpha$), a selection unit 624-$\alpha$-h($\alpha$), the transmitter 125-$\alpha$-h($\alpha$) and the receiver 126-$\alpha$-h($\alpha$). The share management apparatus [PA($\alpha$, h($\alpha$))] 620-$\alpha$-h($\alpha$) according to this embodiment is implemented by a predetermined program loaded to and executed by a well-known computer comprising a CPU, a RAM, a ROM and the like, for example.

<Acquisition Apparatus 630>

As illustrated in FIG. 21, the acquisition apparatus 630 according to this embodiment has the temporary storage 131, the storage 132, the controller 133, reconstruction units 634-$\alpha$ and 636-$\alpha$ ($\alpha=1, \ldots, L$), synthesis units 635 and 637 and the receiver 136. The acquisition apparatus 630 according to this embodiment is implemented by a predetermined program loaded to and executed by a well-known computer comprising a CPU, a RAM, a ROM and the like, for example.

<Secret Sharing Processing>

Next, a secret sharing processing according to this embodiment will be described.

According to this embodiment, which is an application of the first embodiment, the basis vectors $b_i^*(\psi)$ (formula (55)), which are master key information of the functional encryption scheme using the access structure, are shared, and the key information $D^*(\psi)$ is reconstructed from the calculation results of the share information obtained by the secret sharing. In the following, an example will be described where general key information $D^*(\psi)$ expressed by formula (74), (76) or (77), for example, is reconstructed. Of course, however, the same processing can be applied to specific key information $D^*(\psi)$ expressed by formula (75), (78) or (79), for example.

Each element expressed by formula (98) that forms the basis vectors $b_i^*(\psi)$ expressed by formula (55) is expressed by formula (99).

$$\chi_{i,\beta}^*(\psi)\cdot\kappa_2\cdot g_2\in G_2(i=1,\ldots,n(\psi)+\zeta(\psi),\beta=1,\ldots,n(\psi)+\zeta(\psi)) \tag{98}$$

$$\theta(\psi,i,\beta)\cdot g_2\in G_2 \tag{99}$$

Note that the following relation holds.

$$\theta(\psi,i,\beta)=\chi_{i,\beta}^*(\psi)\cdot\kappa_2\in F_q \tag{100}$$

That is, the basis vectors $b_i^*(\psi)$ expressed by formula (55) are expressed as follows.

$$b_i^*=(\psi,\theta(i,1)\cdot g_2,\ldots,\theta(\psi,i,n(\psi)+\zeta(\psi))\cdot g_2)\in G_2^{n(\psi)+\zeta(\psi)} \tag{101}$$

From this formula, it can be seen that the basis vectors $b_i^*(\psi)$ can be shared by expanding the first embodiment to multidimensional. The secret information is reconstructed by a linear calculation of the share information, so that the reconstruction processing can also be achieved by regarding the result of a linear calculation of share information for each dimension obtained by multidimensional secret sharing as share information. Thus, it can also be seen that the reconstruction of the key information $D^*(\psi)$ can be achieved by expanding the first embodiment to multidimensional.

In the following, differences from the first embodiment will be mainly described, and descriptions of common things will be omitted.

[Preprocessing]

As a preprocessing for the secret sharing processing according to this embodiment, the pieces of information $\theta(\psi, i, \beta)\in F_q$ for identifying the pieces of secret information $\theta(\psi, i, \beta)\cdot g_2\in G_2$ ($i=1, \ldots, n(\psi)+\zeta(\psi), \beta=1, \ldots, n(\psi)+\zeta(\psi)$) which are elements of the basis vectors $b_i^*(\psi)$ are stored in the storage 112 of the sharing apparatus 610. The secret information SE and the share information share(λ) (λ=1, ..., Ψ) that satisfy formulas (63) to (67) are stored in the storage 651 of the common value generation apparatus 650. The labeled matrix LMT(MT, LAB) corresponding to the first information that comprises the set $\{v(\lambda)^{\rightarrow}\}_{\lambda=1,\ldots,\Psi}$ of the n(λ)-dimensional vectors v(λ)$^{\rightarrow}$ expressed by formula (60) is stored in the storage 122-α-h(α) of each share management apparatus 620-α-h(α). Note that the labeled matrix LMT (MT, LAB) is common to all the share management apparatus PA(α, h(α)) 620-a-h(α).

[General Description of Secret Sharing Processing]

Figure 22:
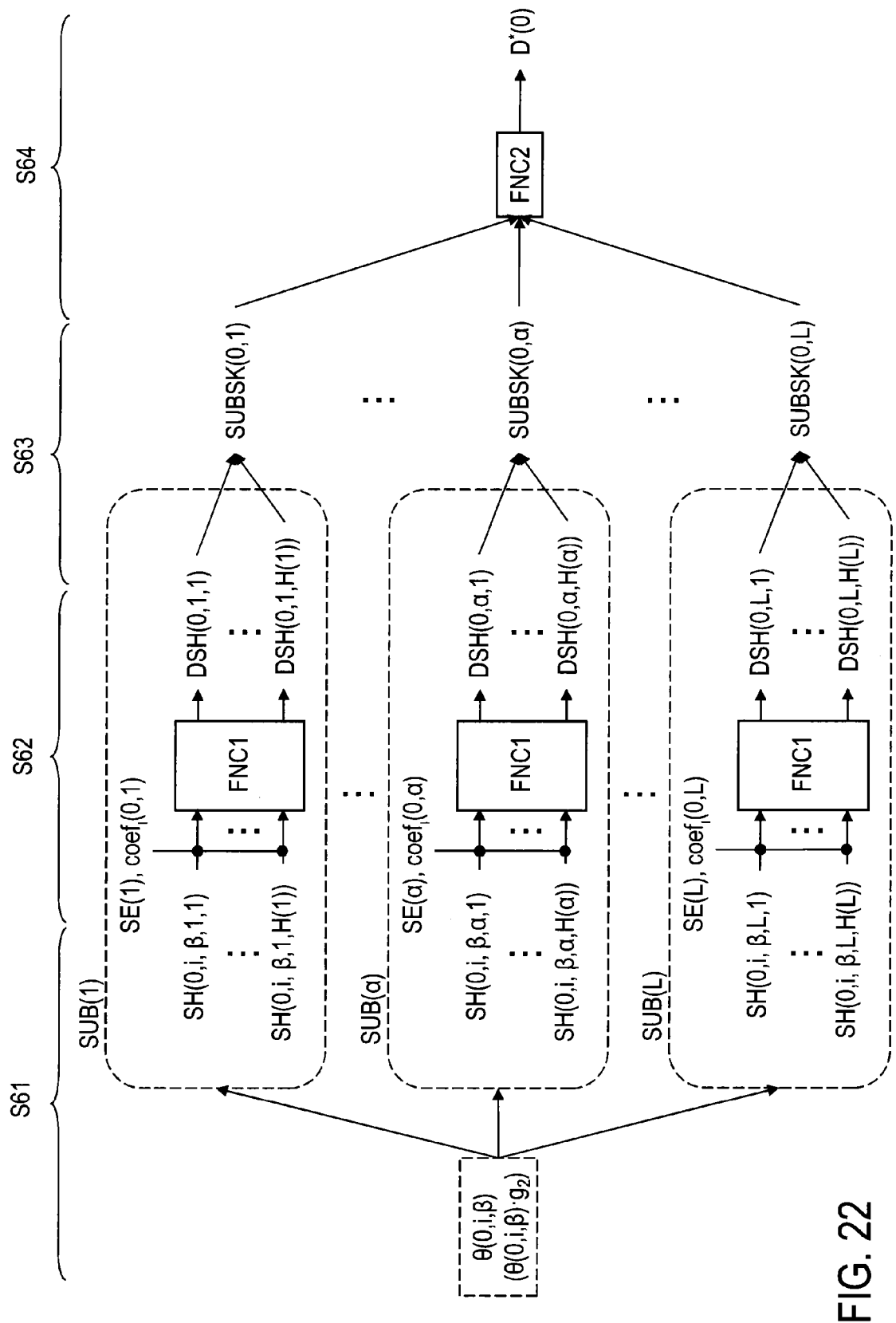
FIG. 22 is a diagram for generally illustrating a secret sharing processing according to the second embodiment.
Figure 23:
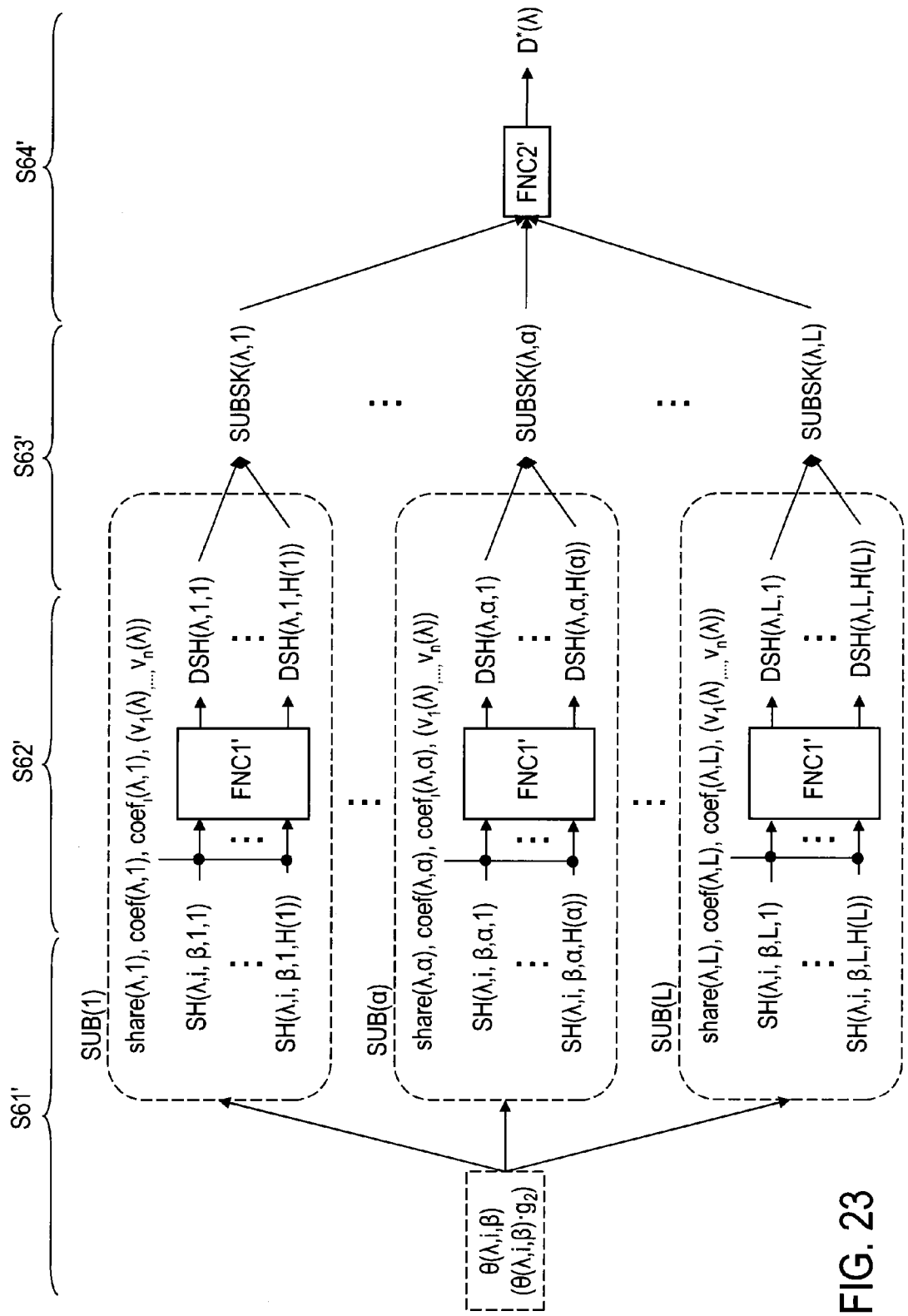
FIG. 23 is a diagram for generally illustrating the secret sharing processing according to the second embodiment.

FIGS. 22 and 23 are diagrams for generally illustrating the secret sharing processing according to the second embodiment. In the following, the secret sharing processing according to this embodiment will be generally described with reference to FIGS. 22 and 23.

According to this embodiment, first, the sharing apparatus 610 (FIG. 17) independently shares, according to a predetermined secret sharing scheme, the value corresponding to each element θ(ψ, i, β)·$g_2$ of the basis vectors $b_i^*(\psi)$ among the subset SUB(α) each consisting of H(α) share management apparatuses PA(α, 1), ..., PA(α, H(α)) to generate pieces of share information SH(ψ, i, β, α, h(α)) (h(α)=1, ..., H(α)). In this embodiment, the values corresponding to the elements θ(ψ, i, β)·$g_2$ of the basis vectors $b_i^*(\psi)$ are θ(ψ, i, β), and the specific secret sharing scheme is the same as that according to any of modifications 1, 2 and 4 of the first embodiment except that there is a plurality of targets of secret sharing. All of θ(ψ, i, β) in this embodiment are shared in the same manner as in any of modifications 1, 2 and 4 of the first embodiment. That is, the secret sharing scheme according to this embodiment is the secret sharing scheme according to any of modifications 1, 2 and 4 of the first embodiment in which 0 is replaced with θ(ψ, i, β). For example, the following share information SH(ψ, i, β, α, h(α)) (h(α)=1, ..., H(α)) is generated.

$$SH(\psi,i,\beta,\alpha,h(\alpha))=(\phi(h(\alpha)),f(\alpha,\phi(h(\alpha))))\epsilon F_q$$

Note that f(α, ω)=θ(ψ, i, β), and ω∈$F_q$ is a predetermined element of the finite field $F_q$.

The pieces of share information SH(ψ, i, β, αh(α)) are transmitted to the respective share management apparatuses [PA(α, h(α))] 620-α-h(α) (α=1, ..., L) via the network 150 and shared among the apparatuses (Steps S61 and S61').

Each share management apparatus [PA(α, h(α))] 620-α-h (α) (α=1, ..., L) having received the corresponding share management information SH(ψ, i, β, α, h(α)) (h(α)=1, ..., H(α)) performs a common calculation, which is common in each subset SUB(α), on the common information common in the subset SUB(α) and the share information SH(ψ, i, β, α, h(α)) (h(α)=1, ..., H(α)) to generate share secret value DSH(ψ, α, h(α)). The common information shared in different subsets SUB(α) are independent of each other. The common calculation is a linear calculation. The common information according to this embodiment includes SE(α) (FNC2$^{-1}$ (SE)→SE(1), ..., SE(α), ..., SE(L)) obtained from the secret information SE, share(λ, α) (FNC2'$^{-1}$ (share(λ))→share(λ, 1), ..., share(λ, α), ..., share(λ, L)) obtained from the share information share(λ) and $coef_t(0, \alpha)$, coef(λ, α), $coef_t(\lambda, \alpha)\in F_q$ that are constants or random numbers, for example. FNC2$^{-1}$ represents an inverse function of a linear calculation function FNC2. FNC2'$^{-1}$ represents an inverse function of a linear calculation function FNC2'. The linear calculation function FNC2 is a function that outputs the result of a linear calculation of L input values, and an example the linear calculation function FNC2 is a function that outputs the value of a linear combination of L values. For which value of $coef_t$ (0, α) and $coef_t$ (λ, α) are adopted as the common information and whether $coef_t(0, \alpha)$, coef(λ, α), $coef_t(\lambda, \alpha)$, SE(α) and share(λ, α) are constants or random numbers depend on the structure of the generated key information D*(ψ). Each share management apparatus [PA(α, h(α))] 620-α-h(α) according to this embodiment generates the share secret value DSH(0, α, h(α)) (α=1, ..., L, L≥2, h(α)= 1, ..., H(α), H(α)>2) for ψ=0 as follows (FNC1), for example.

$$SHb_i^*(0,\alpha,h(\alpha))=(SH(0,i,1,\alpha,h(\alpha)),\ldots,SH(0,i,I,\alpha,h(\alpha))) \quad (102)$$

$$DSH(0,\alpha,h(\alpha))=-SE(\alpha)\cdot SHb_1^*(0,\alpha,h(\alpha))\cdot g_2 + \Sigma_{t=2}^I coef_t(0,\alpha)\cdot SHb_t^*(0,\alpha,h(\alpha))\cdot g_2 \quad (103)$$

Furthermore, each share management apparatus [PA(α, h(α))] 620-α-h(α) according to this embodiment generates the share secret value DSH(λ, α, h(α)) (α=1, ..., L, L≥2, h(α)=1, ..., H(α), H(α)≥2) for each λ (λ=1, ..., Ψ) according to the following formulas (104) to (106) (FNC1'), for example.

$$SHb_i^*(\lambda, \alpha, h(\alpha)) = \\ (SH(\lambda, i, 1, \alpha, h(\alpha)), \ldots, SH(\lambda, i, n(\lambda)+\zeta(\lambda), \alpha, h(\alpha))) \quad (104)$$

$$DSH(\lambda, \alpha, h(\alpha)) = \\ (\text{share}(\lambda, \alpha) + coef(\lambda, \alpha)\cdot v_1(\lambda))\cdot SHb_1^*(\lambda, \alpha, h(\alpha))\cdot g_2 + \\ \sum_{i=2}^{n(\lambda)} coef(\lambda, \alpha)\cdot v_i(\lambda)\cdot SHb_i^*(\lambda, \alpha, h(\alpha))\cdot g_2 + \\ \sum_{i=n(\lambda)+1}^{n(\lambda)+\zeta(\lambda)} coef_i(\lambda, \alpha)\cdot SHb_i^*(\lambda, \alpha, h(\alpha))\cdot g_2 \quad (105)$$

$$DSH(\lambda, \alpha, h(\alpha)) = \text{share}(\lambda, \alpha)\cdot \sum_{i=1}^{n(\lambda)} v_i(\lambda)\cdot SHb_1^*(\lambda, \alpha, h(\alpha))\cdot g_2 + \\ \sum_{i=n(\lambda)+1}^{n(\lambda)+\zeta(\lambda)} coef_i(\lambda, \alpha)\cdot SHb_i^*(\lambda, \alpha, h(\alpha))\cdot g_2 \quad (106)$$

The share secret value DSH(ψ, α, h(α)) output from each share management apparatus [PA(α, h(α))] 620-α-h(α) is transmitted to the acquisition apparatus 630 via the network 150 (Steps S62 and S62').

The acquisition apparatus 630 generates reconstructed secret values SUBSK(ψ, α) (ψ=0, ..., Ψ, α=1, ..., L) for each subset SUB(α) by performing a reconstruction processing for the subset SUB(α) according to the secret sharing scheme in Steps S61 and S61' described above using a plurality of share secret values DSH(ψ, α, h(α)) for the subset SUB(α).

The acquisition apparatus 630 according to this embodiment sets SUB SK(0, α) shown below as the reconstructed secret value for ψ=0.

$$SUBSK(0,\alpha)=-SE(\alpha)\cdot b_1^*(0)+\Sigma_{t=2}^I coef(0,\alpha)\cdot b_t^*(0) \quad (107)$$

The acquisition apparatus 630 according to this embodiment sets the reconstructed secret values SUBSK(λ, α) for each λ=1, ..., according to the following formula (108) or (109).

$$SUBSK(\lambda, \alpha) = (\text{share}(\lambda, \alpha) + coef(\lambda, \alpha) \cdot v_1(\lambda)) \cdot b_1^*(\lambda) + \qquad (108)$$

$$\sum_{i=2}^{n(\lambda)} coef(\lambda, \alpha) \cdot v_i(\lambda) \cdot b_i^*(\lambda) + \sum_{i=n(\lambda)+1}^{n(\lambda)+\zeta(\lambda)} coef_i(\lambda, \alpha) \cdot b_i^*(\lambda)$$

$$SUBSK(\lambda, \alpha) = \qquad (109)$$

$$\text{share}(\lambda, \alpha) \cdot \sum_{i=1}^{n(\lambda)} v_i(\lambda) \cdot b_1^*(\lambda) + \sum_{i=n(\lambda)+1}^{n(\lambda)+\zeta(\lambda)} coef_i(\lambda, \alpha) \cdot b_i^*(\lambda)$$

These processings can be achieved by performing the reconstruction processing shown in the first embodiment for each dimension (order) of the share secret value $DSH(\psi, \alpha, h(\alpha))$. That is, although each share secret value $DSH(\psi, \alpha, h(\alpha))$ is a vector, the reconstruction processing described above can be achieved by performing the reconstruction processing (Step S134) shown in the first embodiment for each dimension (order) of the vector. For example, assume that the t-th elements of the share secret values $DSH(\psi, \alpha, h(\alpha))$ which are the vectors used in this reconstruction processing are expressed as follows.

$$(\phi_1(\alpha), dsh_1(\alpha))$$
$$\ldots$$
$$(\phi_{R(\alpha)}(\alpha), dsh_{R(\alpha)}(\alpha))$$

In this case, each coefficient $\lambda_\rho(x)$ ($\rho=1, \ldots, R(\alpha)$) is obtained by calculation of formula (11), and the t-th reconstructed secret value $SUBSK(\psi, \alpha)$ for $\psi$ is obtained by the following calculation.

$$\lambda_1(\omega) \cdot dsh_1(\alpha) + \ldots + \lambda_{R(\alpha)}(\omega) \cdot dsh_{R(\alpha)}(\alpha)$$

Thus, the reconstructed secret values $SUBSK(\psi, \alpha)$ are obtained by performing the same processing for each $\psi$ and each t (Steps S63 and S63').

The acquisition apparatus 630 generates generation information $D^*(\psi)$ ($\psi=0, \ldots, \Psi$) using the reconstructed secret values $SUBSK(\psi, \alpha)$ ($\psi=0, \ldots, \Psi, \alpha=1, \ldots, L$) generated for each subset $SUB(\alpha)$, and outputs the generation information $D^*(\psi)$ ($D^*(\psi)=FNC2(SUBSK(\psi, 1), \ldots, (SUBSK(\psi, \alpha), SUBSK(\psi, L)))$.

For example, the acquisition apparatus 630 generates the generation information $D^*(\psi)$ by linear combination of the reconstructed secret values $SUBSK(\psi, \alpha)$. For example, if the secret sharing has been performed so as to satisfy the following formulas (110-1) and (110-2), the acquisition apparatus 630 generates $D^*(\psi)$ ($\psi=0, \ldots, \Psi$) according to the following formula (111) (Steps S64 and S64').

$$FNC2(SUBSK(0,1), \ldots, (SUBSK(0,\alpha), \ldots, (SUBSK(0,L))) = SUBSK(0,1) + \ldots + SUBSK(0,\alpha) + \ldots + SUBSK(0,L) \qquad (110\text{-}1)$$

$$FNC2'(SUBSK(\lambda,1), \ldots, (SUBSK(2,\alpha), \ldots, (SUBSK(\lambda,L))) = SUBSK(\lambda,1) + \ldots + SUBSK(\lambda,\alpha) + \ldots + SUBSK(\lambda,L) \qquad (110\text{-}2)$$

$$D^*(\psi) = SUBSK(\psi,1) + \ldots + SUBSK(\psi,\alpha) + \ldots + SUBSK(\psi,L) \qquad (111)$$

[Processing of Sharing Apparatus (Steps S61 and S61')]

Figure 24:
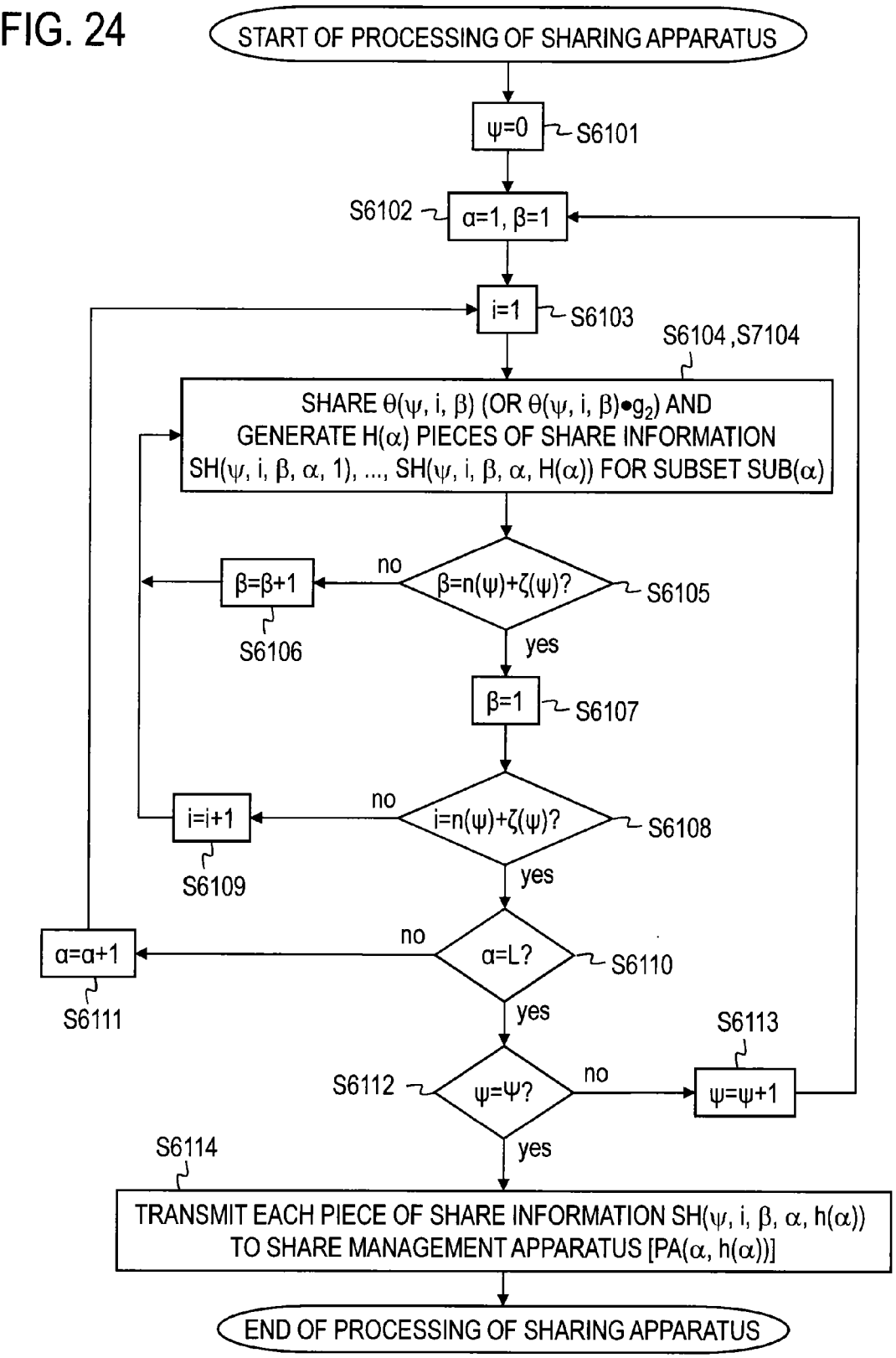
FIG. 24 is a diagram for illustrating a processing of the sharing apparatus according to the second embodiment.

FIG. 24 is a diagram for illustrating a processing of the sharing apparatus according to the second embodiment. In the following, details of the processing of the sharing apparatus 610 will be described with reference to this drawing.

First, the controller 113 of the sharing apparatus 610 (FIG. 18) sets $\psi$ at 0 ($\psi=0$) and stores the setting in the temporary storage 111 (Step S6101). The controller 113 sets $\alpha$ at 1 and $\beta$ at 1 ($\alpha=1, \beta=1$) and stores the settings in the temporary storage 111 (Step S6102). Then, the controller 113 of the sharing apparatus 610 sets i at 1 (i=1) and stores the stting in the temporary storage 111 (Step S6103).

Then, the information $\theta(\psi, i, \beta) \in F_q$ for identifying the secret information $\theta(\psi, i, \beta) \cdot g_2 \in G_2$ (i=1, \ldots, $n(\psi)+\zeta(\psi)$, $\beta=1, \ldots, n(\psi,)+\zeta(\psi,)$) is read from the storage 112 and input to the secret sharing unit 614-$\alpha$ ($\alpha=1, \ldots, L$). The secret sharing unit 614-$\alpha$ performs the secret sharing of each piece of information $\theta(\psi, i, \beta) \in F_q$ to generate the following $H(\alpha)$ pieces of share information for the subset $SUB(\alpha)$ and outputs the share information (Step S6104).

$$SH(\psi,i,\beta,\alpha,1), \ldots, SH(\psi,i,\beta,\alpha,H(\alpha)) \qquad (112)$$

For example, in Step S6104, the processing of Step S112 in the first embodiment is performed for each piece of information $\theta(\psi, i, \beta)$.

Then, the controller 113 determines whether or not $\beta$ stored in the temporary storage 111 is $n(\psi)+\zeta(\psi)$ (Step S6105). If it is not determined that $\beta=n(\psi)+\zeta(\psi)$, the controller 113 sets $\beta+1$ as a new $\beta$ and stores the setting in the temporary storage 111 (Step S6106). After Step S6106, the process returns to Step S6104.

On the other hand, if it is determined in Step S6105 that $\beta=n(\psi)+\zeta(\psi)$, the controller 113 sets $\beta$ at 1 ($\beta=1$) and stores the setting in the temporary storage 111 (Step S6107). Then, the controller 113 determines whether or not the value i stored in the temporary storage 111 is $n(\psi)+\zeta(\psi)$ (Step S6108). If it is not determined that $i=n(\psi)+\zeta(\psi)$, the controller 113 sets $i+1$ as a new i and stores the setting in the temporary storage 111 (Step S6109). After Step S6109, the process returns to Step S6104.

On the other hand, if it is determined in Step S6108 that $i=n(\psi)+\zeta(\psi)$, the controller 113 determined whether or not the value $\alpha$ stored in the temporary storage 111 equals to L (Step S6110). If it is not determined that $\alpha=L$, the controller 113 sets $\alpha+1$ as a new $\alpha$ and stores the setting in the temporary storage 111 (Step S6111). After Step S6111, the process returns to Step S6103.

On the other hand, if it is determined in Step S6110 that $\alpha=L$, the controller 113 determines whether or not the value $\psi$ stored in the temporary storage 111 equals to $\Psi$ (Step S6112). If it is not determined that $\psi=\Psi$, the controller 113 sets $\psi+1$ as a new $\psi$ and stores the setting in the temporary storage 111 (Step S6113). After Step S6113, the process returns to Step S6102.

On the other hand, if it is determined in Step S6112 that $\psi=\Psi$ $SH(\psi, i, \beta, \alpha, 1), \ldots, SH(\psi, i, \beta, \alpha, H(\alpha))$ output from each secret sharing unit 614-$\alpha$ are sent to the transmitter 115. The transmitter 115 transmits the following share information to the corresponding share management apparatus [PA($\alpha$, h($\alpha$))] 620-$\alpha$-h($\alpha$) ($\alpha=1, \ldots, L$) via the network 150 (Step S6114).

$$SH(\psi,i,\beta,\alpha,h(\alpha))(i=1, \ldots, n(\psi)+\zeta(\psi), \beta=1, \ldots, n(\psi)+\zeta(\psi)) \qquad (113)$$

That is, the share information $SH(\psi, i, \beta, 1, h(1))$ is transmitted to the share management apparatus [PA(1, 1)] 620-1-1, the share information $SH(\psi, i, \beta, 2, h(2))$ is transmitted to the share management apparatus [PA(1, 2)] 620-1-2, \ldots, and the share information $SH(\psi, i, \beta, L, H(L))$ is transmitted to the share management apparatus [PA(L, H(L))] 620-L-H(L).

[Processing of Common Value Generation Apparatus]

Each common value generation apparatus 640-$\alpha$ ($\alpha=1, \ldots, L$) (FIG. 19A) generates the common information $coef_f(0, \alpha)$, $coef(\lambda, \alpha)$, $coef_f(\lambda, \alpha)$ shared among the share management apparatuses [PA($\alpha$, h($\alpha$))] 620-$\alpha$-h($\alpha$) (h($\alpha$)= 1, ..., H($\alpha$)) forming the subset SUB($\alpha$) associated with the common value generation apparatus 640-$\alpha$. According to this embodiment, the common information $coef_f(0, \alpha)$, $coef(\lambda, \alpha)$, $coef_1(\lambda, \alpha)$ are random numbers or constants output from the common information generation unit 641-$\alpha$, and the transmitter 642-$\alpha$ transmits the common information $coef_f(0, \alpha)$, $coef(\lambda, \alpha)$, $coef_f(\lambda, \alpha)$ to respective share management apparatuses [PA($\alpha$, h($\alpha$))] 620-$\alpha$-h($\alpha$) (h($\alpha$)=1, ..., H($\alpha$)) forming the subset SUB($\alpha$).

The common value generation apparatus 650 (FIG. 19B) generates SE($\alpha$)'s ($\alpha$=1, ..., L) from the secret information SE and share($\lambda$, $\alpha$)'s ($\alpha$=1, ..., L) from the share information share($\lambda$). According to this embodiment, the common information generation unit 652 generates SE(1), ..., SE($\alpha$), ..., SE(L) that satisfy the following relation from the secret information SE stored in the storage 651.

$$FNC2^{-1}(SE) \rightarrow SE(1), \ldots, SE(\alpha), \ldots, SE(L) \quad (114)$$

For example, the common information generation unit 652 generates SE(1), ..., SE($\alpha$), ..., SE(L) that satisfy the following relation.

$$SE = SE(1) + \ldots + SE(\alpha) + \ldots + SE(L) \quad (115)$$

According to this embodiment, the common information generation unit 653 generates share($\lambda$, 1), ..., share($\lambda$, $\alpha$), ..., share($\lambda$, L) from the share information share($\lambda$) stored in the storage 651 as follows.

$$FNC2'^{-1}(share(\lambda)) \rightarrow share(\lambda,1), \ldots, share(\lambda,\alpha), \ldots, share(\lambda,L) \quad (116)$$

For example, the common information generation unit 653 generates share($\lambda$, 1), ..., share($\lambda$, $\alpha$), ..., share($\lambda$, L) that satisfy the following relation.

$$share(\lambda) = share(\lambda,1) + \ldots + share(\lambda,\alpha) + \ldots + share(\lambda, L) \quad (117)$$

SE($\alpha$) and share($\lambda$, $\alpha$) ($\alpha$=1, ..., L, $\lambda$=1, ..., $\Psi$) are sent to the transmitter 654, and the transmitter 654 transmits SE($\alpha$) and share($\lambda$, $\alpha$) to respective share management apparatuses [PA($\alpha$, h($\alpha$))] 620-$\alpha$-h($\alpha$) forming the subset SUB ($\alpha$).

[Processing of Share Management Apparatus (Step S62)]

Figure 25:
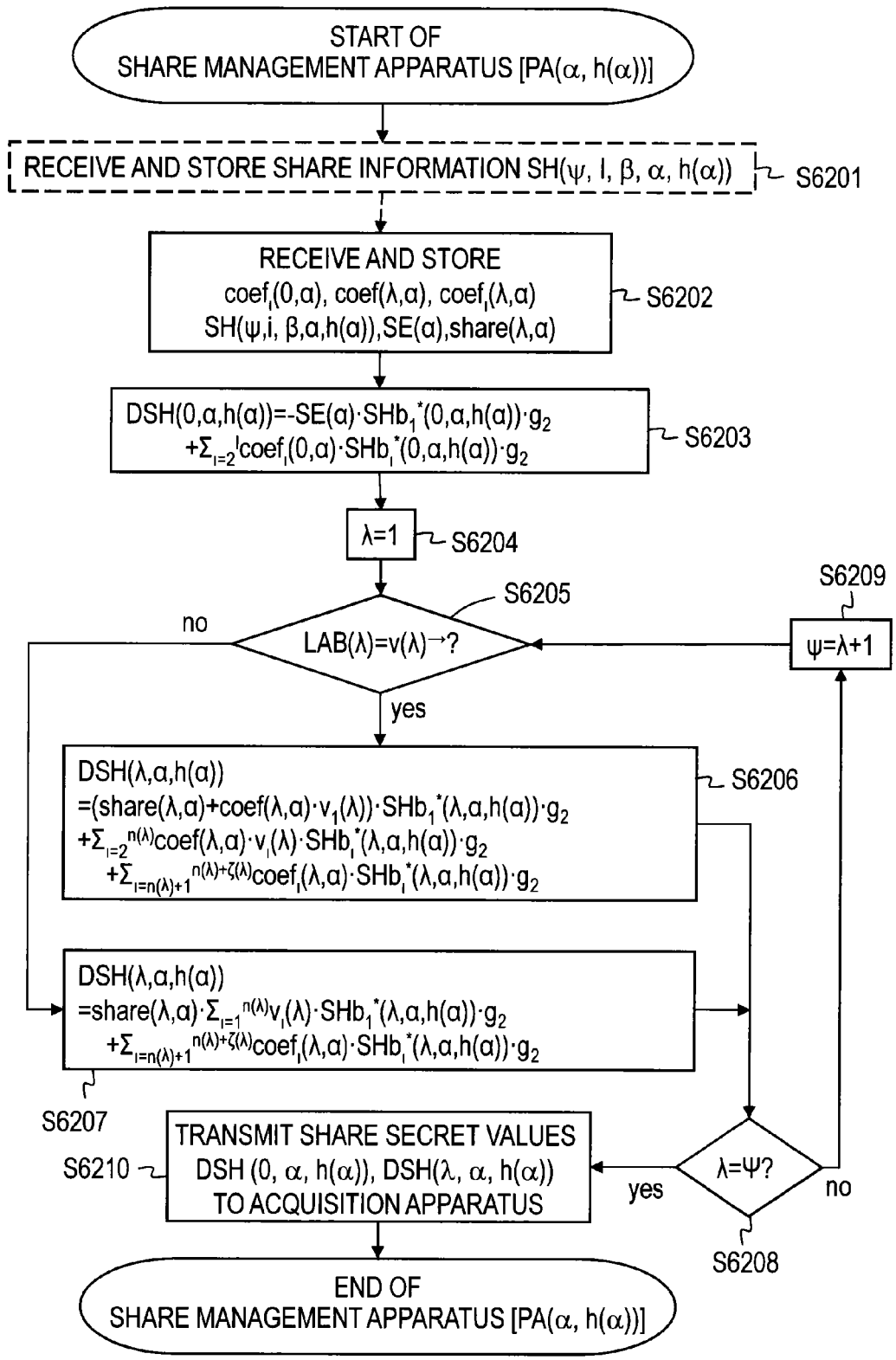
FIG. 25 is a diagram for illustrating a processing of the share management apparatus according to the second embodiment.

FIG. 25 is a diagram for illustrating a processing of the share management apparatus [PA($\alpha$, h($\alpha$))] 620-$\alpha$-h($\alpha$) ($\alpha$=1, ..., L) according to the second embodiment. In the following, the processing of the share management apparatus [PA($\alpha$, h($\alpha$))] 620-$\alpha$-h($\alpha$) according to this embodiment will be described with reference to this drawing.

First, the receiver 126-$\alpha$-h($\alpha$) of the share management apparatus [PA($\alpha$, h($\alpha$))] 620-$\alpha$-h($\alpha$) (FIG. 20) receives the transmitted share information SH($\psi$, i, $\beta$, $\alpha$, h($\alpha$)) and stores the share information in the storage 122-$\alpha$-h($\alpha$) (Step S6201). Note that the processing of Step S6201 can be omitted if the processing of Step S6201 was performed in the past, and the share information SH($\psi$, i, $\beta$, $\alpha$, h($\alpha$)) has already been stored in the storage 122-$\alpha$-h($\alpha$) of the share management apparatus [PA($\alpha$, h($\alpha$))] 620-$\alpha$-h($\alpha$).

The receiver 126-$\alpha$-h($\alpha$) of the share management apparatus [PA($\alpha$, h($\alpha$))] 620-$\alpha$-h($\alpha$) receives the common information $coef_f(0, \alpha)$, $coef(\lambda,\alpha)$, $coef_f(\lambda, \alpha)$, SE($\alpha$) and share($\lambda$, $\alpha$) transmitted from the common value generation apparatuses 640-$\alpha$ and 650 and stores the common information in the storage 122-$\alpha$-h($\alpha$) (Step S6202).

Then, the share secret value generation unit 621-$\alpha$-h($\alpha$) reads pieces of the share information SH(0, i, $\beta$, $\alpha$, h($\alpha$)) and the common information $coef_f(0, \alpha)$ and SE($\alpha$) from the storage 122-$\alpha$-h($\alpha$). The share secret value generation unit 621-$\alpha$-h($\alpha$) generates the share secret value DSH(0, $\alpha$, h($\alpha$)) that satisfies formula (103) from these pieces of information and outputs the share secret value (Step S6203).

Then, the controller 123-$\alpha$-h($\alpha$) sets $\lambda$ at 1 ($\lambda$=1) and stores the setting in the temporary storage 121-$\alpha$-h($\alpha$) (Step S6204). The selection unit 624-$\alpha$-h($\alpha$) refers to the label LAB($\lambda$) of the labeled matrix LMT(MT, LAB) stored in the storage 122-$\alpha$-h($\alpha$) to determine whether or not LAB($\lambda$)=v($\lambda$)$^{\rightarrow}$ (Step S6205).

If LAB($\lambda$)=v($\lambda$)$^{\rightarrow}$, the share secret value generation unit 622-$\alpha$-h($\alpha$) reads pieces of the share information SH($\lambda$, i, $\beta$, $\alpha$, h($\alpha$)), the common information $coef(\lambda, \alpha)$, $coef_f(\lambda, \alpha)$ and share($\alpha$) and the n($\lambda$)-dimensional vector v($\lambda$)$^{\rightarrow}$ identified by the label LAB($\lambda$) from the storage 122-$\alpha$-h($\alpha$). The share secret value generation unit 622-$\alpha$-h($\alpha$) generates the share secret value DSH($\lambda$, $\alpha$, h($\alpha$)) that satisfies formula (105) from these pieces of information and outputs the share secret value (Step S6206). On the other hand, if LAB($\lambda$)=$\neg$ v($\lambda$)$^{\rightarrow}$, the share secret value generation unit 623-$\alpha$-h($\alpha$) reads pieces of the share information SH($\lambda$, i, $\beta$, $\alpha$, h($\alpha$)), the common information $coef_f(\lambda, \alpha)$ and share($\alpha$) and the n($\lambda$)-dimensional vector v($\lambda$)$^{\rightarrow}$ identified by the label LAB($\lambda$) from the storage 122-$\alpha$-h($\alpha$). The share secret value generation unit 623-$\alpha$-h ($\alpha$) generates the share secret value DSH($\lambda$, $\alpha$, h($\alpha$)) that satisfies formula (106) from these pieces of information and outputs the share secret value (Step S6207).

Once the share secret value DSH($\lambda$, $\alpha$, h($\alpha$)) for X is generated, the controller 123-$\alpha$-h($\alpha$) determines whether or not the value $\lambda$ stored in the temporary storage 121-$\alpha$-h($\alpha$) is $\Psi$ (Step S6208), sets $\lambda$+1 as a new $\lambda$ if it is not determined that $\lambda$=$\Psi$ (Step S6209) and proceeds to the processing of Step S6205. On the other hand, if it is determined that $\lambda$=$\Psi$, the generated share secret values DSH(0, $\alpha$, h($\alpha$)) and DSH($\lambda$, $\alpha$, h($\alpha$)) ($\lambda$=1, ..., $\Psi$) are sent to the transmitter 125-$\alpha$-h($\alpha$). The transmitter 125-$\alpha$-h($\alpha$) transmits the share secret values DSH (0, $\alpha$, h($\alpha$)) and DSH($\lambda$, $\alpha$, h($\alpha$)) to the acquisition apparatus 630 via the network 150 (Step S6210).

[Processing of Acquisition Apparatus (Steps S63, S63', S64 and S64')]

Figure 26:
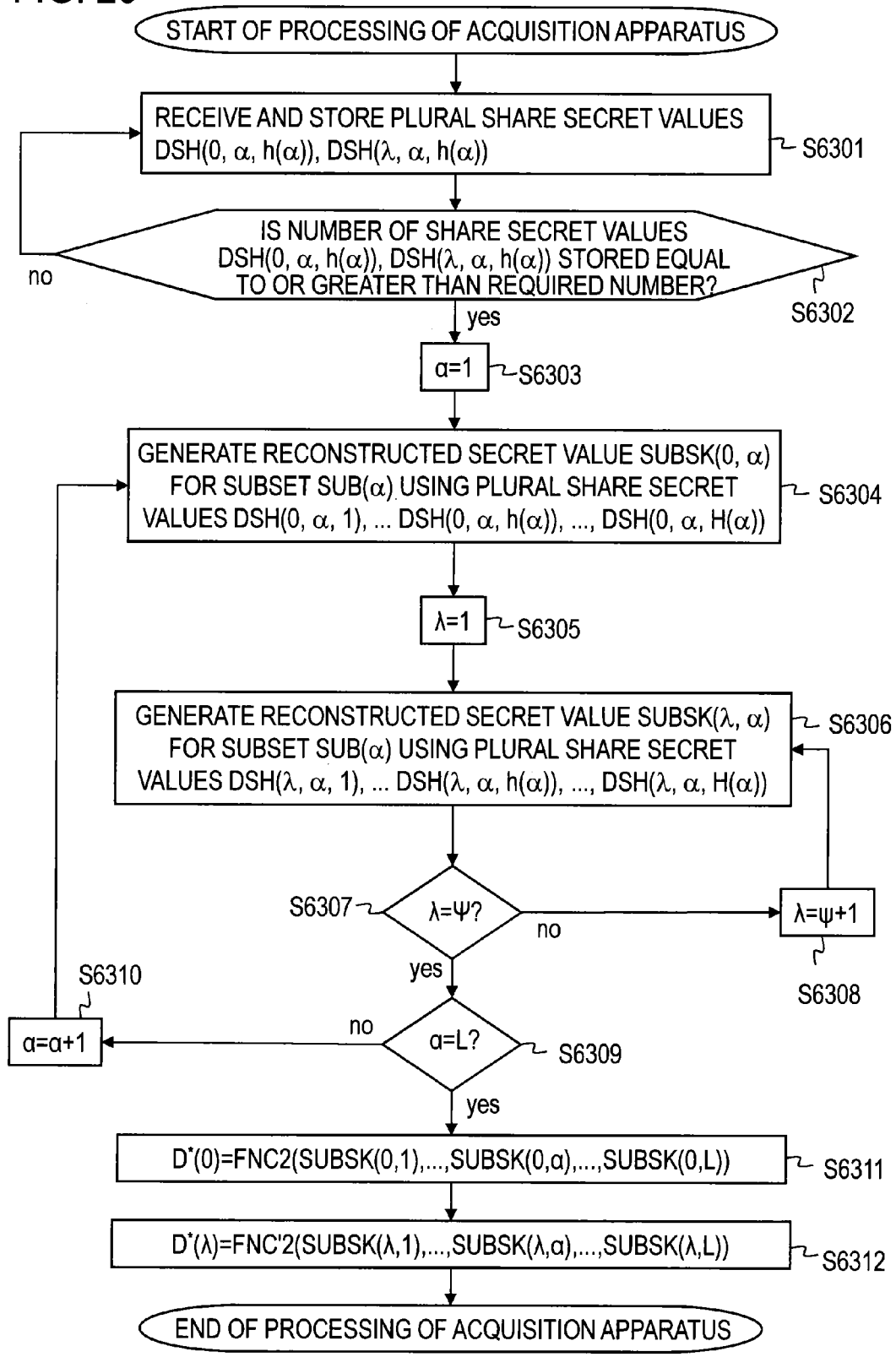
FIG. 26 is a diagram for illustrating a processing of the acquisition apparatus according to the second embodiment.

FIG. 26 is a diagram for illustrating a processing of the acquisition apparatus according to the second embodiment.

The share secret values DSH(0, $\alpha$, h($\alpha$)) and DSH($\lambda$, $\alpha$, h($\alpha$)) ($\lambda$=1, ..., $\Psi$) transmitted from each share management apparatus PA($\alpha$, h($\alpha$)) 620-$\alpha$-h($\alpha$) are received by the receiver 136 of the acquisition apparatus 630 (FIG. 21) and stored in the storage 132 (Step S6301).

Then, the controller 133 determines whether or not the number of share secret values DSH(0, $\alpha$, h($\alpha$)) and DSH($\lambda$, $\alpha$, h($\alpha$)) stored in the storage 132 is equal to or greater than a number required to reconstruct the secret value (referred to as a "required number" hereinafter) (Step S6302). If it is not determined that the number of share secret values DSH(0, $\alpha$, h($\alpha$)) and DSH($\lambda$, $\alpha$, h($\alpha$)) stored in the storage 132 is equal to or greater than the required number, the process returns to step S6301.

On the other hand, if it is determined that the number of share secret values DSH(0, $\alpha$, h($\alpha$)) and DSH($\lambda$, $\alpha$, h($\alpha$)) stored in the storage 132 is equal to or greater than the required number, the controller 133 sets $\alpha$ at 1 ($\alpha$=1) and stores the setting in the temporary storage 131 (Step S6303). Then, the required number of share secret values DSH(0, $\alpha$, h($\alpha$)) (h($\alpha$)=1, ..., H($\alpha$)) corresponding to the subset SUB ($\alpha$) are read from the storage 132 and input to each reconstruction unit 634-$\alpha$ ($\alpha$=1, ..., L). Each reconstruction unit 634-$\alpha$ generates the reconstructed secret value SUB SK(0, $\alpha$) that satisfies formula (107) from the input share secret values DSH(0, α, h(α)) (h(α)=1, ..., H(α)) by performing the reconstruction processing for each subset SUB(α), and outputs the reconstructed secret value SUBSK(0, α) for the subset SUB(α) (α=1, ..., L) (Step S6304).

Then, the controller 133 sets λ at 1 (λ=1) and stores the setting in the temporary storage 131 (Step S6305). Then, the required number of share secret values DSH(λ, α, h(α)) (h(α)=1, ..., H(α)) corresponding to the subset SUB(α) are read from the storage 132 and input to each reconstruction unit 636-α (α=1, ..., L). Each reconstruction unit 636-α generates the reconstructed secret value SUBSK(λ, α) that satisfies formula (108) or (109) from the input share secret values DSH(λ, α, h(α)) (h(α)=1, ..., H(α)) by performing the reconstruction processing for each subset SUB(α), and outputs the reconstructed secret value SUBSK(λ, α) for the subset SUB(α) (Step S6306).

Then, the controller 133 determines whether or not the value X stored in the temporary storage 131 is Ψ (Step S6307). If it is not determined that λ=Ψ, the controller 133 sets λ+1 as a new λ and stores the setting in the temporary storage 131 (Step S6308). After Step S6308, the process returns to Step S6306.

On the other hand, if it is determined that λ=Ψ, the controller 133 determines whether or not the value λ stored in the temporary storage 131 is L (Step S6309). If it is not determined that α=L, the controller 133 sets α+1 as a new α and stores the setting in the temporary storage 131 (Step S6310). After Step S6310, the process returns to Step S6304.

On the other hand, if it is determined in Step S6309 that α=L, the reconstructed secret value SUBSK(0, α) (α=1, ..., L) output from each reconstruction unit 634-α (α=1, ..., L) are transmitted to the synthesis unit 635. The synthesis unit 635 generates the following key information D*(0) from the reconstructed secret values SUBSK(0, α) (α=1, ..., L) and outputs the key information.

$$D^*(0) = FNC2(SUBSK(0,1), \ldots, SUBSK(0,\alpha), \ldots, SUBSK(0,L)) \quad (118)$$

For example, the key information D*(0) is generated according to formula (111) with ψ=0 and output (Step S6311).

Furthermore, the reconstructed secret values SUBSK(λ, α) (α=1, ..., L) output from each reconstruction unit 634-α (α=1, ..., L) is transmitted to the synthesis unit 637. The synthesis unit 637 generates the following key information D*(λ) (λ=1, ..., Ψ) from the reconstructed secret values SUBSK(λ, α) (α=1, ..., L) and outputs the key information.

$$D^*(\lambda) = FNC2(SUBSK(\lambda,1), \ldots, SUBSK(\lambda,\alpha), \ldots, SUBSK(\lambda,L)) \quad (119)$$

For example, the key information D*(λ) (λ=1, ..., Ψ) is generated according to formula (111) with ψ=λ (λ=1, ..., Ψ) and output (Step S6312).

Modification 1 of Second Embodiment

Modification 1 of the second embodiment is an application of, modification 1 of the first embodiment to the second embodiment. That is, according to modification 1 of the second embodiment, the values corresponding to the elements θ(ψ, i, β)·g₂ of the basis vectors $b_i^*(\psi)$ are θ(ψ, i, β)·g₂, and each share management apparatus [PA(α, h(α))] 620-α-h(α) generates the following DSH(0, α, h(α)) as the share secret value for ψ=0 (FNC1)

$$DSH(0,\alpha,h(\alpha)) = -SE(\alpha) \cdot SHb_1^*(0,\alpha,h(\alpha)) \cdot g_2 + \sum_{t=2}^{I} coef_t(0,\alpha) \cdot SHb_t^*(0,\alpha,h(\alpha)) \quad (120)$$

Furthermore, each share management apparatus [PA(α, h(α))] 620-α-h(α) according to this embodiment generates the following DSH(λ, α, h(α)) (λ=1, ..., Ψ) as the share secret value for each X according to the following formula (121) or (122), for example (FNC1').

$$DSH(\lambda, \alpha, h(\alpha)) = \quad (121)$$
$$(\text{share}(\lambda, \alpha) + coef(\lambda, \alpha) \cdot v_1(\lambda)) \cdot SHb_1^*(\lambda, \alpha, h(\alpha)) +$$
$$\sum_{i=2}^{n(\lambda)} coef(\lambda, \alpha) \cdot v_i(\lambda) \cdot SHb_i^*(\lambda, \alpha, h(\alpha)) +$$
$$\sum_{i=n(\lambda)+1}^{n(\lambda)+\zeta(\lambda)} coef_i(\lambda, \alpha) \cdot SHb_i^*(\lambda, \alpha, h(\alpha))$$

$$DSH(\lambda, \alpha, h(\alpha)) = \text{share}(\lambda, \alpha) \cdot \sum_{i=1}^{n(\lambda)} v_i(\lambda) \cdot SHb_1^*(\lambda, \alpha, h(\alpha)) + \quad (122)$$
$$\sum_{i=n(\lambda)+1}^{n(\lambda)+\zeta(\lambda)} coef_i(\lambda, \alpha) \cdot SHb_i^*(\lambda, \alpha, h(\alpha))$$

In the other respects, modification 1 is the same as the second embodiment.

A secret sharing system 7 according to modification 1 of the second embodiment comprises a sharing apparatus 710 that replaces the sharing apparatus 610 and share management apparatuses 720-α-h(α) (α=1, ..., L) that replace the share management apparatuses 620-α-h(α) (α=1, ..., L). The remainder of the configuration is the same as that according to the second embodiment.

Figure 27:
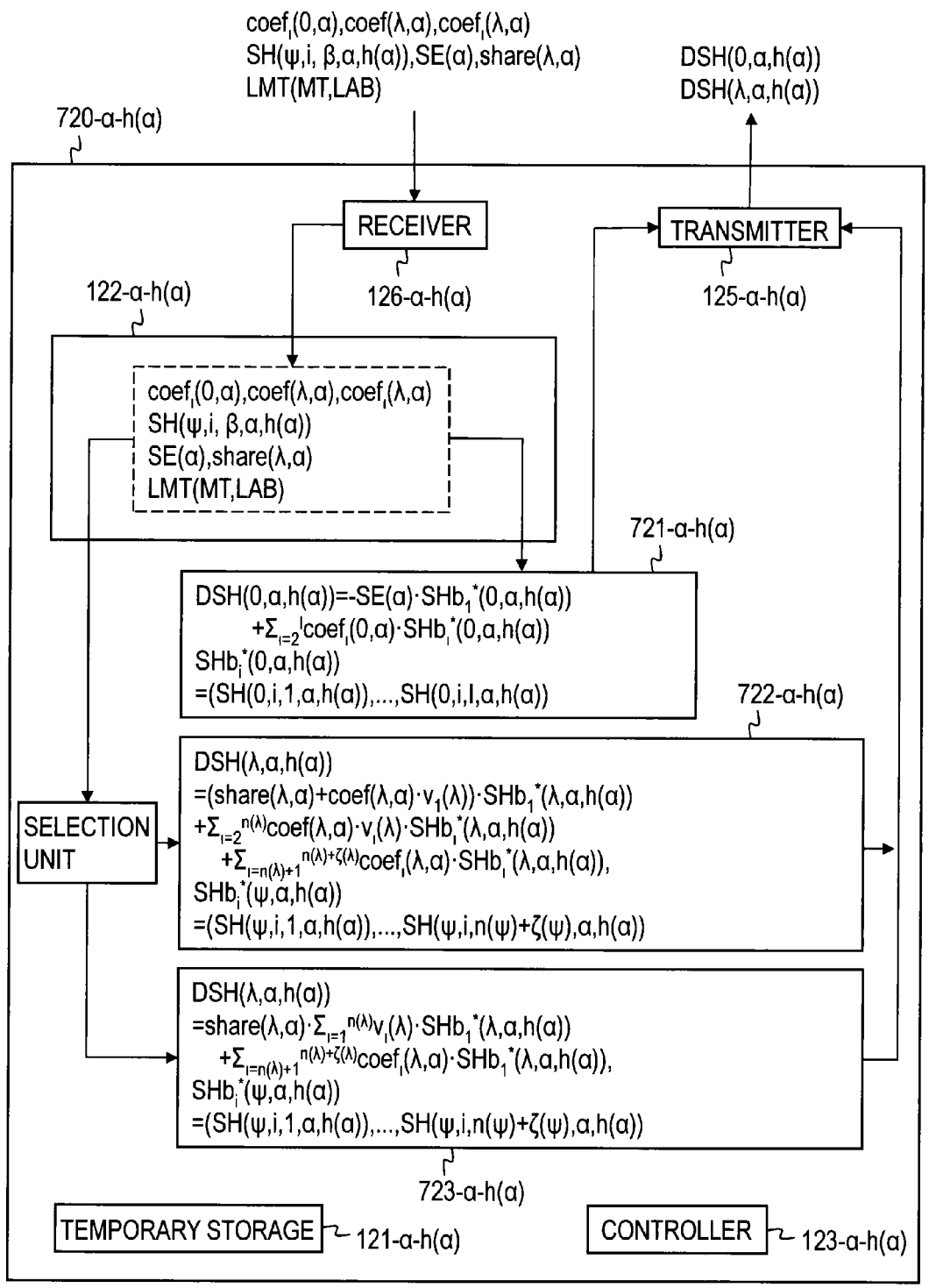
FIG. 27 is a diagram for illustrating a processing of a share management apparatus according to modification 1 of the second embodiment.
Figure 28:
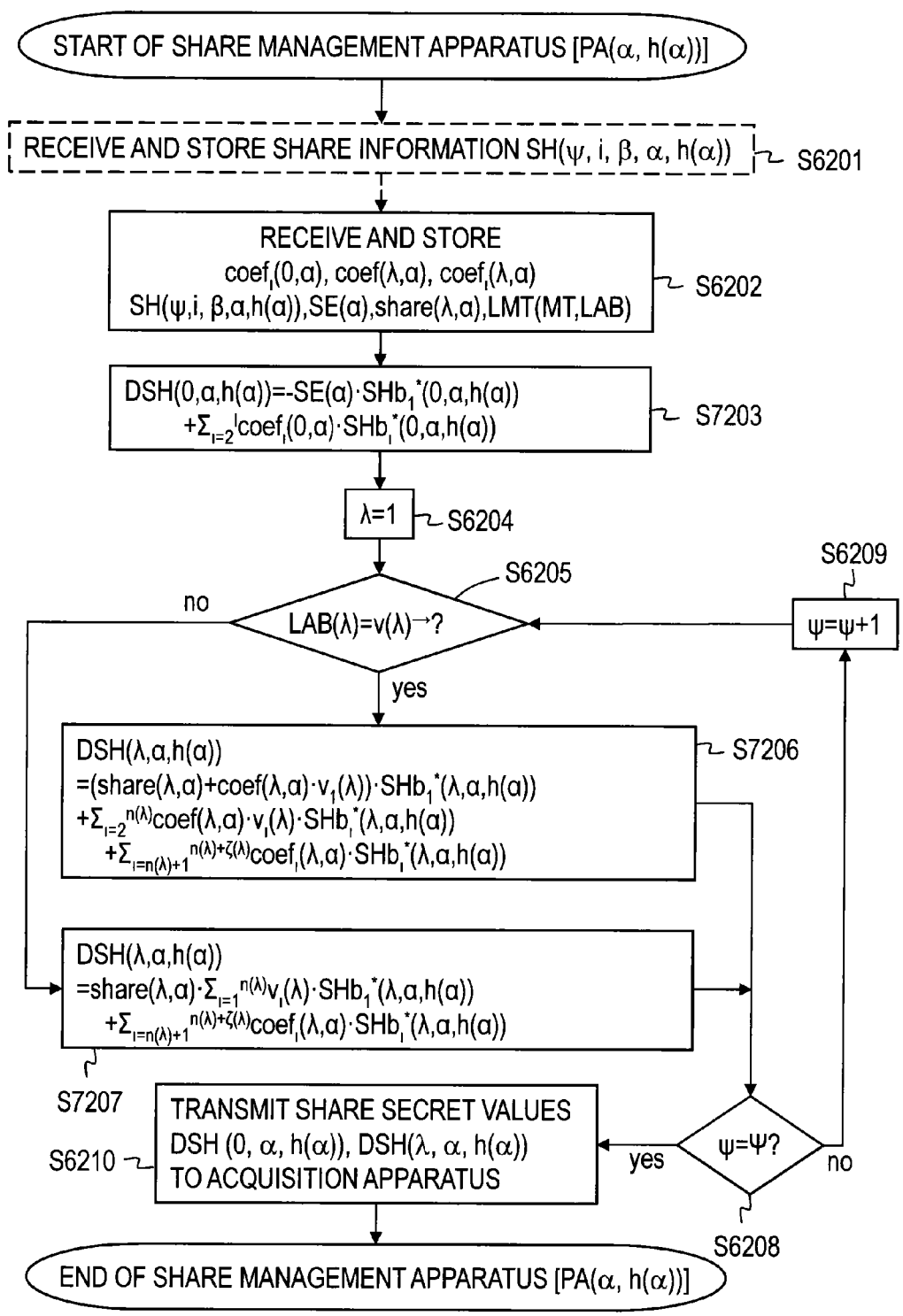
FIG. 28 is a diagram for illustrating the processing of the share management apparatus according to modification 1 of the second embodiment.

According to modification 1 of the second embodiment, instead of Step S6104, the information θ(ψ, i, β)·g₂∈G₂ (i=1, n(ψ)+ζ(ψ), β=1, ..., n(ψ)+ζ(ψ)) is read from the storage 112 and input to a secret sharing unit 714-α (α=1, ..., L) (FIG. 27). The secret sharing unit 714-α shares each piece of information θ(ψ, i, β)·g₂∈G₂ to generate H(α) pieces of share information shown below for the subset SUB(α) and outputs the share information.

$$SH(\psi,i,\beta,\alpha,1), \ldots, SH(\psi,i,\beta,\alpha H(\alpha)) \quad (123)$$

The secret sharing scheme for the information θ(ψ, i, β)·g₂∈G₂ is the same as that according to the first embodiment. That is, according to this embodiment, the secret sharing scheme according to the first embodiment in which θ·g is replaced with θ(ψ, i, β)·g₂ is performed. For example, the following share information SH(ψ, i, β, α, h(α)) (h(α)= 1, ..., H(α)) is generated.

$$SH(\psi,i,\beta,\alpha,h(\alpha)) = (\phi(h(\alpha)), f(\alpha,\phi(h(\alpha)))) \cdot g_2 \in G_2$$

Note that a relation: f(α, ω)=θ(ψ, i, β) holds, and ω ∈F_q is a predetermined element of the finite field F_q (Step S7104).

According to modification 1 of the second embodiment, instead of Step S6203 in the second embodiment, the share secret value generation unit 721-α-h(α) reads pieces of the share information SH(0, i, β, α, h(α)) and the common information $coef_t(0, \alpha)$ and SE(α) from the storage 122-α-h(α). The share secret value generation unit 721-α-h(α) generates the share secret value DSH(0, α, h(α)) that satisfies formula (120) from these pieces of information and outputs the share secret value (Step S7203).

According to modification 1 of the second embodiment, instead of Step S6206 in the second embodiment, the share secret value generation unit 722-α-h(α) reads pieces of the share information SH(λ, i, β, α, h(α)), the common information coef(λ, α), $coef_t(\lambda, \alpha)$ and share(α) and the n(λ)-dimensional vector v(λ)⃗ identified by the label LAB(λ) from the storage 122-α-h(α). The share secret value generation unit 722-α-h(α) generates the share secret value DSH(λ, α, h(α)) that satisfies formula (121) from these pieces of information and outputs the share secret value (Step S7206). Furthermore, instead of Step S6207 in the second embodiment, the share secret value generation unit 723-α-h(α) reads pieces of the share information SH(λ, i, β, α, h(α)), the common information coef$_i$(λ, α) and share(α) and the n(λ)-dimensional vector v(λ)$^\to$ identified by the label LAB(λ) from the storage 122-α-h(α). The share secret value generation unit 723-α-h(α) generates the share secret value DSH(λ, α, h(α)) that satisfies formula (122) from these pieces of information and outputs the share secret value (Step S7207).

Modification 2 of Second Embodiment

The secret sharing scheme or the reconstruction scheme in the second embodiment or modification 1 thereof can be modified as in the first embodiment or modification 3 thereof.

[Other Modifications or the Like]

The present invention is not limited to the embodiments described above. For example, each calculation defined on the finite field $F_q$ described above can be replaced with a calculation defined on a finite ring $Z_q$ having an order q. An example of the method of replacing each calculation defined on the finite field $F_q$ with a calculation defined on the finite ring $Z_q$ is a method that permits q other than a prime number or a power thereof. Furthermore, although a processing of generating key information on a functional encryption as the generation information has been described in the second embodiment, other generation information may be generated.

The various processing described above can be performed not only sequentially in the order described above but also in parallel with each other or individually as required or depending on the processing power of the apparatus that performs the processing. Furthermore, of course, other various modifications can be appropriately made to the processing without departing form the spirit of the present invention.

In the case where the configurations described above are implemented by a computer, the specific processing of the apparatuses are described in a program. The computer executes the program to implement the processing described above.

The program that describes the specific processing can be recorded in a computer-readable recording medium. The computer-readable recording medium may be any type of recording medium, such as a magnetic recording device, an optical disk, a magneto-optical recording medium and a semi-conductor memory.

The program may be distributed by selling, transferring or lending a portable recording medium, such as a DVD and a CD-ROM, in which the program is recorded, for example. Alternatively, the program may be distributed by storing the program in a storage device in a server computer and transferring the program from the server computer to other computers via a network.

The computer that executes the program first temporarily stores, in a storage device thereof, the program recorded in a portable recording medium or transferred from a server computer, for example. Then, when performing the processing, the computer reads the program from the recording medium and performs the processing according to the read program. In an alternative implementation, the computer may read the program directly from the portable recording medium and perform the processing according to the program. As a further alternative, the computer may perform the processing according to the program each time the computer receives the program transferred from the server computer. As a further alternative, the processing described above may be performed on an application service provider (ASP) basis, in which the server computer does not transmit the program to the computer, and the processing are implemented only through execution instruction and result acquisition. The programs according to the embodiments of the present invention include a quasi-program, which is information to be processed by a computer (such as data that is not a direct instruction to a computer but has a property that defines the processing performed by the computer).

Although a predetermined program is executed on a computer to implement the specific processing of each apparatus in the embodiments described above, at least part of the specific processing may be implemented by hardware by itself.

DESCRIPTION OF REFERENCE NUMERALS 1 to 7: secret sharing system
110, 210, 410, 510, 610, 710: sharing apparatus
120 to 720: share management apparatus
130, 330, 430, 530, 630: acquisition apparatus
140, 640, 650: common value generation apparatus

What is claimed is:
1. A secret sharing system, comprising:
a sharing apparatus;
$\Sigma_{\alpha=1}^L h(\alpha)$ share management apparatuses PA(α, h(α)), where α=1, ..., L, L≥2, h(α)=1, ..., H(α), H(α)≥2; and
an acquisition apparatus,
wherein the sharing apparatus includes:
a secret sharing unit that independently shares a value corresponding to each element θ(ψ, i, β)·g$_2$ of basis vectors b$_i$*(ψ) among each subset SUB(α) consisting of H(α) share management apparatuses PA(α, 1), ..., PA(α, H(α)) according to a predetermined secret sharing scheme to generate share information SH(ψ, i, β, α, h(α)) corresponding to each element θ(ψ, i, β)·g$_2$ and the share management apparatuses PA(α, h(α)), where h(α)= 1, ..., H(α), provided that Ψ denotes an integer equal to or greater than 1, ψ denotes an integer equal to or greater than 0 and equal to or smaller than Ψ, ψ=0, ..., Ψ, n(ψ) denotes an integer equal to or greater than 1, ζ(ψ) denotes an integer equal to or greater than 0, a generator of a cyclic group G$_2$ is denoted by g$_2$, and the basis vectors b$_i$*(ψ)=(θ(ψ, i, 1)·g$_2$, ..., θ(ψ, i, n(ψ)+ζ(ψ))·g$_2$)∈G$_2^{n(ψ)+ζ(ψ)}$ are n(ψ)+ζ(ψ)-dimensional basis vectors for θ(ψ, i, β), where i=1, ..., n(ψ)+ζ(ψ), β=1, ..., n(ψ)+(ψ), n(ψ)≥1, ζ(ψ)≥1, elements of the basis vectors b$_i$*(ψ) are n(ψ)+ζ(ψ) elements of the cyclic group G$_2$,
each of the share management apparatuses PA(α, h(α)) includes:
a share secret value generation unit that receives the share information SH(ψ, i, β, α, h(α)) corresponding to the share management apparatuses PA(α, h(α)), and generates share secret values DSH(ψ, α, h(α)) corresponding to the share management apparatuses PA(α, h(α)) by performing a common calculation common in the subset SUB(α) on common information shared in the subset SUB(α) and the share information SH(ψ, i, β, α, h(α)), where h(α)=1, ..., H(α), and
the acquisition apparatus includes:
a reconstruction unit that generates reconstructed secret values SUBSK(ψ, α) for each subset SUB(α) from a plurality of the share secret values DSH(ψ, α, h(α)) for the subset SUB($\alpha$) by performing reconstruction processing for the subset SUB($\alpha$) according to the secret sharing scheme; and a synthesis unit that generates generation information $D^*(\psi)$ from the reconstructed secret values SUBSK($\psi$, $\alpha$).

2. The secret sharing system according to claim 1, wherein pieces of the common information shared in different subsets SUB($\alpha$) are independent from each other.

3. The secret sharing system according to claim 1, wherein the common calculation is a linear calculation.

4. The secret sharing system according to claim 2, wherein the common calculation is a linear calculation.

5. The secret sharing system according to claim 1, wherein the synthesis unit generates the generation information $D^*(\psi)$ by a linear combination of the reconstructed secret values SUBSK($\psi$, $\alpha$).

6. The secret sharing system according to claim 2, wherein the synthesis unit generates the generation information $D^*(\psi)$ by a linear combination of the reconstructed secret values SUBSK($\psi$, $\alpha$).

7. The secret sharing system according to claim 3, wherein the synthesis unit generates the generation information $D^*(\psi)$ by a linear combination of the reconstructed secret values SUBSK($\psi$, $\alpha$).

8. The secret sharing system according to claim 4, wherein the synthesis unit generates the generation information $D^*(\psi)$ by a linear combination of the reconstructed secret values SUBSK($\psi$, $\alpha$).

9. The secret sharing system according to claim 1, 2, 3, 4, 5, 6, 7, or 8, wherein the value corresponding to each element $\theta(\psi, i, \beta) \cdot g_2$ of the basis vectors $b_i^*(\psi)$ are $\theta(\psi, i, \beta)$,
the common information includes $coef_t(0, \alpha)$, $coef(\lambda, \alpha)$, $coef_t(\lambda, \alpha)$, $SE(\alpha)$ and share($\lambda, \alpha$), provided that $\lambda$ denotes an integer equal to or greater than 1 and equal to or smaller than $\Psi$, $\lambda=1, \ldots, \Psi$, and the share secret value generation unit generates:

$$DSH(0,\alpha,h(\alpha)) = -SE(\alpha) \cdot SHb_1^*(0,\alpha,h(\alpha)) \cdot g_2 + \Sigma_{t=2}^{I} coef_t(0,\alpha) \cdot SHb_t^*(0,\alpha,h(\alpha)) \cdot g_2$$

as a share secret value for $\psi=0$, provided that
$SHb_i^*(0, \alpha, h(\alpha)) = (SH(0, i, 1, \alpha, h(\alpha)), \ldots, SH(0, i, I, \alpha, h(\alpha))$ and I is a constant equal to or greater than 2 and equal to or smaller than $n(0)+\zeta(0)$; and $$DSH(\lambda, \alpha, h(\alpha)) = (\text{share}(\lambda, \alpha) + coef(\lambda, \alpha) \cdot v_1(\lambda)) \cdot SHb_1^*(\lambda, \alpha, h(\alpha)) \cdot g_2 +$$
$$\sum_{l=2}^{n(\lambda)} coef(\lambda, \alpha) \cdot v_1(\lambda) \cdot SHb_l^*(\lambda, \alpha, h(\alpha)) \cdot g_2 +$$
$$\sum_{l=n(\lambda)+1}^{n(\lambda)+\zeta(\lambda)} coef_l(\lambda, \alpha) \cdot SHb_l^*(\lambda, \alpha, h(\alpha)) \cdot g_2$$

or $$DSH(\lambda, \alpha, h(\alpha)) = \text{share}(\lambda, \alpha) \cdot \sum_{l=1}^{n(\lambda)} v_i(\lambda) \cdot SHb_1^*(\lambda, \alpha, h(\alpha)) \cdot g_2 +$$
$$\sum_{l=n(\lambda)+1}^{n(\lambda)+\zeta(\lambda)} coef_l(\lambda, \alpha) \cdot SHb_l^*(\lambda, \alpha, h(\alpha)) \cdot g_2$$

as a secret share value for each $\lambda$, provided that
$SHb_i^*(\lambda, \alpha, h(\alpha)) = (SH(\lambda, i, 1, \alpha, h(\alpha)), \ldots, SH(\lambda, i, n(\lambda)+\zeta(\lambda), \alpha, h(\alpha))$ and $\vec{v(\lambda)} = (v_1(\lambda), \ldots, v_{n(\lambda)}(\lambda))$ are $n(\lambda)$-dimensional vectors.

10. The secret sharing system according to claim 1, 2, 3, 4, 5, 6, 7, or 8, wherein the value corresponding to each element $\theta(\psi, i, \beta) \cdot g_2$ of the basis vectors $b_i^*(\psi)$ are $\theta(\psi, i, \beta) \cdot g_2$,
the common information includes $coef_t(0, \alpha)$, $coef(\lambda, \alpha)$, $coef_t(\lambda, \alpha)$, $SE(\alpha)$ and share($\lambda, \alpha$), provided that $\lambda$ denotes an integer equal to or greater than 1 and equal to or smaller than $\Psi$, $\lambda=1, \ldots, \Psi$, and the share secret value generation unit generates:

$$DSH(0,\alpha,h(\alpha)) = -SE(\alpha) \cdot SHb_1^*(0,\alpha,h(\alpha)) + \Sigma_{t=2}^{I} coef_t(0,\alpha) \cdot SHb_t^*(0,\alpha,h(\alpha))$$

as a share secret value for $\psi=0$, provided that
$SHb_i^*(0, \alpha, h(\alpha)) = (SH(0, i, 1, \alpha, h(\alpha)), \ldots, SH(0, i, I, \alpha, h(\alpha))$ and I is a constant equal to or greater than 2 and equal to or smaller than $n(0)+\zeta(0)$; and $$DSH(\lambda, \alpha, h(\alpha)) = (\text{share}(\lambda, \alpha) + coef(\lambda, \alpha) \cdot v_1(\lambda)) \cdot SHb_1^*(\lambda, \alpha, h(\alpha)) +$$
$$\sum_{l=2}^{n(\lambda)} coef(\lambda, \alpha) \cdot v_i(\lambda) \cdot SHb_l^*(\lambda, \alpha, h(\alpha)) +$$
$$\sum_{l=n(\lambda)+1}^{n(\lambda)+\zeta(\lambda)} coef_l(\lambda, \alpha) \cdot SHb_l^*(\lambda, \alpha, h(\alpha))$$

or $$DSH(\lambda, \alpha, h(\alpha)) = \text{share}(\lambda, \alpha) \cdot \sum_{l=1}^{n(\lambda)} v_i(\lambda) \cdot SHb_1^*(\lambda, \alpha, h(\alpha)) +$$
$$\sum_{l=n(\lambda)+1}^{n(\lambda)+\zeta(\lambda)} coef_l(\lambda, \alpha) \cdot SHb_l^*(\lambda, \alpha, h(\alpha))$$

as a secret share value for each $\lambda$, provided that
$SHb_i^*(\lambda, \alpha, h(\alpha)) = (SH(\lambda, i, 1, \alpha, h(\alpha)), \ldots, SH(\lambda, i, n(\lambda)+\zeta(\lambda), \alpha, h(\alpha))$ and $\vec{v(\lambda)} = (v_1(\lambda), \ldots, v_{n(\lambda)}(\lambda))$ are $n(\lambda)$-dimensional vectors.

11. The secret sharing system according to claim 9, wherein the reconstruction unit generates:

$$SUBSK(0,\alpha) = -SE(\alpha) \cdot b_1^*(0) + \Sigma_{t=2}^{I} coef_t(0,\alpha) \cdot b_t^*(0)$$

as a reconstructed secret value for $\psi=0$; and $$SUBSK(\lambda, \alpha) = (\text{share}(\lambda, \alpha) + coef(\lambda, \alpha) \cdot v_1(\lambda)) \cdot b_1^*(\lambda) +$$
$$\sum_{l=2}^{n(\lambda)} coef(\lambda, \alpha) \cdot v_i(\lambda) \cdot b_i^*(\lambda) + \sum_{l=n(\lambda)+1}^{n(\lambda)+\zeta(\lambda)} coef_l(\lambda, \alpha) \cdot b_i^*(\lambda)$$

or $$SUBSK(\lambda, \alpha) = \text{share}(\lambda, \alpha) \cdot \sum_{l=1}^{n(\lambda)} v_1(\lambda) \cdot b_1^*(\lambda) + \sum_{l=n(\lambda)+1}^{n(\lambda)+\zeta(\lambda)} coef_l(\lambda, \alpha) \cdot b_i^*(\lambda)$$

as a reconstructed secret value for each $\lambda$.

12. The secret sharing system according to claim 10, wherein the reconstruction unit generates:

$$SUBSK(0,\alpha) = -SE(\alpha) \cdot b_1^*(0) + \Sigma_{t=2}^{I} coef_t(0,\alpha) \cdot b_t^*(0)$$

as a reconstructed secret value for $\psi=0$; and $$SUBSK(\lambda, \alpha) = (share(\lambda, \alpha) + coef(\lambda, \alpha) \cdot v_1(\lambda)) \cdot b_1^*(\lambda) + \sum_{i=2}^{n(\lambda)} coef(\lambda, \alpha) \cdot v_i(\lambda) \cdot b_i^*(\lambda) + \sum_{t=n(\lambda)+1}^{n(\lambda)+\zeta(\lambda)} coef_t(\lambda, \alpha) \cdot b_t^*(\lambda)$$

or $$SUBSK(\lambda, \alpha) = share(\lambda, \alpha) \cdot \sum_{i=1}^{n(\lambda)} v_i(\lambda) \cdot b_1^*(\lambda) + \sum_{t=n(\lambda)+1}^{n(\lambda)+\zeta(\lambda)} coef_t(\lambda, \alpha) \cdot b_t^*(\lambda)$$

as a reconstructed secret value for each $\lambda$.

13. A share management apparatus $PA(\alpha, h(\alpha))$ that receives share information $SH(\psi, i, \beta, \alpha, h(\alpha))$ corresponding to share management apparatuses $PA(\alpha, h(\alpha))$, and generates share secret values $DSH(\psi, \alpha, h(\alpha))$ corresponding to the share management apparatuses $PA(\alpha, h(\alpha))$ by performing a common calculation common in each subset $SUB(\alpha)$ consisting of $H(\alpha)$ share management apparatuses $PA(\alpha, 1), \ldots, PA(\alpha, H(\alpha))$, where $\alpha=1, \ldots, L$, $L \geq 2$, $h(\alpha)=1, \ldots, H(\alpha)$, $H(\alpha) \geq 2$, on common information shared in the subset $SUB(\alpha)$ and the share information $SH(\psi, i, \beta, \alpha, h(\alpha))$ obtained by independently sharing a value corresponding to each element $\theta(\psi, i, \beta) \cdot g_2$ of a basis vectors $b_i^*(\psi)$ among the subset $SUB(\alpha)$, provided that $h(\alpha)=1, \ldots, H(\alpha)$, $\Psi$ denotes an integer equal to or greater than 1, $\psi$ denotes an integer equal to or greater than 0 and equal to or smaller than $\Psi$, $\psi=0, \ldots, \Psi$, $n(\psi)$ denotes an integer equal to or greater than 1, $\zeta(\psi)$ denotes an integer equal to or greater than 0, a generator of a cyclic group $G_2$ is denoted by $g_2$, and the basis vectors are $n(\psi)+\zeta(\psi)$-dimensional basis vectors $b_i^*(\psi)=(\theta(\psi, i, 1) \cdot g_2, \ldots, \theta(\psi, i, n(\psi)+\zeta(\psi)) \cdot g_2) \in G_2^{n(\psi)+\zeta(\psi)}$ for $\theta(\psi, i, \beta)$, where $i=1, \ldots, n(\psi)+\zeta(\psi)$, $\beta=1, \ldots, n(\psi)+\zeta(\psi)$, $n(\psi) \geq 1$, $\zeta(\psi) \geq 1$, the elements of the basis vectors $b_i^*(\psi)$ are $n(\psi)+\zeta(\psi)$ elements of the cyclic group $G_2$.

14. An acquisition apparatus, comprising:
a reconstruction unit that generates reconstructed secret values $SUBSK(\psi, \alpha)$ for each subset $SUB(\alpha)$ from a plurality of share secret values $DSH(\psi, \alpha, h(\alpha))$ for the subset $SUB(\alpha)$ by performing a reconstruction processing for the subset $SUB(\alpha)$ according to a predetermined secret sharing scheme, provided that $\Psi$ denotes an integer equal to or greater than 1, $\psi$ denotes an integer equal to or greater than 0 and equal to or smaller than $\Psi$, $\psi=0, \ldots, \Psi$, $SUB(\alpha)$ denotes the subset consisting of $H(\alpha)$ share management apparatuses $PA(\alpha, 1), \ldots, PA(\alpha, H(\alpha))$, $\alpha=1, \ldots, L$, $L \geq 2$, $h(\alpha)=1, \ldots, H(\alpha)$, $H(\alpha) \geq 2$; and
a synthesis unit that generates generation information $D^*(\psi)$ from the reconstructed secret values $SUBSK(\psi, \alpha)$, wherein $$SUBSK(0,\alpha) = -SE(\alpha) \cdot b_i^*(0) + \Sigma_{t=2}^{I} coef_t(0,\alpha) \cdot b_t^*(0),$$

and $$SUBSK(\lambda,\alpha) = (share(\lambda,\alpha) + coef(\lambda,\alpha) + v_1(\lambda)) \cdot b_1^*(\lambda) \pm \Sigma_{t=2}^{n(\lambda)} coef(\lambda,\alpha) \cdot v_t(\lambda) \cdot b_t^*(\lambda) \pm \Sigma_{t=n(\lambda)+1}^{n(\lambda)+\zeta(\lambda)} coef_t(\lambda,\alpha) \cdot b_t^*(\lambda),$$

or $$SUBSK(\lambda,\alpha) = share(\lambda,\alpha) \cdot \Sigma_{t=1}^{n(\lambda)} v_1(\lambda) \cdot b_1^*(\lambda) \pm \Sigma_{t=n(\lambda)+1}^{n(\lambda)+\zeta(\lambda)} coef_t(\lambda,\alpha) \cdot b_1^*(\lambda),$$

where
$coef_1(0, \alpha)$, $coef(\lambda, \alpha)$, $coef_t(\lambda, \alpha)$, $SE(\alpha)$ and $share(\lambda, \alpha)$ are common information, $\lambda$ denotes an integer equal to or greater than 1 and equal to or smaller than $\Psi$, $\lambda=1, \ldots, \Psi$, $b_i^*(\psi)$ are basis vectors, $i=1, \ldots, n(\psi)+\zeta(\psi)$, $n(\psi)$ denotes an integer equal to or greater than 1, $\zeta(\psi)$ denotes an integer equal to or greater than 0, $v(\lambda)^{\rightarrow}=(v_1(\lambda), \ldots, v_{n(\lambda)}(\lambda))$ are $n(\lambda)$-dimensional vectors, and I is a constant equal to or greater than 2 and equal to or smaller than $n(0)+\zeta(0)$.

15. A secret sharing method performed by a sharing apparatus, $\Sigma_{\alpha=1}^{L} h(\alpha)$ share management apparatuses $PA(\alpha, h(\alpha))$, where $\alpha=1, \ldots, L$, $L \geq 2$, $h(\alpha)=1, \ldots, H(\alpha)$, $H(\alpha) \geq 2$, and an acquisition apparatus, the method comprising:
(A) a step of independently sharing, at the sharing apparatus, a value corresponding to each element $\theta(\psi, i, \beta) \cdot g_2$ of basis vectors $b_i^*(\psi)$ among each subset $SUB(\alpha)$ consisting of $H(\alpha)$ share management apparatuses $PA(\alpha, 1), \ldots, PA(\alpha, H(\alpha))$ according to a predetermined secret sharing scheme to generate share information $SH(\psi, i, \beta, \alpha, h(\alpha))$ corresponding to each element $\theta(\psi, i, \beta) \cdot g_2$ and the share management apparatuses $PA(\alpha, h(\alpha))$, where $h(\alpha) 1, \ldots, H(\alpha)$, provided that $\Psi$ denotes an integer equal to or greater than 1, $\psi$ denotes an integer equal to or greater than 0 and equal to or smaller than $\Psi$, $\psi=0, \ldots, \Psi$, $n(\psi)$ denotes an integer equal to or greater than 1, $\zeta(\psi)$ denotes an integer equal to or greater than 0, a generator of a cyclic group $G_2$ is denoted by $g_2$, and the basis vectors $b_i^*(\psi)=(\theta(\psi, i, 1) \cdot g_2, \ldots, \theta(\psi, i, n(\psi)+\zeta(\psi)) \cdot g_2) \in G_2^{n(\psi)+\zeta(\psi)}$ are an $n(\psi)+\zeta(\psi)$-dimensional basis vectors for $\theta(\psi, i, \beta)$, where $i=1, \ldots, n(\psi)+\zeta(\psi)$, $\beta=1, \ldots, n(\psi)+\zeta(\psi)$, $n(\psi) \geq 1$, $\zeta(\psi) \geq 1$, the elements of the basis vectors $b_i^*(\psi)$ are $n(\psi)+\zeta(\psi)$ elements of the cyclic group $G_2$;
(B) a step of receiving the share information $SH(\psi, i, \beta, \alpha, h(\alpha))$ corresponding to the share management apparatuses $PA(\alpha, h(\alpha))$, at each of the share management apparatuses $PA(\alpha, h(\alpha))$, and generating, at each of the share management apparatuses $PA(\alpha, h(\alpha))$, share secret values $DSH(\psi, \alpha, h(\alpha))$ corresponding to the share management apparatuses $PA(\alpha, h(\alpha))$ by performing a common calculation common in the subset $SUB(\alpha)$ on common information shared in the subset $SUB(\alpha)$ and the share information $SH(\psi, i, \beta, \alpha, h(\alpha))$, where $h(\alpha)=1, \ldots, H(\alpha)$;
(C) a step of generating, at the acquisition apparatus, reconstructed secret values $SUBSK(\psi, \alpha)$ for each subset $SUB(\alpha)$ from a plurality of share secret values $DSH(\psi, \alpha, h(\alpha))$ for the subset $SUB(\alpha)$ by performing a reconstruction processing for the subset $SUB(\alpha)$ according to the secret sharing scheme; and
(D) a step of generating, the acquisition apparatus, generation information $D^*(\psi)$ from the reconstructed secret values $SUBSK(\psi, \alpha)$.

16. The secret sharing method according to claim 15, wherein pieces of the common information shared in different subsets $SUB(a)$ are independent from each other.

17. The secret sharing method according to claim 15, wherein the common calculation is a linear calculation.

18. The secret sharing method according to claim 16, wherein the common calculation is a linear calculation.

19. The secret sharing method according to claim 15, wherein the step (D) includes a step of generating the generation information $D^*(\psi)$ by a linear combination of the reconstructed secret values $SUBSK(\psi, \alpha)$.

20. The secret sharing method according to claim 16, wherein the step (D) includes a step of generating the generation information $D^*(\psi)$ by a linear combination of the reconstructed secret values $SUBSK(\psi, \alpha)$.

21. The secret sharing method according to claim 17, wherein the step (D) includes a step of generating the generation information $D^*(\psi)$ by a linear combination of the reconstructed secret values $SUBSK(\psi, \alpha)$.

22. The secret sharing method according to claim 18, wherein the step (D) includes a step of generating the generation information $D^*(\psi)$ by a linear combination of the reconstructed secret values $SUBSK(\psi, \alpha)$.

23. The secret sharing method according to claim 15, 16, 17, 18, 19, 20, 21, or 22, wherein the value corresponding to each element $\theta(\psi, i, \beta) \cdot g_2$ of the basis vectors $b_i^*(y)$ are $\theta(\psi, i, \beta)$,
the common information includes $coef_t(0, \alpha)$, $coef(\lambda, \alpha)$, $coef_t(\lambda, \alpha)$, $SE(\alpha)$ and $share(\lambda, \alpha)$, provided that $\lambda$ denotes an integer equal to or greater than 1 and equal to or smaller than $\Psi$, $\lambda=1, \ldots, \Psi$, and
the step (B) includes:
(B-1) a step of generating $$DSH(0,\alpha,h(\alpha))=-SE(\alpha)\cdot SHb_1^*(0,\alpha,h(\alpha))\cdot g_2 + \Sigma_{t=2}^{I} coef_t(0,\alpha)\cdot SHb_t^*(0,\alpha,h(\alpha))\cdot g_2$$

as a share secret value for $\psi=0$, provided that
$SHb_i^*(0, \alpha, h(\alpha))=(SH(0, i, 1, \alpha, h(\alpha)), SH(0,i,I, \alpha, h(\alpha))$ and I is a constant equal to or greater than 2 and equal to or smaller than $n(0)+\zeta(0)$; and (B-2) a step of generating $$DSH(\lambda, \alpha, h(\alpha)) = (share(\lambda, \alpha) + coef(\lambda, \alpha)\cdot v_1(\lambda))\cdot SHb_1^*(\lambda, \alpha, h(\alpha))\cdot g_2 + \sum_{l=2}^{n(\lambda)} coef(\lambda, \alpha)\cdot v_l(\lambda)\cdot SHb_l^*(\lambda, \alpha, h(\alpha))\cdot g_2 + \sum_{l=n(\lambda)+1}^{n(\lambda)+\zeta(\lambda)} coef_l(\lambda, \alpha)\cdot SHb_l^*(\lambda, \alpha, h(\alpha))\cdot g_2$$

or $$DSH(\lambda, \alpha, h(\alpha)) = share(\lambda, \alpha)\cdot \sum_{l=1}^{n(\lambda)} v_l(\lambda)\cdot SHb_1^*(\lambda, \alpha, h(\alpha))\cdot g_2 + \sum_{l=n(\lambda)+1}^{n(\lambda)+\zeta(\lambda)} coef_l(\lambda, \alpha)\cdot SHb_l^*(\lambda, \alpha, h(\alpha))\cdot g_2$$

as a secret share value for each $\lambda$, provided that
$SHb_i^*(\lambda, \alpha, h(\alpha))=(SH(\lambda, i, 1, \alpha, h(\alpha)), \ldots, SH(\lambda, i, n(\lambda)+\zeta(\lambda), \alpha, h(\alpha))$ and $v(\lambda)^{\rightarrow}=(v_1(\lambda), \ldots, v_{n(\lambda)}(\lambda))$ are $n(\lambda)$-dimensional vectors.

24. The secret sharing method according to claim 15, 17, 18, 19, 20, 21, 22, or 23, wherein the value corresponding to each element $\theta(\psi, i, \beta) \cdot g_2$ of the basis vectors $b_i^*(y)$ are $\theta(\psi, i, \beta)\cdot g_2$,
the common information includes $coef_t(0, \alpha)$, $coef(\lambda, \alpha)$, $coef_t(\lambda, \alpha)$, $SE(\alpha)$ and $share(\lambda, \alpha)$, provided that $\lambda$ denotes an integer equal to or greater than 1 and equal to or smaller than $\Psi$, $\lambda=1, \ldots, \Psi$, and the step (B) includes:
(B-1) a step of generating $$DSH(0,\alpha,h(\alpha))=-SE(\alpha)\cdot SHb_1^*(0,\alpha,h(\alpha))+\Sigma_{t=2}^{I} coef_t(0,\alpha)\cdot SHb_t^*(0,\alpha,h(\alpha))$$

as a share secret value for $\psi=0$, provided that
$SHb_i^*(0, \alpha, h(\alpha))=(SH(0, i, 1, \alpha, h(\alpha)), \ldots, SH(0, i, I, \alpha, h(\alpha))$ and I is a constant equal to or greater than 2 and equal to or smaller than $n(0)+\zeta(0)$; and (B-2) a step of generating $$DSH(\lambda, \alpha, h(\alpha)) = (share(\lambda, \alpha) + coef(\lambda, \alpha)\cdot v_1(\lambda))\cdot SHb_1^*(\lambda, \alpha, h(\alpha)) + \sum_{l=2}^{n(\lambda)} coef(\lambda, \alpha)\cdot v_l(\lambda)\cdot SHb_l^*(\lambda, \alpha, h(\alpha)) + \sum_{l=n(\lambda)+1}^{n(\lambda)+\zeta(\lambda)} coef_l(\lambda, \alpha)\cdot SHb_l^*(\lambda, \alpha, h(\alpha))$$

or $$DSH(\lambda, \alpha, h(\alpha)) = share(\lambda, \alpha)\cdot \sum_{l=1}^{n(\lambda)} v_l(\lambda)\cdot SHb_1^*(\lambda, \alpha, h(\alpha)) + \sum_{l=n(\lambda)+1}^{n(\lambda)+\zeta(\lambda)} coef_l(\lambda, \alpha)\cdot SHb_l^*(\lambda, \alpha, h(\alpha))$$

as a secret share value for each $\lambda$, provided that
$SHb_i^*(\lambda, \alpha, h(\alpha))=(SH(\lambda, i, 1, \alpha, h(\alpha)), \ldots, SH(\lambda, i, n(\lambda)+\zeta(\lambda), \alpha, h(\alpha))$ and $v(\lambda)^{\rightarrow}=(v_1(\lambda), \ldots, v_{n(\lambda)}(\lambda))$ are $n(\lambda)$-dimensional vectors.

25. The secret sharing method according to claim 23 wherein the step (C) includes:
(C-1) a step of generating $$SUBSK(0,\alpha)=-SE(\alpha)\cdot b_1^*(0)+\Sigma_{t=2}^{I} coef_t(0,\alpha)\cdot b_t^*(0)$$

as a reconstructed secret value for $\psi=0$; and
(C-2) a step of generating $$SUBSK(\lambda, \alpha) = (share(\lambda, \alpha) + coef(\lambda, \alpha)\cdot v_1(\lambda))\cdot b_1^*(\lambda) + \sum_{l=2}^{n(\lambda)} coef(\lambda, \alpha)\cdot v_l(\lambda)\cdot b_l^*(\lambda) + \sum_{l=n(\lambda)+1}^{n(\lambda)+\zeta(\lambda)} coef_l(\lambda, \alpha)\cdot b_l^*(\lambda)$$

or $$SUBSK(\lambda, \alpha) = share(\lambda, \alpha)\cdot \sum_{l=1}^{n(\lambda)} v_l(\lambda)\cdot b_1^*(\lambda) + \sum_{l=n(\lambda)+1}^{n(\lambda)+\zeta(\lambda)} coef_l(\lambda, \alpha)\cdot b_l^*(\lambda)$$

as a reconstructed secret value for each $\lambda$.

26. The secret sharing method according to claim 24, wherein the step (C) includes:
(C-1) a step of generating $$SUBSK(0,\alpha)=-SE(\alpha)\cdot b_1^*(0)+\Sigma_{t=2}^{I} coef_t(0,\alpha)\cdot b_t^*(0)$$

as a reconstructed secret value for $\psi=0$; and
(C-2) a step of generating $$SUBSK(\lambda, \alpha) = (share(\lambda, \alpha) + coef(\lambda, \alpha)\cdot v_1(\lambda))\cdot b_1^*(\lambda) + \sum_{l=2}^{n(\lambda)} coef(\lambda, \alpha)\cdot v_l(\lambda)\cdot b_l^*(\lambda) + \sum_{l=n(\lambda)+1}^{n(\lambda)+\zeta(\lambda)} coef_l(\lambda, \alpha)\cdot b_l^*(\lambda)$$

or

-continued $$SUBSK(\lambda, \alpha) = \text{share}(\lambda, \alpha) \cdot \sum_{l=1}^{n(\lambda)} v_i(\lambda) \cdot b_1^*(\lambda) + \sum_{l=n(\lambda)+1}^{n(\lambda)+\zeta(\lambda)} coef_l(\lambda, \alpha) \cdot b_l^*(\lambda)$$

as a reconstructed secret value for each $\lambda$.

27. A non-transitory computer-readable recording medium that stores a program that makes a computer function as a share management apparatus according to claim 13.

28. A non-transitory computer-readable recording medium that stores a program that makes a computer function as an acquisition apparatus according to claim 14.

* * * * *

UNITED STATES PATENT AND TRADEMARK OFFICE
CERTIFICATE OF CORRECTION

PATENT NO. : 8,964,988 B2
APPLICATION NO. : 13/810509
DATED : February 24, 2015
INVENTOR(S) : Ryo Nishimaki et al.

It is certified that error appears in the above-identified patent and that said Letters Patent is hereby corrected as shown below:

In The Specification

Column 27, line 65, change "$\vec{v(\lambda)} = (v_1(\lambda),...,v_{n(\lambda)}(\lambda)) \in F_q^{n(\lambda)}$ ... (60)" to --$\vec{v(\lambda)} = (v_1(\lambda),...,v_{n(\lambda)}(\lambda)) \in F_q^{n(\lambda)}$ ... (60)--.

Column 33, line 4, change "$tfv(\lambda) = 1$ (PRO($\lambda$) is true) if $\vec{v(k)} \cdot \vec{w(\lambda)} = 0$ ... (69)" to --$tfv(\lambda) = 1$ (PRO($\lambda$) is true) if $\vec{v(\lambda)} \cdot \vec{w(\lambda)} = 0$ ... (69)--.

Column 36, line 19, change "$C = (VSET2, C(0), \{C(\lambda)\}_{(\lambda,\vec{w(\lambda)})\in VSET^2}, C(\Psi+1))$ ... (89)" to --$C = (VSET2, C(0), \{C(\lambda)\}_{(\lambda,\vec{w(\lambda)})\in VSET2}, C(\Psi+1))$ ... (89)--;

Column 36, line 44, change

"$$K = e_0(C(0), d^*(0)) \cdot \prod_{\mu \in SET \wedge LAB(\mu)=v(\mu)} e_\mu(C(\mu), D^*(\mu))^{const(\mu)}$$
$$\cdot \prod_{\mu \in SET \wedge LAB(\mu)=\neg v(\mu)} e_\mu(C(\mu), D^*(\mu))^{const(\mu)/(\vec{v(\mu)} \cdot \vec{w(\mu)})} \quad \ldots (90)$$"

to $$K = e_0(C(0), D^*(0)) \cdot \prod_{\mu \in SET \wedge LAB(\mu)=\vec{v(\mu)}} e_\mu(C(\mu), D^*(\mu))^{const(\mu)}$$
$$\cdot \prod_{\mu \in SET \wedge LAB(\mu)=\neg \vec{v(\mu)}} e_\mu(C(\mu), D^*(\mu))^{const(\mu)/(\vec{v(\mu)} \cdot \vec{w(\mu)})} \quad \ldots (90)$$
--.

Signed and Sealed this
Twenty-ninth Day of March, 2016

Michelle K. Lee
*Director of the United States Patent and Trademark Office*

CERTIFICATE OF CORRECTION (continued)
U.S. Pat. No. 8,964,988 B2

In The Claims

Column 50, line 29, Claim 1, change "$\Sigma_{\alpha=1}^{L} h(\alpha)$" to -- $\sum_{\alpha=1}^{L} h(\alpha)$ --.

Column 51, line 40, Claim 9, change " $DSH(0, \alpha, h(\alpha)) = -SE(\alpha) \cdot SHb_1^*(0, \alpha, h(\alpha)) \cdot g_2 + \Sigma_{i=2}^{I} coef_i(0, \alpha) \cdot SHb_i^*(0, \alpha, h(\alpha)) \cdot g_2$ " to -- $DSH(0, \alpha, h(\alpha)) = -SE(\alpha) \cdot SHb_1^*(0, \alpha, h(\alpha)) \cdot g_2 + \sum_{i=2}^{I} coef_i(0, \alpha) \cdot SHb_i^*(0, \alpha, h(\alpha)) \cdot g_2$ --;

Column 51, line 47, Claim 9, change " $DSH(\lambda, \alpha, h(\alpha)) = (share(\lambda, \alpha) + coef(\lambda, \alpha) \cdot v_1(\lambda)) \cdot SHb_1^*(\lambda, \alpha, h(\alpha)) \cdot g_2 + \sum_{i=2}^{n(\lambda)} coef(\lambda, \alpha) \cdot v_i(\lambda) \cdot SHb_i^*(\lambda, \alpha, h(\alpha)) \cdot g_2 + \sum_{i=n(\lambda)+1}^{n(\lambda)+\zeta(\lambda)} coef_i(\lambda, \alpha) \cdot SHb_i^*(\lambda, \alpha, h(\alpha)) \cdot g_2$ " to -- $DSH(\lambda, \alpha, h(\alpha)) = (share(\lambda, \alpha) + coef(\lambda, \alpha) \cdot v_1(\lambda)) \cdot SHb_1^*(\lambda, \alpha, h(\alpha)) \cdot g_2 + \sum_{i=2}^{n(\lambda)} coef(\lambda, \alpha) \cdot v_i(\lambda) \cdot SHb_i^*(\lambda, \alpha, h(\alpha)) \cdot g_2 + \sum_{i=n(\lambda)+1}^{n(\lambda)+\zeta(\lambda)} coef_i(\lambda, \alpha) \cdot SHb_i^*(\lambda, \alpha, h(\alpha)) \cdot g_2$ --;

Column 51, line 57, Claim 9, change " $DSH(\lambda, \alpha, h(\alpha)) = share(\lambda, \alpha) \cdot \sum_{i=1}^{n(\lambda)} v_i(\lambda) \cdot SHb_1^*(\lambda, \alpha, h(\alpha)) \cdot g_2 + \sum_{i=n(\lambda)+1}^{n(\lambda)+\zeta(\lambda)} coef_i(\lambda, \alpha) \cdot SHb_i^*(\lambda, \alpha, h(\alpha)) \cdot g_2$ " to -- $DSH(\lambda, \alpha, h(\alpha)) = share(\lambda, \alpha) \cdot \sum_{i=1}^{n(\lambda)} v_i(\lambda) \cdot SHb_1^*(\lambda, \alpha, h(\alpha)) \cdot g_2 + \sum_{i=n(\lambda)+1}^{n(\lambda)+\zeta(\lambda)} coef_i(\lambda, \alpha) \cdot SHb_i^*(\lambda, \alpha, h(\alpha)) \cdot g_2$ --.

Column 52, line 11, Claim 10, change " $DSH(0, \alpha, h(\alpha)) = -SE(\alpha) \cdot SHb_1^*(0, \alpha, h(\alpha)) + \Sigma_{i=2}^{I} coef_i(0, \alpha) \cdot SHb_i^*(0, \alpha, h(\alpha))$ " to -- $DSH(0, \alpha, h(\alpha)) = -SE(\alpha) \cdot SHb_1^*(0, \alpha, h(\alpha)) + \sum_{i=2}^{I} coef_i(0, \alpha) \cdot SHb_i^*(0, \alpha, h(\alpha))$ --;

Column 52, line 20, Claim 10, change "$DSH(\lambda, \alpha, h(\alpha)) = (share(\lambda, \alpha) + coef(\lambda, \alpha) \cdot v_1(\lambda)) \cdot SHb_1^*(\lambda, \alpha, h(\alpha)) + \sum_{\iota=2}^{n(\lambda)} coef(\lambda, \alpha) \cdot v_\iota(\lambda) \cdot SHb_\iota^*(\lambda, \alpha, h(\alpha)) + \sum_{\iota=n(\lambda)+1}^{n(\lambda)+\zeta(\lambda)} coef_\iota(\lambda, \alpha) \cdot SHb_\iota^*(\lambda, \alpha, h(\alpha))$" to -- $DSH(\lambda, \alpha, h(\alpha)) = (share(\lambda, \alpha) + coef(\lambda, \alpha) \cdot v_1(\lambda)) \cdot SHb_1^*(\lambda, \alpha, h(\alpha)) + \sum_{\iota=2}^{n(\lambda)} coef(\lambda, \alpha) \cdot v_\iota(\lambda) \cdot SHb_\iota^*(\lambda, \alpha, h(\alpha)) + \sum_{\iota=n(\lambda)+1}^{n(\lambda)+\zeta(\lambda)} coef_\iota(\lambda, \alpha) \cdot SHb_\iota^*(\lambda, \alpha, h(\alpha))$ --;

Column 52, line 35, Claim 10, change "$DSH(\lambda, \alpha, h(\alpha)) = share(\lambda, \alpha) \cdot \sum_{\iota=1}^{n(\lambda)} v_\iota(\lambda) \cdot SHb_1^*(\lambda, \alpha, h(\alpha)) + \sum_{\iota=n(\lambda)+1}^{n(\lambda)+\zeta(\lambda)} coef_\iota(\lambda, \alpha) \cdot SHb_\iota^*(\lambda, \alpha, h(\alpha))$" to -- $DSH(\lambda, \alpha, h(\alpha)) = share(\lambda, \alpha) \cdot \sum_{\iota=1}^{n(\lambda)} v_\iota(\lambda) \cdot SHb_1^*(\lambda, \alpha, h(\alpha)) + \sum_{\iota=n(\lambda)+1}^{n(\lambda)+\zeta(\lambda)} coef_\iota(\lambda, \alpha) \cdot SHb_\iota^*(\lambda, \alpha, h(\alpha))$ --.

Column 52, line 50, Claim 11, change "$SUBSK(0, \alpha) = -SE(\alpha) \cdot b_1^*(0) + \Sigma_{\iota=2}^I coef_\iota(0, \alpha) \cdot b_\iota^*(0)$" to -- $SUBSK(0, \alpha) = -SE(\alpha) \cdot b_1^*(0) + \sum_{\iota=2}^I coef_\iota(0, \alpha) \cdot b_\iota^*(0)$ --;

Column 52, line 55, Claim 11, change "$SUBSK(\lambda, \alpha) = (share(\lambda, \alpha) + coef(\lambda, \alpha) \cdot v_1(\lambda)) \cdot b_1^*(\lambda) + \sum_{\iota=2}^{n(\lambda)} coef(\lambda, \alpha) \cdot v_\iota(\lambda) \cdot b_\iota^*(\lambda) + \sum_{\iota=n(\lambda)+1}^{n(\lambda)+\zeta(\lambda)} coef_\iota(\lambda, \alpha) \cdot b_\iota^*(\lambda)$" to -- $SUBSK(\lambda, \alpha) = (share(\lambda, \alpha) + coef(\lambda, \alpha) \cdot v_1(\lambda)) \cdot b_1^*(\lambda) + \sum_{\iota=2}^{n(\lambda)} coef(\lambda, \alpha) \cdot v_\iota(\lambda) \cdot b_\iota^*(\lambda) + \sum_{\iota=n(\lambda)+1}^{n(\lambda)+\zeta(\lambda)} coef_\iota(\lambda, \alpha) \cdot b_\iota^*(\lambda)$ --;

Column 52, line 63, Claim 11, change "$SUBSK(\lambda, \alpha) = share(\lambda, \alpha) \cdot \sum_{\iota=1}^{n(\lambda)} v_1(\lambda) \cdot b_1^*(\lambda) + \sum_{\iota=n(\lambda)+1}^{n(\lambda)+\zeta(\lambda)} coef_\iota(\lambda, \alpha) \cdot b_\iota^*(\lambda)$" to -- $SUBSK(\lambda, \alpha) = share(\lambda, \alpha) \cdot \sum_{\iota=1}^{n(\lambda)} v_\iota(\lambda) \cdot b_1^*(\lambda) + \sum_{\iota=n(\lambda)+1}^{n(\lambda)+\zeta(\lambda)} coef_\iota(\lambda, \alpha) \cdot b_\iota^*(\lambda)$ --.

Column 53, line 4, Claim 12, change "$SUBSK(0, \alpha) = -SE(\alpha) \cdot b_1^*(0) - \Sigma_{\iota=2}^I coef_\iota(0, \alpha) \cdot b_\iota^*(0)$" to -- $SUBSK(0, \alpha) = -SE(\alpha) \cdot b_1^*(0) + \sum_{\iota=2}^I coef_\iota(0, \alpha) \cdot b_\iota^*(0)$ --;

CERTIFICATE OF CORRECTION (continued)
U.S. Pat. No. 8,964,988 B2

Column 53, line 9, Claim 12, change " $SUBSK(\lambda, \alpha) = (share(\lambda, \alpha) + coef(\lambda, \alpha) \cdot v_1(\lambda)) \cdot b_1^*(\lambda) + \sum_{\iota=2}^{n(\lambda)} coef(\lambda, \alpha) \cdot v_\iota(\lambda) \cdot b_\iota^*(\lambda) + \sum_{\iota=n(\lambda)+1}^{n(\lambda)+\zeta(\lambda)} coef_\iota(\lambda, \alpha) \cdot b_\iota^*(\lambda)$ ,"

to -- $SUBSK(\lambda, \alpha) = (share(\lambda, \alpha) + coef(\lambda, \alpha) \cdot v_1(\lambda)) \cdot b_1^*(\lambda) + \sum_{\iota=2}^{n(\lambda)} coef(\lambda, \alpha) \cdot v_\iota(\lambda) \cdot b_\iota^*(\lambda) + \sum_{\iota=n(\lambda)+1}^{n(\lambda)+\zeta(\lambda)} coef_\iota(\lambda, \alpha) \cdot b_\iota^*(\lambda)$ --;

Column 53, line 15, Claim 12, change " $SUBSK(\lambda, \alpha) = share(\lambda, \alpha) \cdot \sum_{\iota=1}^{n(\lambda)} v_\iota(\lambda) \cdot b_1^*(\lambda) + \sum_{\iota=n(\lambda)+1}^{n(\lambda)+\zeta(\lambda)} coef_\iota(\lambda, \alpha) \cdot b_\iota^*(\lambda)$ " to -- $SUBSK(\lambda, \alpha) = share(\lambda, \alpha) \cdot \sum_{\iota=1}^{n(\lambda)} v_\iota(\lambda) \cdot b_1^*(\lambda) + \sum_{\iota=n(\lambda)+1}^{n(\lambda)+\zeta(\lambda)} coef_\iota(\lambda, \alpha) \cdot b_\iota^*(\lambda)$ --.

Column 53, line 61, Claim 14, change " $SUBSK(0, \alpha) = -SE(\alpha) \cdot b_1^*(0) + \Sigma_{\iota=2}^{I} coef_\iota(0, \alpha) \cdot b_\iota^*(0)$ ," to -- $SUBSK(0, \alpha) = -SE(\alpha) \cdot b_1^*(0) + \sum_{\iota=2}^{I} coef_\iota(0, \alpha) \cdot b_\iota^*(0)$ --;

Column 53, line 66, Claim 14, change " $SUBSK(\lambda, \alpha) = (share(\lambda, \alpha) + coef(\lambda, \alpha) + v_1(\lambda)) \cdot b_1^*(\lambda) \pm \Sigma_{\iota=2}^{n(\lambda)} coef(\lambda, \alpha) \cdot v_\iota(\lambda) \cdot b_\iota^*(\lambda) \pm \Sigma_{\iota=n(\lambda)+1}^{n(\lambda)+\zeta(\lambda)} coef_\iota(\lambda, \alpha) \cdot b_\iota^*(\lambda)$ ," to -- $SUBSK(\lambda, \alpha) = (share(\lambda, \alpha) + coef(\lambda, \alpha) \cdot v_1(\lambda)) \cdot b_1^*(\lambda) + \sum_{\iota=2}^{n(\lambda)} coef(\lambda, \alpha) \cdot v_\iota(\lambda) \cdot b_\iota^*(\lambda) + \sum_{\iota=n(\lambda)+1}^{n(\lambda)+\zeta(\lambda)} coef_\iota(\lambda, \alpha) \cdot b_\iota^*(\lambda)$ , --;

Column 54, line 3, Claim 14 change " $SUBSK(\lambda, \alpha) = share(\lambda, \alpha) \cdot \Sigma_{\iota=1}^{n(\lambda)} v_\iota(\lambda) \cdot b_1^*(\lambda) \pm \Sigma_{\iota=n(\lambda)+1}^{n(\lambda)\cdot\zeta(\lambda)} coef_\iota(\lambda, \alpha) \cdot b_\iota^*(\lambda)$ ," to -- $SUBSK(\lambda, \alpha) = share(\lambda, \alpha) \cdot \sum_{\iota=1}^{n(\lambda)} v_\iota(\lambda) \cdot b_1^*(\lambda) + \sum_{\iota=n(\lambda)+1}^{n(\lambda)+\zeta(\lambda)} coef_\iota(\lambda, \alpha) \cdot b_\iota^*(\lambda)$ , --.

Column 54, line 16, Claim 15, change " $\Sigma_{\alpha=1}^{L} h(\alpha)$ ," to -- $\sum_{\alpha=1}^{L} h(\alpha)$ --.

Column 55, line 28, Claim 23, change "$DSH(0, \alpha, h(\alpha)) = -SE(\alpha) \cdot SHb_1^*(0, \alpha, h(\alpha)) \cdot g_2 + \Sigma_{\iota=2}^I \, coef_\iota(0, \alpha) \cdot SHb_\iota^*(0, \alpha, h(\alpha)) \cdot g_2$" to --$DSH(0, \alpha, h(\alpha)) = -SE(\alpha) \cdot SHb_1^*(0, \alpha, h(\alpha)) \cdot g_2 + \sum_{\iota=2}^I coef_\iota(0, \alpha) \cdot SHb_\iota^*(0, \alpha, h(\alpha)) \cdot g_2$--;

Column 55, line 39, Claim 23, change "$DSH(\lambda, \alpha, h(\alpha)) = (share(\lambda, \alpha) + coef(\lambda, \alpha) \cdot v_1(\lambda)) \cdot SHb_1^*(\lambda, \alpha, h(\alpha)) \cdot g_2 + \sum_{\iota=2}^{n(\lambda)} coef(\lambda, \alpha) \cdot v_\iota(\lambda) \cdot SHb_\iota^*(\lambda, \alpha, h(\alpha)) \cdot g_2 + \sum_{\iota=n(\lambda)+1}^{n(\lambda)+\zeta(\lambda)} coef_\iota(\lambda, \alpha) \cdot SHb_\iota^*(\lambda, \alpha, h(\alpha)) \cdot g_2$" to --$DSH(\lambda, \alpha, h(\alpha)) = (share(\lambda, \alpha) + coef(\lambda, \alpha) \cdot v_1(\lambda)) \cdot SHb_1^*(\lambda, \alpha, h(\alpha)) \cdot g_2 + \sum_{\iota=2}^{n(\lambda)} coef(\lambda, \alpha) \cdot v_\iota(\lambda) \cdot SHb_\iota^*(\lambda, \alpha, h(\alpha)) \cdot g_2 + \sum_{\iota=n(\lambda)+1}^{n(\lambda)+\zeta(\lambda)} coef_\iota(\lambda, \alpha) \cdot SHb_\iota^*(\lambda, \alpha, h(\alpha)) \cdot g_2$--;

Column 55, line 41, Claim 23, change "$DSH(\lambda, \alpha, h(\alpha)) = share(\lambda, \alpha) \cdot \sum_{\iota=1}^{n(\lambda)} v_\iota(\lambda) \cdot SHb_1^*(\lambda, \alpha, h(\alpha)) \cdot g_2 + \sum_{\iota=n(\lambda)+1}^{n(\lambda)+\zeta(\lambda)} coef_\iota(\lambda, \alpha) \cdot SHb_\iota^*(\lambda, \alpha, h(\alpha)) \cdot g_2$" to --$DSH(\lambda, \alpha, h(\alpha)) = share(\lambda, \alpha) \cdot \sum_{\iota=1}^{n(\lambda)} v_\iota(\lambda) \cdot SHb_1^*(\lambda, \alpha, h(\alpha)) \cdot g_2 + \sum_{\iota=n(\lambda)+1}^{n(\lambda)+\zeta(\lambda)} coef_\iota(\lambda, \alpha) \cdot SHb_\iota^*(\lambda, \alpha, h(\alpha)) \cdot g_2$--.

Column 55, line 59, Claim 24, change "The secret sharing method according to claim15, 17, 18, 19, 20, 21, 22, or 23, wherein the value corresponding to" to --The secret sharing method according to claim 15, 16, 17, 18, 19, 20, 21, or 22, wherein the value corresponding to--;

Column 56, line 3, Claim 24, change "$DSH(0, \alpha, h(\alpha)) = -SE(\alpha) \cdot SHb_1^*(0, \alpha, h(\alpha)) + \Sigma_{\iota=2}^I coef_\iota(0, \alpha) \cdot SHb_\iota^*(0, \alpha, h(\alpha))$" to --$DSH(0, \alpha, h(\alpha)) = -SE(\alpha) \cdot SHb_1^*(0, \alpha, h(\alpha)) + \sum_{\iota=2}^I coef_\iota(0, \alpha) \cdot SHb_\iota^*(0, \alpha, h(\alpha))$--;

Column 56, line 12, Claim 24, change "$DSH(\lambda, \alpha, h(\alpha)) = (share(\lambda, \alpha) + coef(\lambda, \alpha) \cdot v_1(\lambda)) \cdot SHb_1^*(\lambda, \alpha, h(\alpha)) + \sum_{\iota=2}^{n(\lambda)} coef(\lambda, \alpha) \cdot v_\iota(\lambda) \cdot SHb_\iota^*(\lambda, \alpha, h(\alpha)) + \sum_{\iota=n(\lambda)+1}^{n(\lambda)+\zeta(\lambda)} coef_\iota(\lambda, \alpha) \cdot SHb_\iota^*(\lambda, \alpha, h(\alpha))$" to --$DSH(\lambda, \alpha, h(\alpha)) = (share(\lambda, \alpha) + coef(\lambda, \alpha) \cdot v_1(\lambda)) \cdot$

CERTIFICATE OF CORRECTION (continued)

$SHb_1^*(\lambda, \alpha, h(\alpha)) + \sum_{\iota=2}^{n(\lambda)} coef(\lambda, \alpha) \cdot v_\iota(\lambda) \cdot SHb_\iota^*(\lambda, \alpha, h(\alpha)) + \sum_{\iota=n(\lambda)+1}^{n(\lambda)+\zeta(\lambda)} coef_\iota(\lambda, \alpha) \cdot SHb_\iota^*(\lambda, \alpha, h(\alpha))$ --;

Column 56, line 22, Claim 24, change " $DSH(\lambda, \alpha, h(\alpha)) = share(\lambda, \alpha) \cdot \sum_{\iota=1}^{n(\lambda)} v_\iota(\lambda) \cdot SHb_1^*(\lambda, \alpha, h(\alpha)) - \sum_{\iota=n(\lambda)+1}^{n(\lambda)+\zeta(\lambda)} coef_\iota(\lambda, \alpha) \cdot SHb_\iota^*(\lambda, \alpha, h(\alpha))$ " to -- $DSH(\lambda, \alpha, h(\alpha)) = share(\lambda, \alpha) \cdot \sum_{\iota=1}^{n(\lambda)} v_\iota(\lambda) \cdot SHb_1^*(\lambda, \alpha, h(\alpha)) + \sum_{\iota=n(\lambda)+1}^{n(\lambda)+\zeta(\lambda)} coef_\iota(\lambda, \alpha) \cdot SHb_\iota^*(\lambda, \alpha, h(\alpha))$ --.

Column 56, line 36, Claim 25, change " $SUBSK(0, \alpha) = -SE(\alpha) \cdot b_1^*(0) + +\Sigma_{\iota=2}^{I} coef_\iota(0, \alpha) \cdot b_\iota^*(0)$ " to -- $SUBSK(0, \alpha) = -SE(\alpha) \cdot b_1^*(0) + \sum_{\iota=2}^{I} coef_\iota(0, \alpha) \cdot b_\iota^*(0)$ --;

Column 56, line 41, Claim 25, change " $SUBSK(\lambda, \alpha) = (share(\lambda, \alpha) + coef(\lambda, \alpha) \cdot v_1(\lambda)) \cdot b_1^*(\lambda) + \sum_{\iota=2}^{n(\lambda)} coef(\lambda, \alpha) \cdot v_\iota(\lambda) \cdot b_\iota^*(\lambda) - \sum_{\iota=n(\lambda)+1}^{n(\lambda)+\zeta(\lambda)} coef_\iota(\lambda, \alpha) \cdot b_\iota^*(\lambda)$ " to -- $SUBSK(\lambda, \alpha) = (share(\lambda, \alpha) + coef(\lambda, \alpha) \cdot v_1(\lambda)) \cdot b_1^*(\lambda) + \sum_{\iota=2}^{n(\lambda)} coef(\lambda, \alpha) \cdot v_\iota(\lambda) \cdot b_\iota^*(\lambda) + \sum_{\iota=n(\lambda)+1}^{n(\lambda)+\zeta(\lambda)} coef_\iota(\lambda, \alpha) \cdot b_\iota^*(\lambda)$ --;

Column 56, line 48, Claim 25, change " $SUBSK(\lambda, \alpha) = share(\lambda, \alpha) \cdot \sum_{\iota=1}^{n(\lambda)} v_\iota(\lambda) \cdot b_1^*(\lambda) + \sum_{\iota=n(\lambda)+1}^{n(\lambda)+\zeta(\lambda)} coef_\iota(\lambda, \alpha) \cdot b_\iota^*(\lambda)$ " to -- $SUBSK(\lambda, \alpha) = share(\lambda, \alpha) \cdot \sum_{\iota=1}^{n(\lambda)} v_\iota(\lambda) \cdot b_1^*(\lambda) + \sum_{\iota=n(\lambda)+1}^{n(\lambda)+\zeta(\lambda)} coef_\iota(\lambda, \alpha) \cdot b_\iota^*(\lambda)$ --.

Column 56, line 55, Claim 26, change " $SUBSK(0, \alpha) = -SE(\alpha) \cdot b_1^*(0) + \Sigma_{\iota=2}^{I} coef_\iota(0, \alpha) \cdot b_\iota^*(0)$ " to -- $SUBSK(0, \alpha) = -SE(\alpha) \cdot b_1^*(0) + \sum_{\iota=2}^{I} coef_\iota(0, \alpha) \cdot b_\iota^*(0)$ --;

Column 56, line 61, Claim 26, change " $SUBSK(\lambda, \alpha) = (share(\lambda, \alpha) + coef(\lambda, \alpha) \cdot v_1(\lambda)) \cdot$

CERTIFICATE OF CORRECTION (continued)
U.S. Pat. No. 8,964,988 B2

$b_1^*(\lambda) + \sum_{\iota=2}^{n(\lambda)} \text{coef}(\lambda, \alpha) \cdot v_\iota(\lambda) \cdot b_\iota^*(\lambda) - \sum_{\iota=n(\lambda)+1}^{n(\lambda)+\zeta(\lambda)} \text{coef}_\iota(\lambda, \alpha) \cdot b_\iota^*(\lambda)$ " to -- $\text{SUBSK}(\lambda, \alpha) = (\text{share}(\lambda, \alpha) + \text{coef}(\lambda, \alpha) \cdot v_1(\lambda)) \cdot b_1^*(\lambda) + \sum_{\iota=2}^{n(\lambda)} \text{coef}(\lambda, \alpha) \cdot v_\iota(\lambda) \cdot b_\iota^*(\lambda) + \sum_{\iota=n(\lambda)+1}^{n(\lambda)+\zeta(\lambda)} \text{coef}_\iota(\lambda, \alpha) \cdot b_\iota^*(\lambda)$ --.